US008600911B2

(12) United States Patent
Kocis et al.

(10) Patent No.: US 8,600,911 B2
(45) Date of Patent: Dec. 3, 2013

(54) SYSTEM FOR OPTIMIZING TRANSPORTATION SCHEDULING

(75) Inventors: Gary R. Kocis, Vienna, VA (US); Kevin C. Furman, Houston, TX (US); Philip H. Warrick, Oakton, VA (US); Mark E. Osmer, Montclair, VA (US); Thomas A. Wheaton, Houston, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/077,085

(22) Filed: Mar. 31, 2011

(65) Prior Publication Data
US 2011/0231335 A1    Sep. 22, 2011

Related U.S. Application Data

(63) Continuation of application No. 12/285,651, filed on Oct. 10, 2008, now Pat. No. 8,019,617.

(60) Provisional application No. 60/996,188, filed on Nov. 6, 2007.

(51) Int. Cl.
*G06Q 30/00* (2012.01)
*G06Q 10/00* (2012.01)
*G06F 17/00* (2006.01)
*G06G 7/00* (2006.01)

(52) U.S. Cl.
USPC ............ 705/337; 705/1.1; 705/400; 705/7.35

(58) Field of Classification Search
USPC ......... 705/1.1, 7.11–7.42, 330–341, 400–418
See application file for complete search history.

(56) References Cited

U.S. PATENT DOCUMENTS

| 6,463,419 | B1 * | 10/2002 | Kluss ............................... 705/80 |
| 6,983,186 | B2 * | 1/2006 | Navani et al. ................... 700/95 |
| 7,273,171 | B2 | 9/2007 | Babarik |

(Continued)

FOREIGN PATENT DOCUMENTS

| JP | 2000-057220 | 2/2000 |
| JP | 2000-172745 | 6/2000 |
| JP | 2004-210519 | 7/2004 |

OTHER PUBLICATIONS

Brown et al, Scheduling ocean transportation of crude oil, management science, vol. 33, No. 3, p. 335-346, Mar. 1987.*

(Continued)

*Primary Examiner* — George Chen
(74) *Attorney, Agent, or Firm* — Glenn T. Barrett

(57) ABSTRACT

A computer modeling application is disclosed for finding the optimal solution to maximize total net margin, for the assignment of vehicles (e.g., especially vessels) in an available fleet to perform a set of voyages to transport cargo comprising one or more bulk products during a planning period, as well as an apparatus and method employing the same. The fleet can include term vehicles and spot vehicles. The vehicles, voyages, and cargos can be heterogeneous. In one embodiment, the vehicles are crude carrier vessels and the bulk products are different grades of crude oil. To increase speed, the model is broken into linear programming and mixed integer (linear) programming problems. The model can be run on a real-time basis to support complex scheduling operations.

21 Claims, 27 Drawing Sheets

(56) References Cited

U.S. PATENT DOCUMENTS

| | | |
|---|---|---|
| 2002/0069096 A1 | 6/2002 | Lindoerfer et al. |
| 2002/0069210 A1 | 6/2002 | Navani et al. |
| 2003/0014288 A1* | 1/2003 | Clarke et al. .................. 705/7 |
| 2006/0015396 A1 | 1/2006 | Blomeyer |
| 2006/0020565 A1* | 1/2006 | Rzevski et al. ............... 706/50 |
| 2007/0174154 A1 | 7/2007 | Roberts et al. |
| 2007/0214031 A1 | 9/2007 | Amano |
| 2007/0219836 A1 | 9/2007 | Funaki |
| 2008/0004928 A1 | 1/2008 | Trellevik et al. |

OTHER PUBLICATIONS

Koekebakker et al, "Are Spot Freight Rates Stationary?", Journal of Transport Economics and Policy, vol. 40, Part 3, Sep. 2006, pp. 449-472.*

Christiansen et al., "Ship Routing and Scheduling: Status and Perspectives", Transportation Science, vol. 38, Issue 1, pp. 1-18.

Christiansen et al., "Marine Transportation", Handbooks in Operations Research and Management Science Transportation.

Brown et al., "Scheduling Ocean Transportation of Crude Oil", Management Science, vol. 33, Issue 3, pp. 335-346 (1987).

Sherali et al., Fleet Management Models and Algorithms for an Oil Tanker Routing and Scheduling Problem; IIE Transactions, vol. 31, pp. 395-406 (1999).

ACP (The Autoridad Del Canal de Panama), "Suez Canal Pricing Forecast 2005-2025", Sep. 24, 2007, pp. 1-42.

Mayuzumi, "Application of or to Logistics", Science of Operations: Operations Research, Japan, May 1, 1997, vol. 42, No. 5, pp. 305-308.

Kasugai, "Basics and Techniques of or", Zeimu Keiri Kyokai Co. Ltd., Aug. 1, 1971, 1st edition, pp. 181-182.

* cited by examiner

FIG. 3A

|   | A | B | C | D | E | F | G | H | I | J | K | M | N |
|---|---|---|---|---|---|---|---|---|---|---|---|---|---|
| 1 | | | | | | | | | | | Calculated from this page plus term and spot dates | | |
| 2 | | MinMax Date | 12/31/06 | 12/04/07 | | End of Optimizatio Horizon | 10/05/07 | | | | | | |
| 3 | Voyage | Sequence | StartDate | EndDate | Port | Grade | Action (L/D) | Volume (kB) | Upper Tol | Lower Tol | Laden Route (to override defaults) | Bunker In/Out/Not (0,1,-1) | Delay (hrs) |
| 4 | Voyage1 | 1 | 09/05/07 | 09/05/07 | Port 01 | Grade01 | L | 2100 | 10.0% | 10.0% | | | |
| 5 | Voyage1 | 2 | 09/15/07 | 09/17/07 | Port 02 | Grade01 | D | 2100 | | | | | |
| 6 | | | | | | | | | | | | | |
| 7 | Voyage2 | 1 | 09/16/07 | 09/16/07 | Port 01 | Grade01 | L | 2100 | 10.0% | 10.0% | | | |
| 8 | Voyage2 | 2 | 09/26/07 | 09/28/07 | Port 02 | Grade01 | D | 2100 | | | | | |
| 9 | | | | | | | | | | | | | |
| 10 | Voyage3 | 1 | 08/29/07 | 08/30/07 | Port 03 | Grade02 | L | 500 | 5.0% | 5.0% | | | |
| 11 | Voyage3 | 2 | 08/31/07 | 08/31/07 | Port 01 | Grade03 | L | 369.6 | 10.0% | 10.0% | | | |
| 12 | Voyage3 | 2 | 08/31/07 | 08/31/07 | Port 01 | Grade04 | L | 569.8 | 10.0% | 10.0% | | | |
| 13 | Voyage3 | 3 | 09/02/07 | 09/03/07 | Port 04 | Grade05 | L | 600 | 5.0% | 5.0% | | | |
| 14 | Voyage3 | 4 | 09/12/07 | 09/16/07 | Port 05 | Grade02 | D | 500 | | | | | |
| 15 | Voyage3 | 4 | 09/12/07 | 09/16/07 | Port 05 | Grade03 | D | 369.6 | | | | | |
| 16 | Voyage3 | 4 | 09/12/07 | 09/16/07 | Port 05 | Grade04 | D | 150.1 | | | | | |
| 17 | Voyage3 | 5 | 09/13/07 | 09/17/07 | Port 06 | Grade04 | D | 419.7 | | | | | |
| 18 | Voyage3 | 5 | 09/13/07 | 09/17/07 | Port 06 | Grade05 | D | 600 | | | | | |
| 19 | | | | | | | | | | | | | |
| 20 | Voyage4 | 1 | 09/03/07 | 09/04/07 | Port 07 | Grade06 | L | 2040 | 5.0% | 5.0% | | | |

| | A | B | C | D | E | G | H | I | J | K | N | O | Q | R | S | T | V | Y |
|---|---|---|---|---|---|---|---|---|---|---|---|---|---|---|---|---|---|---|
| | | | | Bunker Cost ($/ton) | MDO Cost ($/ton) | Current Demurrage Rate (k$/day) | Market WS 8/29/07 | Outlook WS | NetHire Base WS | NetHire Base FuelCost | | | B/H Credit ($/bbl) | B/H Debit ($/bbl) | | | Laden Route (Default) | Ballast Route (Default) |
| 1 | From | To | Via | | | | | | | | From | To | | | From | To | | |
| 2 | AG | RS | NA | 360 | 530 | 55 | 62.5 | 62.5 | 65 | 353 | AG | US | $0.66 | $0.66 | AG | US | Suez | Suez |
| 3 | AG | JAP | NA | 360 | 530 | 55 | 62.5 | 62.5 | 62.5 | 353 | RS | US | $0.66 | $0.66 | RS | US | Suez | Suez |
| 4 | AG | SNG | NA | 360 | 530 | 55 | 62.5 | 62.5 | 65 | 353 | AG | NE | $0.66 | $0.66 | AG | NE | Suez | Suez |
| 5 | AG | US | Cape | 360 | 530 | 50 | 47.5 | 47.5 | 50 | 344 | RS | NE | $0.66 | $0.66 | RS | NE | Suez | Suez |
| 6 | AG | US | Suez | 360 | 530 | 50 | 49.2 | 49.2 | 50 | 344 | | | | | MED | JAP | Suez | Suez |
| 7 | AG | NE | Cape | 360 | 530 | 45 | 47.5 | 47.5 | | | | | | | MED | SNG | Cape | Cape |
| 8 | AG | NE | Suez | 360 | 530 | 45 | 54 | 54 | 80 | 334 | | | | | WAFR | JAP | Cape | Cape |
| 9 | AG | NE | NA | 360 | 530 | 45 | 60 | 60 | 72.5 | 344 | | | | | WAFR | SNG | Cape | Cape |
| 10 | MED | US | NA | 360 | 530 | 45 | 55 | 55 | | | | | | | AG | JAP | NA | NA |
| 11 | WAFR | US | NA | 360 | 530 | 45 | 52.5 | 52.5 | | | | | | | AG | SNG | NA | NA |
| 12 | MED | MED | NA | 360 | 530 | 45 | 55 | 55 | | | | | | | AG | WAFR | | Cape |
| 13 | WAFR | MED | NA | 360 | 530 | 45 | 57.5 | 57.5 | | | | | | | RS | WAFR | | Suez |
| 14 | WAFR | SNG | NA | 360 | 530 | 45 | 52.5 | 52.5 | | | | | | | WAFR | AG | | Cape |
| 15 | MED | MED | NA | 360 | 530 | 45 | 72.5 | 72.5 | | | | | | | NE | RS | | Suez |
| 16 | WAFR | NE | NA | 360 | 530 | 45 | 57.5 | 57.5 | | | | | | | AG | MED | Suez | Suez |
| 17 | | | | | | | | 1 | | | | | | | MED | AG | Suez | Suez |
| 18 | | | | | | | | | | | | | | | RS | MED | Suez | Suez |
| 19 | | | | | | | | | | | | | | | MED | RS | Suez | Suez |

*FIG. 3E*

|   | A | B | C | D | E | F | G | H | I | J | K |
|---|---|---|---|---|---|---|---|---|---|---|---|
| 1 | Input Voyage Ship Assignments (Optional) | | | | | | | | | | |
| 2 | | | | | | | | | | | |
| 3 | Voyage | Ship | User Specification | | | | | | | | |
| 4 | Voyage1 | Term Vessel 1 | | 0 | (Note: 1 denotes assignment that must be made, -1 denotes assignment that can't be made) | | | | | | |
| 5 | Voyage2 | Term Vessel 2 | | 0 | | | | | | | |
| 6 | Voyage3 | Term Vessel 3 | | 0 | | | | | | | |
| 7 | Voyage4 | Term Vessel 4 | | 0 | | | | | | | |
| 8 | Voyage5 | Term Vessel 5 | | 0 | | | | | | | |
| 9 | Voyage6 | Term Vessel 6 | | 0 | | | | | | | |
| 10 | Voyage1 | Term Vessel 7 | | 0 | | | | | | | |
| 11 | Voyage2 | Term Vessel 8 | | 0 | | | | | | | |
| 12 | Voyage3 | Term Vessel 9 | | 0 | | | | | | | |
| 13 | Voyage4 | Term Vessel 10 | | 0 | | | | | | | |
| 14 | Voyage5 | Term Vessel 11 | | 0 | | | | | | | |
| 15 | Voyage6 | Term Vessel 12 | | 0 | | | | | | | |
| 16 | Voyage1 | Term Vessel 13 | | 0 | | | | | | | |
| 17 | Voyage2 | Term Vessel 14 | | 0 | | | | | | | |
| 18 | Voyage3 | Term Vessel 15 | | 0 | | | | | | | |
| 19 | Voyage4 | Term Vessel 16 | | 0 | | | | | | | |
| 20 | Voyage5 | Term Vessel 17 | | 0 | | | | | | | |

*FIG. 3F*

| | A | B | C | D | F | G | H | J | M | Q | X | AB | AI | AM |
|---|---|---|---|---|---|---|---|---|---|---|---|---|---|---|
| 1 | Region Codes: | AG | AS | BS | | | | | Net Hire, k$/D | | Net Hire Change, k$/D per 10 $/WS | | Net Hire Change, k$/D per 10 $/t Fuel | |
| 2 | JAP | MED | NE | RS | | Sort Net Hire | | | AG | WAFR | AG | WAFR | AG | WAFR |
| 3 | SK | SNG | US | WAFR | | | | | JAP | US | JAP | US | JAP | US |
| 4 | | | South: Notional Voyage | | | North: Notional Voyage | | | NA | NA | NA | NA | NA | NA |
| 5 | Term Ship: | From: | To: | Via: | From: | To: | Via: | From: To: Via: | | | | | | |
| 6 | Term Vessel 1 | AG | JAP | NA | WAFR | US | NA | | 41.3 | 46.8 | 10.83 | 9.66 | 0.67 | 0.67 |
| 7 | Term Vessel 2 | AG | JAP | NA | WAFR | US | NA | | 35.3 | 41.3 | 10.11 | 9.11 | 0.72 | 0.72 |
| 8 | Term Vessel 3 | AG | JAP | NA | WAFR | US | NA | | 39.1 | 46.0 | 11.18 | 10.17 | 0.83 | 0.84 |
| 9 | Term Vessel 4 | AG | JAP | NA | WAFR | US | NA | | 38.2 | 45.1 | 11.18 | 10.17 | 0.85 | 0.87 |
| 10 | Term Vessel 5 | AG | JAP | NA | WAFR | US | NA | | 34.0 | 40.7 | 10.16 | 9.24 | 0.75 | 0.75 |
| 11 | Term Vessel 6 | AG | JAP | NA | WAFR | US | NA | | 36.4 | 42.1 | 10.50 | 9.38 | 0.72 | 0.72 |
| 12 | Term Vessel 7 | AG | JAP | NA | WAFR | US | NA | | 36.9 | 42.9 | 11.27 | 10.07 | 0.88 | 0.88 |
| 13 | Term Vessel 8 | AG | JAP | NA | WAFR | US | NA | | 34.9 | 41.3 | 10.66 | 9.61 | 0.84 | 0.84 |
| 14 | Term Vessel 9 | AG | JAP | NA | WAFR | US | NA | | 33.8 | 40.4 | 10.03 | 9.24 | 0.73 | 0.76 |
| 15 | Term Vessel 10 | AG | JAP | NA | WAFR | US | NA | | 35.0 | 41.8 | 10.60 | 9.67 | 0.83 | 0.83 |
| 16 | Term Vessel 11 | WAFR | US | NA | WAFR | US | NA | | | 46.5 | | 4.92 | 0.81 | 0.43 |
| 17 | Term Vessel 12 | AG | JAP | NA | WAFR | US | NA | | 34.5 | 41.7 | 9.79 | 9.38 | 0.67 | 0.78 |
| 18 | Term Vessel 13 | AG | JAP | NA | WAFR | US | NA | | 35.6 | 42.9 | 10.22 | 9.68 | 0.75 | 0.81 |
| 19 | Term Vessel 14 | AG | JAP | NA | WAFR | US | NA | | 20.7 | 28.6 | 7.75 | 7.39 | 0.71 | 0.71 |
| 20 | Term Vessel 15 | AG | JAP | NA | WAFR | US | NA | | 33.3 | 39.5 | 9.97 | 9.66 | 0.74 | 0.88 |

| | A | B | C | D |
|---|---|---|---|---|
| 1 | Term Ship | After Voyage | Service Days | Input Error Message |
| 2 | | [voyage #1] | [Days] | |
| 3 | Term Vessel 1 | | | |
| 4 | Term Vessel 2 | | | |
| 5 | Term Vessel 3 | | | |
| 6 | Term Vessel 4 | | | |
| 7 | Term Vessel 5 | | | |
| 8 | Term Vessel 6 | | | |
| 9 | Term Vessel 7 | | | |
| 10 | Term Vessel 8 | | | |
| 11 | Term Vessel 9 | | | |
| 12 | Term Vessel 10 | | | |
| 13 | Term Vessel 11 | | | |
| 14 | Term Vessel 12 | | | |
| 15 | Term Vessel 13 | | | |
| 16 | Term Vessel 14 | | | |
| 17 | Term Vessel 15 | | | |
| 18 | Term Vessel 16 | | | |
| 19 | Term Vessel 17 | | | |
| 20 | Term Vessel 18 | | | |

NetHire / InputAssignment / TermExclude / Term Ship Planned Service / Spot Exclude / SuezCa Ready  CAPS NUM

*FIG. 3I*

| | A | B | C | D | E | F | G | H | I | J | K |
|---|---|---|---|---|---|---|---|---|---|---|---|
| 1 | Note: no blank entries allowed in B1..U1 | Port19 | Port07 | Port20 | Port04 | QI | QI | QI | QI | QI | QI |
| 2 | Spot Ship #1 | | | | | | | | | | |
| 3 | | | | | | | | | | | |
| 4 | | | | | 1 | | | | | | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |
| 11 | | | | | | | | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |
| 17 | | | | | | | | | | | |
| 18 | | | | | | | | | | | |
| 19 | | | | | | | | | | | |
| 20 | | | | | | | | | | | |

NetHire / InputAssignment / TermExclude / Term Ship Planned Service / SpotExclude / SuezCanalTol / Grades / Ports / LegDa

| | A | B | C | D | E | F | G | H | I | J | L | M | N | O |
|---|---|---|---|---|---|---|---|---|---|---|---|---|---|---|
| 1 | Port | | BERTH Start Time | Misc (Berth, etc)Tim | Pumping Rate | BERTH Cut-Off Tim | DE-BERTH Cut-Off Time | Grade Switch | Term Port Charg | Term Port Charge | Temperature | Arrival DWT | Min DWT | Max Arrival Cargo |
| | | L | Hour | Hour | kB/hr | Hours | Hours | Hours | K$ Vl.CC | K$ Suez | F | kt | kt | kt |
| 2 | Default | D | 6 | 6 | 50 | 24 | 24 | 1 | 0 | 0 | 105 | 999 | 0 | 999 |
| 3 | Port01 | L | 12 | 6 | 50 | 24 | 24 | 1 | 30 | 19.5 | 105 | 999 | 0 | 999 |
| 4 | Port02 | D | 6 | 6 | 50 | 24 | 24 | 1 | 0 | 0 | 60 | 999 | 0 | 999 |
| 5 | Port03 | L | 6 | 6 | 50 | 24 | 24 | 1 | 66 | 58 | 105 | 999 | 0 | 999 |
| 6 | Port04 | L | 6 | 6 | 50 | 24 | 24 | 1 | 40 | 38 | 105 | 999 | 0 | 999 |
| 7 | Port05 | D | 6 | 6 | 50 | 24 | 24 | 1 | 0 | 0 | 60 | 320 | 0 | 999 |
| 8 | Port06 | D | 6 | 6 | 50 | 24 | 24 | 1 | 45 | 25.5 | 60 | 999 | 0 | 999 |
| 9 | Port07 | L | 6 | 6 | 50 | 24 | 24 | 1 | 0 | 0 | 105 | 999 | 0 | 999 |

| | A | P | Q | R | S | T | U | V | W | X | Y | Z | AA | AB | AC | AD |
|---|---|---|---|---|---|---|---|---|---|---|---|---|---|---|---|---|
| 1 | Port | Max Arrival Cargo | Min Carg | Max Carg | Max Depart Draft | Max Arrival Draft | Min Draft | Max Depart Displ | Max Arrival Displ | Min Displ | Max bow FRBD | Max Arrival FRBD | Max mflht | UTC Offset | Voyage Value WS Multiplier | Voyage Value WS Constant |
| | | kB | kB | kt | m | m | m | kt | kt | kt | m | m | m | Hour | na | na |
| 2 | Default | 9999 | 0 | 999 | 99 | 99 | 0 | 999 | 999 | 0 | 99 | 99 | 99 | -3 | 1.000 | 0.00 |
| 3 | Port01 | 9999 | 0 | 999 | 21 | 17.98 | 0 | 999 | 999 | 0 | 99 | 99 | 99 | -3 | 1.000 | 0.00 |
| 4 | Port02 | 9999 | 0 | 999 | 12.5 | 99 | 0 | 999 | 152 | 0 | 60 | 99 | 99 | -3 | 1.000 | 0.00 |
| 5 | Port03 | 9999 | 0 | 999 | 99 | 22 | 0 | 999 | 999 | 0 | 20 | 99 | 99 | -3 | 1.000 | 0.00 |
| 6 | Port04 | 9999 | 0 | 999 | 99 | 21.5 | 0 | 387 | 387 | 0 | 99 | 99 | 99 | -3 | 1.000 | 0.00 |
| 7 | Port05 | 9999 | 0 | 450 | 27.43 | 15.22 | 0 | 500 | 999 | 0 | 99 | 99 | 99 | -8 | 1.000 | 0.00 |
| 8 | Port06 | | | | | | | | | | | | | -3 | 1.000 | 0.00 |

*FIG. 3L*

| | A | B | C | D | E | F | G | H | I | J |
|---|---|---|---|---|---|---|---|---|---|---|
| | | Sort Port Region Data | | | | | | | | |
| 1 | Port Abbrev. | Port Name | AG | US | JAP | SNG | NE | MED | RS | WAFR |
| 2 | Port 01 | Port 01 | | | | | | | | |
| 3 | Port 02 | Port 02 | 1 | | | | 1 | | | |
| 4 | Port 03 | Port 03 | 1 | | | | | | | |
| 5 | Port 04 | Port 04 | | | | | | | | |
| 6 | Port 05 | Port 05 | | 1 | | | | 1 | | |
| 7 | Port 06 | Port 06 | | | | | | 1 | | |
| 8 | Port 07 | Port 07 | | 1 | | | | | | 1 |
| 9 | Port 08 | Port 08 | | 1 | | | | | | 1 |
| 10 | Port 09 | Port 09 | | | | | | | | |
| 11 | Port 10 | Port 10 | | | | | | | | 1 |
| 12 | Port 11 | Port 11 | | | | | | | | |
| 13 | Port 12 | Port 12 | 1 | | | | | 1 | | |
| 14 | Port 13 | Port 13 | | | | | | 1 | | |
| 15 | Port 14 | Port 14 | | | | | | | | |
| 16 | Port 15 | Port 15 | | | | | | | | 1 |
| 17 | Port 17 | Port 17 | | | | | | | | 1 |
| 18 | Port 18 | Port 18 | | | | | | | | |
| 19 | Port 19 | Port 19 | | | | | | | | |
| 20 | Port 20 | Port 20 | | | | | | | | |

| | A | B | C | D |
|---|---|---|---|---|
| 1 | Origin Port ▽ | Destination Po ▽ | Via ▽ | Distance |
| 194 | Port01 | Port01 | NA | 0 |
| 208 | Port02 | Port01 | NA | 3083 |
| 221 | Port03 | Port01 | NA | 176 |
| 235 | Port04 | Port01 | NA | 160.5 |
| 249 | Port05 | Port01 | NA | 3718 |
| 263 | Port06 | Port01 | NA | 3732.5 |
| 277 | Port07 | Port01 | NA | 246 |
| 291 | Port08 | Port01 | NA | 273 |
| 305 | Port09 | Port01 | NA | 197 |
| 319 | Port10 | Port01 | NA | 22.5 |
| 333 | Port11 | Port01 | NA | 6436 |
| 347 | Port12 | Port01 | NA | 6403.5 |
| 361 | Port13 | Port01 | Cape | 12352 |
| 374 | Port14 | Port01 | NA | 11261.5 |

SuezCanalToll / Grades / Ports / LegData

Filter | NUM

FIG. 30

| Voyage | FixRate | FR P1 | FR P2 | Cargo P1 | R/Trip P1 | Voy Days P1 | P/C Days P1 | Fuel Cons P1 | PT Cost P1 | Fixed P1 | Bunkers P1 | Total Cost P1 | Cargo P2 | R/Trip P2 |
|---|---|---|---|---|---|---|---|---|---|---|---|---|---|---|
| Voyage1 | 8.367 | 1.04 | 7.33 | 74.441 | 744 | 2.14 | | 117.6 | 14000 | 25655 | 37422 | 77077 | 74.0 | 5422 |
| Voyage2 | 8.386 | 1.04 | 7.33 | 74.441 | 744 | 2.14 | | 117.6 | 14000 | 25655 | 37422 | 77077 | 74.0 | 5422 |
| Voyage3 | 11.878 | 2.69 | 9.18 | 74.428 | 853 | 2.45 | 1.00 | 144.8 | 113000 | 41414 | 46087 | 200501 | 73.9 | 6726 |
| Voyage4 | 10.802 | 1.53 | 9.08 | 74.421 | 998 | 2.87 | | 157.7 | 29000 | 34414 | 50198 | 113611 | 73.9 | 6721 |
| Voyage5 | 12.584 | 3.40 | 9.18 | 74.409 | 1052 | 3.02 | 1.50 | 181.3 | 141000 | 54276 | 57687 | 252963 | 73.9 | 6726 |
| Voyage6 | 12.338 | 3.26 | 9.08 | 74.419 | 930 | 2.67 | 1.50 | 162.0 | 141000 | 50069 | 51551 | 242820 | 73.9 | 6721 |

FIG. 3R

| Main | FlatRate Details | | | | | | | |
|---|---|---|---|---|---|---|---|---|
| | Large ship Decision Support | >Main page< | Solutions page | Options/ReOptimize page | | | | Close page |

Error Status: =

| Length of economic horizon: = 406.8 | | opt. Horizon Ends 10/5/07 | End of Economic Horizon (Calc)= 10/11/07 |

If use Max (North/South) or if 0 Use South = 1

Notional Net Hire Values (as rates in K$/day) South and North rates:

| Ship | South | North |
|---|---|---|
| Term Vessel21 | 33.8 | 33.8 |
| Term Vessel12 | 34.0 | 34.0 |
| Term Vessel24 | 34.4 | 34.4 |
| Term Vessel6 | 35.9 | 35.9 |

| Voyage | Term ship | Calc TCE | Voy Margin | 1st Port ETA | Voy Complete | Voy TotDays |
|---|---|---|---|---|---|---|
| Voyage1 | TermVessel6 | 37.7 | 803.7 | 370.6 | 391.9 | 21.3 |
| Voyage1 | TermVessel12 | 21.9 | 576.7 | 364.4 | 390.5 | 26.3 |
| Voyage1 | TermVessel21 | 28.3 | 663.3 | 366.6 | 390.0 | 23.4 |
| Voyage1 | TermVessel24 | 27.3 | 791.3 | 361.3 | 390.3 | 29.0 |
| Voyage2 | TermVessel6 | 22.8 | 726.1 | 370.6 | 402.7 | 32.0 |
| Voyage2 | TermVessel12 | 14.4 | 537.4 | 364.2 | 401.5 | 37.3 |
| Voyage2 | TermVessel21 | 17.3 | 595.1 | 366.6 | 401.0 | 34.4 |
| Voyage2 | TermVessel24 | 19.4 | 775.2 | 361.3 | 401.3 | 40.0 |
| Voyage3 | TermVessel12 | 36.8 | 945.0 | 363.9 | 389.6 | 25.7 |
| Voyage3 | TermVessel24 | 38.2 | 1078.4 | 361.0 | 389.3 | 28.3 |
| Voyage4 | TermVessel12 | 30.6 | 846.6 | 364.5 | 392.1 | 27.6 |
| Voyage4 | TermVessel24 | 35.1 | 1061.4 | 361.6 | 391.8 | 30.2 |
| Voyage5 | TermVessel06 | 37.9 | 1145.4 | 370.5 | 400.7 | 30.3 |
| Voyage5 | TermVessel12 | 24.4 | 551.0 | 364.0 | 399.3 | 35.3 |
| Voyage5 | TermVessel24 | 29.4 | 1112.6 | 361.1 | 399.0 | 37.9 |
| Voyage6 | TermVessel6 | 30.2 | 1099.9 | 370.4 | 406.8 | 36.5 |
| Voyage6 | TermVessel12 | 21.2 | 880.0 | 363.9 | 405.4 | 41.5 |
| Voyage6 | TermVessel24 | 24.5 | 1078.0 | 361.0 | 405.1 | 44.1 |

| | | | | | | |
|---|---|---|---|---|---|---|
| Map | MV Solutions page | | | | | ◆ X |

Large Ship Decision Support | Main page | Solutions | Options/ReOptimize page | Close page Solutions Page This "Multiple Voyage Solution" page shows the ship assignments (and the corresponding NetMargin in K$). Page also shows the ships that are not assigned. Ship, Calculated NetHireValue (in K$), and the hire date upon which the net hire value is based. The hire date should be the later of the End of Optimization Horizon, and the date that a ship (if unassigned) is projected to be available at quion island.

| Data Errors | Solution Error | Data Error |
|---|---|---|
| Solution Errors | | |

Assignment and Net Margin (K$)

| Ship | Voy# | Voyage | N-S | ETA | Window | SetMargin |
|---|---|---|---|---|---|---|
| TermVessel 12 | 1 | Voyage3 | South | 08/30 | 08/29(1) | 1178 |
| TermVessel 24 | 1 | Voyage4 | South | 08/27 | 09/03(1) | 1296 |
| TermVessel 21 | 1 | Voyage1 | South | 09/01 | 09/05(0) | 895 |
| TermVessel 6 | 1 | Voyage5 | South | 09/05 | 09/05(1) | 1365 |
| TBN VLCC #3 | 1 | Voyage6 | South | 09/01 | 09/11(1) | 64 |
| TBN VLCC #4 | 1 | Voyage2 | South | 09/01 | 09/16(0) | 46 |

| Result: North-South program | Result: Lift/Tonnage |
|---|---|
| Result: Ship Voyage Gantt Chart | Result: NetMargin Components |
| Result: Term Ship Discharge Position | Result: Net Hire Value Details |
| Result: Active Constraints on cargo | Result: Timing Infeasibilities |
| Solve For Best Alternate Solutions | Result: Multi-Voyage Sequences |

Total NetMargin (M$) = 4.84     Total Lift (kTons)=1688

Total Idle(days)=17.6

Term Ships Not Assigned

| Ship | Net Hire Value (K$) | Based on Hire Date |
|---|---|---|
| | | |

SYSTEM FOR OPTIMIZING TRANSPORTATION SCHEDULING

CROSS REFERENCE TO RELATED APPLICATIONS

This application is a continuation of U.S. application Ser. No. 12/285,651, filed Oct. 10, 2008, which is incorporated by reference in its entirety, and which relates to and claims priority to U.S. Provisional Patent Application No. 60/996,188, entitled "System for Optimizing Transportation Scheduling", filed on Nov. 6, 2007.

BACKGROUND OF THE INVENTION

1. Field of the Invention

This invention is directed to a computer modeling application for scheduling transportation, an apparatus comprising the same and a method for scheduling transportation using the same. More particularly, the invention is directed to a computer modeling application for finding the optimal solution to maximize total net margin for the assignment of transportation vehicles (especially vessels) in an available fleet to perform a set of voyages to be initiated during a planning period for transporting cargo comprising one or more bulk products, as well as an apparatus and method employing the same.

2. Description of Related Art

Marine transportation is an important aspect for many industries including the oil and gas industry. Marine transportation is an economically attractive means to vessel bulk product (e.g., bulk liquids such as crude oil) over long distances. Accordingly, large volumes of bulk product are moved daily across the oceans and seas by a variety of vessels between source and destination locations. Destination ports (e.g., refinery sites) may be geographically spread around the world and are often far from the source of the bulk product (e.g., crude oil) needed. Because distances are large, transportation costs are significant. In addition, the business environment of marine transportation is complex and dynamic in that the number of shipping options is large and varies at any given time depending upon the amount of product that needs to be transported, temporal restrictions for the transport, the physical limitations of available vessels and relevant ports, vessel contractual terms and conditions, etc. Accordingly, marine transportation scheduling decisions are complex and dynamic.

The conventional commercial practice for making vessel scheduling decisions is to perform a manual analysis of available options with the assistance of spreadsheets. An experienced staff will use spreadsheets to calculate voyage constraints, estimate economic trade-offs, project voyage events forward in time and evaluate potential decisions. The staff may also apply heuristics, business rules and guidelines and intuition to develop an acceptable cargo transportation (i.e., lifting) program. The process is time consuming, incomplete, and there is no realistic way to know whether the lifting program chosen is, or is not, optimal. Given the typically large number of feasible vessel/voyage assignments, it is very difficult, if not impossible, to determine an optimal lifting program by manually considering one voyage (or one vessel) at a time. There are interactions between the various assignment decisions (e.g., if a given vessel is assigned to a given voyage, then the vessel is no longer available for one or more alternate concurrent voyages). The number of interactions, the number of possible decisions, and the number of significant factors are far too complex to be fully optimized manually (particularly in an acceptable time frame for making business decisions) even by an experienced scheduler. The problem is further complicated as one attempts to account for sequences of one or more voyages which can be assigned to a given vessel. In addition, once a manually derived schedule has been completed, it is impractical to frequently repeat the scheduling process to reflect changes in the business environment which can occur daily.

TurboRouter® is a tool recently developed by the Norwegian Marine Technology Research Institute, MARINTEK Logistics, and it performs vessel routing and scheduling calculations. However, the tool is based on a heuristic approach rather than an optimization approach. In addition, the purpose of the tool is to allow a commercial shipping company, as opposed to a chartering party, to maximize the revenue obtained by shipping optional cargo in addition to contract cargos that must be shipped.

There have been numerous publications in the field of ship routing and scheduling. One survey article is *Ship routing and scheduling: status and perspectives*, Transportation Science, 38(1): 1-18, M. Christiansen, K. Fagerholt, and D. Ronen (2004). One overview article is *Marine Transportation*, Handbooks in Operations Research and Management Science: Transportation, M. Christiansen, K. Fagerholt, B. Nygreen, D. Ronen, edited by C. Barnhart and G. Laporte (2005).

One publication of note is *Scheduling Ocean Transportation of Crude Oil*, Management Science, G. G. Brown, G. W. Graves, D. Ronen, 33(3): 335-346 (1987). This paper addresses a crude oil marine transportation problem. However, the modeling problem described therein includes the following assumptions/simplifications: (1) each cargo (i.e., crude oil to be shipped) moves between a single loading port and a single discharging port; (2) the cargo shipped must always be a full ship load (i.e., the cargo must be of a fixed size); and (3) each vessel is the same size. In addition, the objective function of the model is to minimize cost as opposed to net margin (i.e., revenue or value minus costs).

Another publication of note is *Fleet management models and algorithms for an oil tanker routing and scheduling problem*, H. D. Sherali, S. M. Al-Yakoob, M. M. Hassan, IIE Trans. 31: 395-406 (1999). This paper also addresses a crude oil marine transportation modeling problem. Again, the modeling problem characteristics are such that each voyage must consist of a single loading port and a single discharging port and each cargo must be a full vessel load. In addition, the objective is to minimize cost as opposed to net margin. The problem addressed in this paper is different from the preceding paper in that the problem in that the ships do not have to be the same size and there is an explicit treatment of vessel compartments.

None of the work above provides a marine transportation lifting program that represents general vessel scheduling business problem characteristics and/or constraints. For example, in a typical vessel scheduling problem, each voyage consists of multiple loading ports and multiple discharging ports, the cargos lifted may vary in weight and/or volume, and the vessels available to perform the voyage may vary in a number of ways including, but not limited to, capacity and charter type (e.g., spot vessels and term vessels).

Further, none of the work above provides a marine transportation lifting program that optimally maximizes the total net margin for a chartering party as opposed to merely minimizing cost. A cost minimization approach is inadequate as is does not correctly represent the economic impact of vessel assignment decisions, does not properly reflect the trade-offs between the use of term and spot vessels and does not value long and short voyages on a consistent basis.

Accordingly, as set forth below, a novel and creative computer application has been developed for making optimal transportation scheduling decisions. The application is able to determine the optimal solution to maximize total net margin for the assignment of vehicles (e.g., vessels) in an available fleet to perform a set of voyages reflecting common scheduling problem characteristics and constraints.

BRIEF DESCRIPTION OF THE DRAWINGS

The following is a general description of the detailed drawings that form part of this application:

FIGS. 3A, 3B, 3C, 3D, 3E, 3F, 3G, 3H, 3I, 3J, 3K, 3L, 3M, 3N, and 3O each illustrate separate data entry spreadsheets in a data entry workbook utilized in one embodiment of the invention; and FIGS. 3P, 3Q, 3R, 3S, 3T, 3U, 3V, 3W and 3X each illustrate separate pages of an application user interface for one embodiment of the invention.

Figure 1:
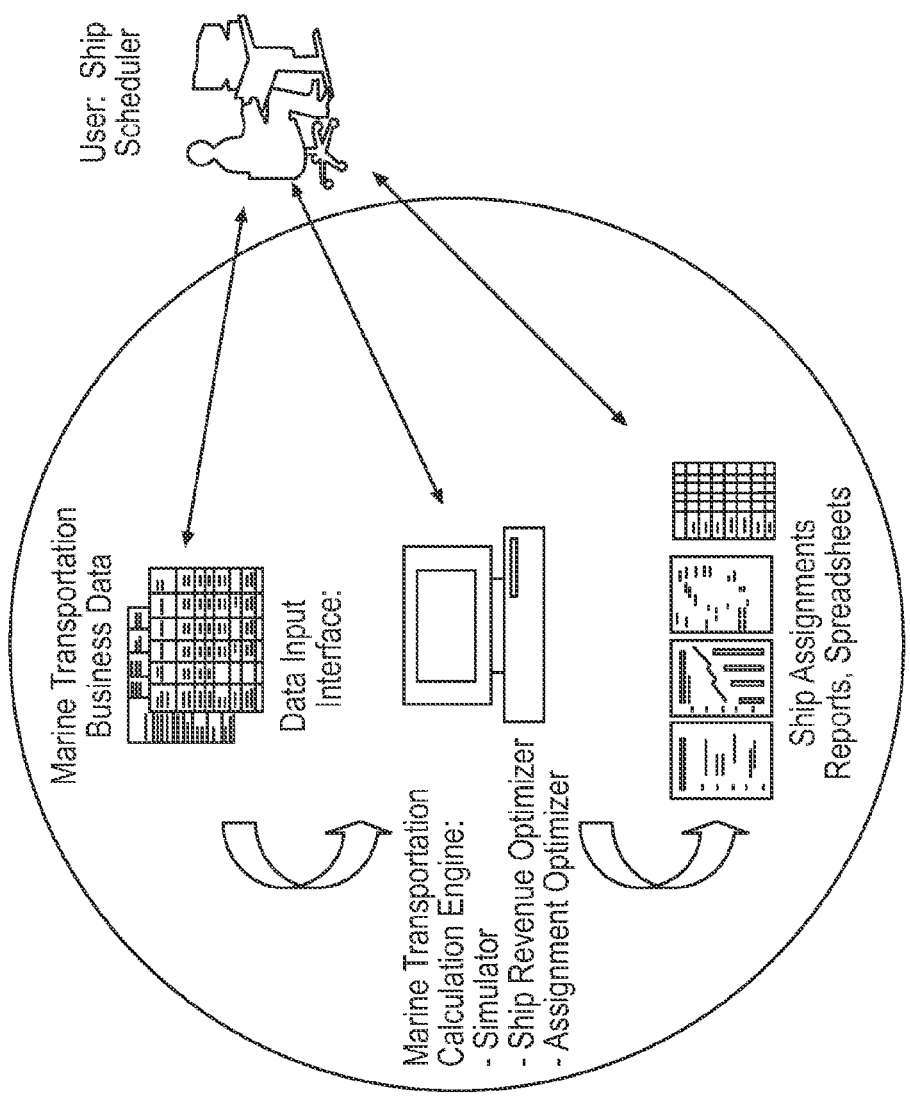
FIG. 1 depicts, in a general manner, the interaction between a user and a modeling application with its various interfaces and calculation engines in one embodiment of this invention.

The detailed drawings are provided for the purposes of illustration only. The particular data set forth in the various illustrative spreadsheets is hypothetical but representative data for a hypothetical but representative scheduling problem. Accordingly, the results derived there from are similarly hypothetical but representative.

SUMMARY OF THE INVENTION

This invention is directed to a computer application for the optimization of transportation scheduling, an apparatus comprising the same and a method for scheduling transportation employing the same. The application is particularly beneficial in the marine transportation field.

The computer application is able to determine the optimal solution to maximize total net margin for the assignment of vehicles (especially vessels) in an available fleet to perform a set of voyages. Each voyage in the set of voyages is initiated during a planning period and transports cargo comprising one or more bulk products from one or more loading locations (e.g., loading ports) to one or more discharging locations (e.g., discharging ports). In one embodiment, each vehicle may differ in differ in size, shape, capacity, cost and charter type (e.g., term vessels versus spot vessels).

The computer application considers a number of variables in determining the feasible options and optimal schedule of transportation vehicle/voyage assignments to produce the highest total predicted net margin. Typical variables that can be considered include, but are not limited to, the following: (1) the cargo capacity of each individual vehicle in the fleet, which is constrained by the cubic capacity and weight capacity of the vehicle and may vary between vehicles of the same class; (2) the different bulk products (e.g., grades of crude oil) being shipped and their densities; (3) the loading and discharging locations (e.g., ports), which can have different physical limitations (e.g., maximum draft, maximum vessel length and width, etc. . . . ); (4) the specific characteristics of each vehicle, such as draft and other parameters, that determine whether a vehicle can meet the constraints of the loading and discharging locations in the voyage; and (5) the different speed (e.g., laden speed and ballast speed) and fuel consumption of each vehicle. Preferably, all variables with appreciable affect on net margin are considered.

The application can be executed multiple times to explore sensitivities in input data, different assumptions and different assignment constraints. For example, the user can force the application model to assign a given vehicle to a given voyage and re-optimize the vehicle schedule using the forced assignment, which can be advantageous to represent decisions already made or to analyze the impact of forcing a vehicle assignment.

The application runs fast enough to evaluate opportunities in real-time (e.g., while a charter contractor is negotiating potential terms with a vessel owner) and to support what-if scenarios. In one embodiment, the application performs the calculations for a typical problem comprising twenty to fifty voyages and an equal or greater number of vehicles in five minutes or less, and typically less than one minute, running on an unimpeded 3 GHz single-processor personal computer.

DETAILED DESCRIPTION

Definitions

All words in this specification are intended to have their conventional meaning For further clarity, the conventional meaning of some terms used in this specification is set forth below:

"Bulk product" means any product that is unbound and substantially fluid as loaded; in other words, it is in a loose unpackaged form. Examples of bulk product include coal, grain and petroleum products.

"Code" embraces both source code and object code.

"Discharging," "demand" and "destination," with respect to locations such as ports, are used synonymously herein and mean a place where transported cargo is received.

"Loading," "supply" and "origin," with respect to locations such as ports, are used synonymously herein to mean a place where cargo is obtained for transportation.

"Net margin" is revenue or market value minus incurred cost.

"Spot vessels" are typically chartered for one voyage. In certain preferred embodiments herein, the phrase "spot vessel" can also embrace any vessel with similar short term availability.

"Term vessels" are chartered for a stipulated period of time. In certain preferred embodiment herein, the phrase "term vessel" can also embrace any vessel with similar long term availability (e.g., fully or partially owned vessels, time charters, bareboat charters, etc.).

"Vehicle" means any ship, barge, plane, train, truck or other mechanical means of transportation.

"Vessel" means any ship, barge or other water faring vehicle.

"Voyage" means any course of travel or passage, whether by land, sea or air, between two or more points.

The Model's Objective and Inputs

In one particularly preferred embodiment, the invention is a computer modeling application for the optimization of marine transportation scheduling. The application comprises code that, when executed, calculates the optimal solution to maximize total net margin for the assignment of vessels in an available fleet to perform a set of voyages. Each voyage is initiated during a planning period and transports cargo comprising one or more bulk products.

The total net margin is derived from the individual net margins for each vessel/voyage assignment. Preferably, the total net margin is the sum of the individual net margins for each vessel/voyage assignment. Each individual net margin for a vessel/voyage assignment is, in turn, derived from the market value for the voyage using a notional vessel and a predicted incurred cost for the voyage using the assigned vessel. Obviously, since the application deals with forward projections, each individual net margin, and the total net margin based thereon, is a calculated prediction since (1) the incurred cost, which cannot be known for certain until a vessel has completed a voyage, must be predicted and (2) the market value for each vessel-voyage pairing is based on ever changing market conditions.

The vessel fleet can be heterogeneous. For example, each vessel in the fleet can differ in size, shape, cargo carrying capacity, etc.

In addition, the vessel fleet may differ in economic costs. For example, the fleet may comprise any combination of term vessels, owned vessels, bareboat charters, spot vessels, etc. Preferably, the fleet comprises both term vessels and spot vessels. In one preferred embodiment, each vessel in the fleet, regardless of the economic basis of its charter party, is classified as either a term vessel or spot vessel. In this instance, vessels that are available for multiple assignments (e.g., fully or partially owned vessels, time charters, bareboat charters, etc.) are typically classified as term vessels and vessels that are available for only one assignment are typically classified as spot vessels.

The voyage definitions, including the ports visited and cargo carried therein, can also be heterogeneous. Each voyage definition specifies the attributes and/or associated constraints that are relevant to the problem. These attributes and constraints can include, but are not limited to, the following: (1) the ports that need to be visited; (2) the identity and volume of the specific bulk product(s) that need to be loaded or discharged at each port; (3) upper and lower tolerances for the amount of cargo to be loaded or discharged at each port; and (4) the permitted time window within which the loading or discharging must take place at each port. Each voyage definition can consist of visits to multiple loading ports and discharging ports and can have a cargo that consists of multiple types of bulk product (e.g., different grades of crude oil). Accordingly, in one embodiment, each voyage comprises a loading segment where one or more bulk products are loaded from one or more supply ports within port specific quantity ranges and within port specific loading periods and an discharging segment where one or more bulk products are discharged at one or more demand ports within port specific quantity ranges and port specific discharging periods.

Preferably, the total cargo loaded equals the total cargo discharged in each voyage. Accordingly, in one embodiment, the total amount of each bulk product loaded in the loading segment equals the total amount of each bulk product discharged in the discharging segment. However, it is also possible to account for scenarios where cargo is already on a vessel prior to a voyage or maintained on a vessel at the end of a voyage.

The application considers numerous variables in determining the optimal schedule of vessel/voyage assignments to produce the highest total net margin. In one embodiment, the application considers vessel capacities, bulk product densities, the interaction between port constraints and vessel size and shape, vessel speed and fuel consumption. More particularly, the cargo capacity of each individual vessel may differ in cubic (i.e., volumetric) capacity as well as weight capacity. This is true even for vessels within the same class such as very large crude carrier (VLCC) vessels. In addition, the different bulk products (e.g., different grades of crude oil) being shipped typically have different densities that affect how much product can be carried. The different loading and discharging ports will have different physical limitations (e.g., maximum draft, maximum vessel length and width, etc. . . . ) for vessels that utilize the port. The specific physical characteristics of each vessel, such as draft and other parameters, determine whether a vessel can meet the port constraints for a voyage. Finally, the laden speed, ballast speed and fuel consumption of each vessel also impacts net margin. Preferably, all variables with an appreciable affect on net margin are considered.

If certain voyages are short enough that a vessel can perform a sequence of consecutive voyages initiated within a given planning period (e.g., a month), then term vessels and similar long term vessels in the fleet can be assigned to multiple sequential voyages for the planning period. Typically, in this embodiment, the category "term vessel" will embrace any vessel that is available for multiple assignments, including time charters, fully and partially owned vessels, bareboat charters, etc. However, such multiple voyage assignments can only be made if the term vessel can meet each and every constraint, including temporal constraints, port constraints, etc., for each voyage in the multiple voyage assignment. Spot vessels are not typically allowed to perform multiple voyages because they are usually hired on a single voyage basis. Similarly, ships with charter terms that provide similar short term availability (i.e., ships that are essentially spot ships) are not typically allowed to perform multiple voyages.

In one embodiment, the one or more bulk products are liquid bulk products. Preferably, the one or more bulk products are one or more different grades of a petroleum or petroleum derived products, such as crude oil, LNG, diesel, gasoline, etc. . . . More preferably, the one or more products are one or more different grades of crude oil. In the case where the bulk products are crude oils, the demand ports are typically refineries or ports that service refineries. One particular business application of this invention is the optimization of crude carriers such as VLCCs for the transportation of crude oil (or similar petroleum liquids) from source locations to refinery locations.

The product of the application is a recommendation for vessel-to-voyage assignments (i.e., a lifting program) that maximizes total net margin. Accordingly, the application is a tool to be utilized by vessel schedulers. In one embodiment, the tool, upon running to completion, provides the marine transportation scheduler with the following information: (1) the feasible vessels (based on timing, capacity, etc. . . . ) from the fleet of available vessels for each assignment; (2) a recommendation for the vessel/voyage assignments; (3) the volume and weight of the each bulk product (e.g., each grade of crude oil) to be loaded and discharged in each leg of a recommended vessel/voyage assignment; (4) the timing for each port visit and the load and discharge events in each recommended vessel/voyage assignment; (5) the net margin for each recommended vessel/voyage assignment; (6) the total net margin for the recommended vessel/voyage assignments; and (7) the fleet schedule and forward position of term ships.

The Model's Hardware and Software

The modeling application runs on a conventional computer processor (e.g., a 3 GHz single-processor personal computer). The processor can, but does not have to be, a single standalone processor. The processor can also be a collection of interactive processors connected directly to one another or a collection of interactive processors connected indirectly to one another over a computer network (e.g., a local area network or the internet).

The application contains a data entry and storage device interface. The data entry storage interface may be integral to, or interface with, the application. Data entry and storage for the application can be accomplished in a number of ways. The application can use Excel, or another type of spreadsheet software, as the data entry and storage interface. Alternatively, an ERP (Enterprise Resource Planning) system, such SAP, Oracle, and JD Edwards, or a business data warehouse (BDW), or other types of business applications can be utilized.

The application comprises code that defines calculations, simulations, and math models, and calls upon an optimization solver which is integral to, or interfaces with, the application to solve the math models. Preferably, the code is written using modeling system software such as AIMMS, GAMS, ILOG OPL, AMPL, or XPress Mosel. However, the code could also be written using any computer programming language including C++. In one embodiment, the application is written using AIMMS and employs an AIMMS user interface. Preferably, the solver is capable of solving linear programming and mixed integer (linear programming) problems. Preferred solvers include CPLEX, XPress, KNITRO and XA.

The recommendation generated by the application is the optimal solution to maximize total net margin for the assignment of vessels in an available fleet to a set of voyages to transport cargo comprising one or more bulk products. The recommendation can be exported and saved as a file using any of the data entry and storage applications discussed above (e.g., Excel, ERP, BDW, etc. . . . ).

In one preferred embodiment, data entry and storage is accomplished using an Excel interface and the program is written in the AIMMS modeling language and calls upon a CPLEX solver to solve the math modeling problems in the program. In this embodiment, the program utilizes an AIMMS interface for execution and output. The results can then be transferred (e.g., exported or copied) back to Excel and stored as an Excel file.

FIG. 1 illustrates the interaction between a user and the modeling application, with its various interfaces and calculation engines, in a preferred embodiment of the invention. A user (e.g., a "Ship Scheduler") inputs "Marine Transportation Business Data" including, inter alia, data pertaining to desired voyages, the available vessels, and the planning period to be optimized. The data is input using a "Data Input Interface"—such as an Excel workbook. The data is then exported into a "Marine Transportation Calculation Engine" (i.e., the model) which determines the optimization of assignments to maximize total net margin. The results, which can then be stored, include the recommended "Ship Assignments" and other information in the form of "Reports, Spreadsheets" etc.

Accordingly, one embodiment of the invention is an apparatus. The apparatus comprises a processing device selected from a single processor, multiple interactive processors connected directly to one another, or multiple interactive processors connected indirectly to one another over a computer network. The apparatus also includes the computer modeling application for the optimization of marine transportation scheduling. Further, the apparatus includes a data entry and storage application that is either part of, or integrally connected to, the computer application, for inputting data comprising, but not limited to, the desired voyages, the available vessels, and the planning period to be optimized. Finally, the apparatus includes a solver that is integral to, or interfaces with, the modeling application, capable of solving linear programming problems and mixed integer (linear) programming problems.

The Model's Calculation Engine

The calculation engine can solve the model as one large problem or a series of smaller component problems. Preferably, to improve computation performance, the overall optimization problem is divided into subparts. In this embodiment, the application first determines each feasible vessel/voyage assignment based on temporal and physical vessel/voyage constraints, then the optimal individual net margins for each feasible assignment, and then the optimal combination of feasible assignments to maximize the total net margin. It is also preferable to break the problem into at least one linear programming portion and at least one mixed integer (linear) programming portion. However, it is also possible to modify the application by combining some or all of the subparts and mathematical programming portions.

FIG. 1 identifies a "Marine Transportation Calculation Engine" (i.e., the model) that includes a "Simulator," a "Ship Revenue Optimizer" and an "Assignment Optimizer." These terms refer, by function, to separate portions in the code in one preferred embodiment of the model. The main purpose of the Simulator is to consider the available fleet of vessels and the needed voyages and determine the single voyage/vessel assignments and multiple voyage/term vessel assignments that are feasible given vessel constraints and voyage constraints. The main purpose of the Ship Revenue Optimizer is to take the Simulator output one step further to determine, as one or more linear programming problems, the maximum cargo revenue that each feasible single vessel/voyage assignment can earn subject to known constraints. Net margin for each feasible single vessel/voyage assignment and each feasible multiple voyage/term vessel assignment can then be calculated by another portion of the code based on the Ship Revenue Optimizer output. The Assignment Optimizer then determines, as one or more mixed integer (linear) programming problems, the optimal solution to maximize total net margin for the assignment of vessels to the set of voyages using the feasible single vessel/voyage assignments, the feasible multiple voyage/term vessel assignments and the corresponding individual net margins for each feasible assignment. Each of these portions of code may or may not be contiguous to one another and each of these portions of code can be broken into subparts that may or may not be contiguous to one another.

Decomposing the problem into a simulation step, a revenue optimization step, a net margin calculation step and a vessel assignment step is one means of achieving suitable run-time performance. When the code is decomposed in this manner, the application can perform the calculations for a typical problem comprising twenty to fifty voyages and an equal or greater number of vessels in five minutes or less, and typically less than one minute, running on an unimpeded 3 GHz single-processor personal computer. The simulator, the Ship Revenue Optimizer and the Assignment Optimizer portions of the code are all discussed with more particularity below.

i. The Simulator

The main purpose of the Simulator is to determine which vessels in the available fleet are candidates for each voyage in the set of voyages. The Simulator must determine which vessels are feasible (i.e., capable) of performing a voyage based upon temporal and physical vessel and voyage constraints. For each voyage, the Simulator looks at each vessel in the available fleet and determines whether the vessel can perform the voyage load and discharge tasks given the necessary time windows and port constraints in the voyage.

First, the Simulator determines which vessels are feasible based on voyage temporal requirements. A voyage definition specifies time windows within which a load or discharge event must start. The Simulator performs a forward projection in time to predict when a given vessel can perform the voyage tasks. This includes a projection of when the vessel can arrive at the first loading port in the voyage. For example, for a spot vessel, the input data for the forward projection includes an estimated time of arrival (ETA) at a specified location and lay period provided by the vessel owner; and for a term vessel the input data includes an estimated time of departure from a specified location (ETD). The forward projection considers known distances, vessel speeds, loading and discharging rates, canal passage time, fueling time, and berthing and de-berthing time. The Simulator will determine if a vessel can complete each of the load and discharge tasks within the specified time windows. If so, the vessel is kept as a potential candidate pending the evaluation of the voyage constraints. Otherwise, the tool identifies the event which does not meet the time window. The tool allows the user to specify an upper threshold, anywhere from zero up, representing the degree to which a vessel can miss a time requirement of each portion of the voyage and still be considered feasible.

In addition, when considering voyages for a current planning month, there are opportunities in which short voyages can occur in sequence and be covered by a single term vessel or its equivalent. The forward projection of the simulator is implemented such that it will identify voyage combinations for a single term vessel that are feasible. The tool must first determine if two voyages can occur in sequence (e.g., if the time windows for the first load events of a voyage occur after the time window for the last discharge event of another voyage). For pairs of voyages that can occur in sequence, the calculation engine must determine if each vessel can satisfy all the time window constraints for the two voyages. This is accomplished by continuing the forward projection in time so as to simulate a sequence of voyage 1 and voyage 2. The same methodology is performed for voyage combinations that contain three or more voyages in sequence. The nature of the business problem is such that voyages can vary in length greatly, and the optimal assignment must consider not only the assignment of one voyage to a term vessel, but the assignment of voyage combinations (one or more voyages) to each available term vessel. Multiple voyage assignments do not typically apply to spot vessels which are generally hired for only one voyage. Similarly, multiple voyage assignments do not typically apply to ships with charter terms that provide similar short term availability (i.e., ships that are essentially spot ships).

Second, the simulator must determine which vessels are feasible based on the voyage physical constraints. Voyage physical constraints can include: the volumetric capacity of a vessel, the deadweight (DWT) capacity of a vessel, maximum and/or minimum vessel draft upon arrival and/or departure at the loading and/or discharging ports, maximum vessel displacement upon arrival and/or departure at the loading and/or discharging ports, and other business constraints which might prohibit a vessel from visiting a given port. In a preferred embodiment, the tool accounts for the density of the various cargo types (e.g., crude grades) and tolerances for the specified load volumes. The calculation then determines the draft for each vessel based on each load and discharge event and the associated cargo weight to check for feasibility.

In addition, if a single term vessel (or equivalent long term hire) can meet the temporal requirements for multiple voyages, the calculation engine checks to insure that the term vessel is also feasible for the physical constraints of the multiple voyage combination. In other words, to be feasible for a combination of two or more voyages, a term vessel must be able to meet the relevant capacity and port restrictions, etc. of each of the component voyages.

The result obtained by the simulator is a set of feasible single voyage/vessel and multiple voyage/term vessel pairs based on the input data for the voyages and available vessels. This forms the basis for the full multiple voyage assignment optimization.

ii. The Ship Revenue Optimizer

The Ship Revenue Optimizer builds on the results of the Simulator. The Ship Revenue Optimizer takes the feasible single voyage pairings and determines the maximum cargo revenue each pairing can earn subject to the known voyage constraints.

Given a set of feasible pairings, the Ship Revenue Optimizer calculates the maximum cargo revenue that each feasible pairing can obtain. Cargo revenue is a function of the cargo weight. Typically, a voyage specifies an amount range (e.g., volume range), rather than a specific quantity, for each cargo of bulk product that must be loaded or discharged at each port in the voyage. A feasible vessel may or may not be able to transport the maximum required amount of product throughout the voyage and remain feasible. Accordingly, the Ship Revenue Optimizer, using voyage constraints and product densities to the extent necessary, determines the maximum total cargo that each pairing can transport without violating the vessel and/or port constraints and then calculates cargo revenue using the following formula:

$$CRev_{MAX} = FR*(WS_{MARKET}/100)*C$$

where "$CRev_{MAX}$" is the maximum cargo revenue for the vessel-voyage pairing, typically in U.S. dollars, "FR" is the voyage flat rate (i.e., Worldscale100 rate for the voyage), typically in U.S. dollars per ton, $WS_{MARKET}$ is the market Worldscale rate expressed as a percentage and "C" is the maximum total tons of cargo that the vessel can carry without violating vessel and/or port constraints for the voyage(s).

The Ship Revenue Optimizer is preferably implemented as an LP (linear programming problem). Thus, the Ship Revenue Optimizer does not need to consider which vessels to assign to which voyages. Rather, it considers each feasible vessel assignment and maximizes the corresponding cargo revenue. The recognition that the revenue optimization is completely decoupled from the assignment optimization permits one to develop a viable and tractable set of calculations which can be accomplished either in: (a) one LP which represents the complete set of feasible vessel-voyage pairings, or (b) N smaller LPs where N is the number of feasible vessel-voyage pairings in which each LP problem corresponds to one vessel-voyage pairing. Both approaches yield the same result, and the difference between the approaches is not significant in terms of computation run-time. A suitable LP solver, such as CPLEX, XPress, XA, KNITRO, etc., can be used to solve the LP problem.

iii The Assignment Optimizer

The Assignment Optimizer determines the actual combination of vessel assignments that yields the highest total net margin. Preferably, the Assignment Optimizer is implemented as one or more mixed integer (linear) programming (MILP) problems. More preferably, the Assignment Optimizer includes a mixed integer (linear) programming portion that maximizes total net margin for vessel voyage assignments under the constraint that spot vessels and the like can only be assigned to single voyages but term vessels and the like can be assigned to multiple sequential voyages.

The decision variables in the Assignment Optimizer are which vessels to assign to which voyages. These are yes/no (discrete) decisions, and can be represented using binary variables (0/1 variables) in an MILP model. The objective function is maximization of total net margin, where total net margin refers to the sum of the net margins for each assigned voyage-vessel combination (where a voyage combination is a sequence of one or more voyages). Each voyage should have one vessel assigned. Each vessel can do at most one voyage at a given time, but a term vessel or the like can be assigned to a sequence of two or more voyages. Thus, the assignment optimizer requires the net margin for each feasible voyage-vessel pair as an input. For feasible voyage combinations, the calculation engine determines the net margin for feasible voyage-combination and vessel pairs. Given this, the MILP model can be solved to produce the vessel assignment that yields the maximum net margin. A suitable MILP optimization routine using CPLEX, XPress, XA, KNITRO or another other MILP solver can be used to solve the MILP problem.

One input to the Assignment Optimizer MILP model is the net margin for each feasible vessel-voyage pair. The Ship Revenue Optimizer produced the maximum cargo revenue for each voyage-vessel pair. The net margin for each voyage is the market value for the voyage, which reflects the maximum cargo revenue and typically other financial factors such as a net hire value for term vessels (explained below), minus the incurred costs for using the vessel on the voyage. In other words, the net margin for each voyage pair can be determined by the following formula:

$$NM = MV - IC$$

where "NM" is the net margin, MV is the market value for the voyage and "IC" is the incurred cost of performing the voyage using the term vessel or spot vessel. Again, each individual net margin for each feasible vessel-voyage pairing is a calculated prediction because (1) the incurred cost, which cannot be known for certain until a vessel has actually completed a voyage, must be predicted and (2) the market value for each vessel-voyage pairing is calculated based on market conditions.

In a preferred embodiment, the market value for each feasible term vessel assignment, but not each feasible spot vessel assignment, includes a net hire value. In addition, in a preferred embodiment, the incurred cost for feasible term vessel assignments and feasible spot vessel assignments are calculated differently. For the purposes of illustration, calculations that can be used in this embodiment of the invention to estimate market value and incurred costs for feasible vessel-voyage pairs are set forth below.

First, the market value for each feasible spot vessel assignment can be calculated using maximum cargo revenue and other relevant financial information. More particularly, the estimated market value for each feasible spot vessel assignment can be calculated as follows:

$$MV_{SPOT} = CRev_{MAX} + CT_{UNDIS} + DC_{IDEAL}$$
$$= [FR * (WS_{MARKET} / 100) * C] + CT_{UNDIS} + DC_{IDEAL}$$

where "$MV_{SPOT}$" is the estimated market value for the voyage using a spot vessel, "$CRev_{MAX}$" is the maximum cargo revenue for the vessel-voyage pairing typically in U.S. dollars, "$CT_{UNDIS}$" is the applicable laden and ballast voyage canal tolls for the voyage that would be paid to a notional spot vessel having the same characteristics as the spot vessel to perform the voyage, "$DC_{IDEAL}$" is the market demurrage cost (i.e., market demurrage daily rate times demurrage days) for the voyage assuming a best case scenario where a spot vessel incur no demurrage costs waiting ahead of the supply dates at the first supply location in the loading segment of the voyage, "FR" is the voyage flat rate (i.e., Worldscale100 rate for the voyage) typically in U.S. dollars per ton, $WS_{MARKET}$ is the market Worldscale rate (expressed as a percentage), "C" is the maximum total tons of cargo that the vessel can carry without violating vessel and/or port constraints for the voyage.

Second, the calculation of the incurred cost for each feasible spot vessel assignment is calculated in a similar manner to the market value, except that market cost terms are replaced with corresponding incurred cost terms. More particularly, the predicted incurred costs for each feasible spot vessel assignment can be calculated in the following manner:

$$IC_{SPOT} = FR*(WS_{EXP}/100)*[(PCMin)+(Ov*OvRate/100)]+DC_{EST}+CT_{UNDIS}+LS$$

where "$IC_{SPOT}$" is the predicted incurred cost for the voyage using the spot vessel, "FR" is the voyage flat rate (i.e., Worldscale100) typically in U.S. dollars per ton, "$WS_{EXP}$" is the spot vessel's expected Worldscale rate for the voyage expressed as a percentage, "PCMin" is the part-cargo minimum requirement, in kilotons, which the spot vessel owner charges even when the vessel is loaded with less cargo, "Ov" is the overage (i.e., the amount of cargo loaded beyond the PCMin), "OvRate" is the percentage rate discount, if any, the spot vessel owner offers from the freight cost for shipping cargo in excess of the PCMin, "$DC_{EST}$" is the estimated actual demurrage costs (i.e., the vessel's demurrage costs times estimated demurrage days) incurred if the spot vessel is assigned the voyage, "$CT_{UNDIS}$" is the applicable laden and ballast voyage canal tolls for the voyage that would be paid to a notional spot vessel having the same characteristics as the spot vessel to perform the voyage and "LS" is any lump-sum cost term (e.g., if the vessel is hired based on a lump sum rather than a Worldscale rate). The Simulator's forward projection has calculated the timing of all the voyage events (load, discharge, travel, port time) and thus has also calculated demurrage days. Demurrage cost, PCMin, overage percentage rate, and Worldscale rate are all input data. In one embodiment, the Simulator includes an estimation of voyage flat rate based on estimate port fees, voyage distances, bunker fuel usage, and other relevant factors. Alternatively, voyage flat rate can be obtained from publicly available indices and input separately. Therefore, since the Ship Revenue Optimizer has already calculated the kilotons of cargo, the spot vessel cost can be calculated.

Third, the market value for each feasible term vessel assignment can be calculated in the same manner a spot vessel plus a net hire value (defined below). More particularly, the estimated market value for each feasible term vessel assignment can be calculated as follows:

$$MV_{TERM} = CRev_{MAX} + CT_{UNDIS} + DC_{IDEAL} + NHV$$
$$= [FR*(WS_{MARKET}/100)*C] + CT_{UNDIS} + DC_{IDEAL} + NHV$$

where "$MV_{TERM}$" is the estimated market value for the voyage using a term vessel, "$CRev_{MAX}$" is the maximum cargo revenue for the vessel-voyage pairing typically in U.S. dollars, "$CT_{UNDIS}$" is the applicable laden and/or ballast voyage canal tolls for the voyage that would be paid to a notional spot vessel having the same characteristics as the term vessel to perform the voyage, "$DC_{IDEAL}$" is the market demurrage cost (i.e., market demurrage daily rate times demurrage days) for the voyage assuming a best case scenario where a spot vessel incur no demurrage costs waiting ahead of the supply dates at the first supply location in the loading segment of the voyage, "NHV" is a net hire value assigned to a term vessel that performs the voyage calculated using a daily rate for each day the term vessel is available after the term vessel has completed its assigned voyages for the planning period and a specified start date for incurring the daily rate has been reached, with the daily rate continuing until a specified end date, "FR" is the voyage flat rate (i.e., Worldscale100 rate for the voyage) typically in U.S. dollars per ton, $WS_{MARKET}$ is the market Worldscale rate expressed as a percentage, and "C" is the maximum total tons of cargo that the vessel can carry without violating vessel and/or port constraints for the voyage.

The net hire value mentioned above is derived from a daily rate that the application assumes the term vessel earns after both of the following events occur: (a) the term vessel has reached the end of its assigned voyages for a planning period and (b) a specified date for beginning to incur the daily rate has been reached. The daily rate accrues until a specified end date. Net hire value is used to represent the potential future earnings a term vessel can earn if available for future planning periods upon completion of its assigned voyages for the current planning period. Term vessels (e.g., term charters, owned vessels, etc.) are available for some period of time which often extends beyond the planning period that the input voyages are initiated within. Thus, it is likely that these vessels will be assigned to future voyages that are beyond the time horizon of the voyages under consideration during any given planning period. Having term vessels available for such future assignments has an intrinsic value that the net hire value attempts to estimate. The simulation step has calculated a forward projection for each single voyage and multiple voyage/vessel pairing, and thus the completion time for each pairing is known. The tool establishes, or the user assigns, a temporal reference point (i.e., an end of optimization horizon) after which the daily rate for accumulating net hire value will begin. Where the temporal reference point is placed is up to the user (i.e., the scheduler), but it is typically placed at some point after the last voyage in the set of voyages that need to assigned should begin. When a term vessel's voyages are complete, and the reference point has been reached, the term vessel earns an assigned daily rate, called the net hire rate, for the remainder of the model time horizon (i.e., up to the end of the economic horizon). The net hire value is the product of the net hire daily rate multiplied by the number of days the daily rate is earned during the model time horizon.

Fourth, for each feasible term vessel assignment, the predicted incurred cost can be calculated based on fuel consumption, port fees, and canal fees. More particularly, the predicted incurred cost for each feasible term vessel assignment can be calculated as follows:

$$IC_{TERM} = FCON + PF + CT_{DIS}$$

where "$IC_{TERM}$" is the predicted incurred cost for the voyage if it is assigned to the term vessel, "FCON" is the fuel consumption costs for the voyage if it is assigned to the term vessel, "PF" is the port fees for the voyage and "$CT_{DIS}$" is the laden and ballast voyage canal tolls for the voyage after accounting for any discount. The simulator has projected all the voyage events, and the term vessel input data includes term vessel speeds (laden and ballast), fuel consumption (laden, ballast, at port, during canal passage). Input data also includes port fees, and parameters to estimate canal fees. Thus, the term vessel cost can be calculated.

The individual net margin can now be calculated for each feasible spot vessel and term vessel assignment. As stated, the individual net margins are the market value minus the incurred cost.

With respect to feasible multiple voyage/vessel assignments, all the concepts described previously remain valid and the concept of net margin is still applicable. The net hire value revenue component is calculated based on completion of the last voyage in a multiple voyage sequence. The fuel consumption is calculated based on the laden portion of each voyage plus the ballast portion between consecutive voyages. Other cost and revenue terms are additive when applied to a multiple voyage combination. Finally, the MILP vessel assignment optimization model includes constraints to ensure that each term vessel is permitted to do no more than one voyage combination (where a combination can consist of one or more consecutive voyages). Each voyage must have a vessel assigned (as before). The objective function remains maximization of total net margin. The result is a multiple voyage vessel assignment optimizer which maximizes the total net margin.

Thus, the assignment optimizer is used to generate optimal vessel assignments. Alternate solutions may also be obtained corresponding to permutations of the base assignment problem in which additional restrictions are applied which limit or restrict the allowed assignments. This is process allows the user (i.e., the scheduler) to analyze and compare an optimal assignment to alternate assignments which include various user specified restrictions. The output from the vessel assignment optimization tool is one or more recommended vessel assignments, and this is the basis for developing the optimal lifting program.

A Work Process Using the Model

One embodiment of the invention is a work process for marine transportation scheduling that uses the modeling application previously described. In one embodiment, the first step in the method is inputting and/or modeling options into a database system. The database system is integral to, or interfaces with, the modeling application for marine transportation scheduling. In this embodiment, the second step is to run the application to solve the mathematical model after the data and/or modeling options are input using an optimization problem solver to obtain a recommended schedule of vessel to voyage assignments. In this embodiment, the third step, which is optional, is to repeat the preceding steps one or more times with different data restrictions to obtain one or more alternative schedules. Finally, the fourth step in this embodiment is to assign vessels in the fleet to perform the set of voyage during the planning period, based on a recommended schedule generated by the mathematical model.

Figure 2A:
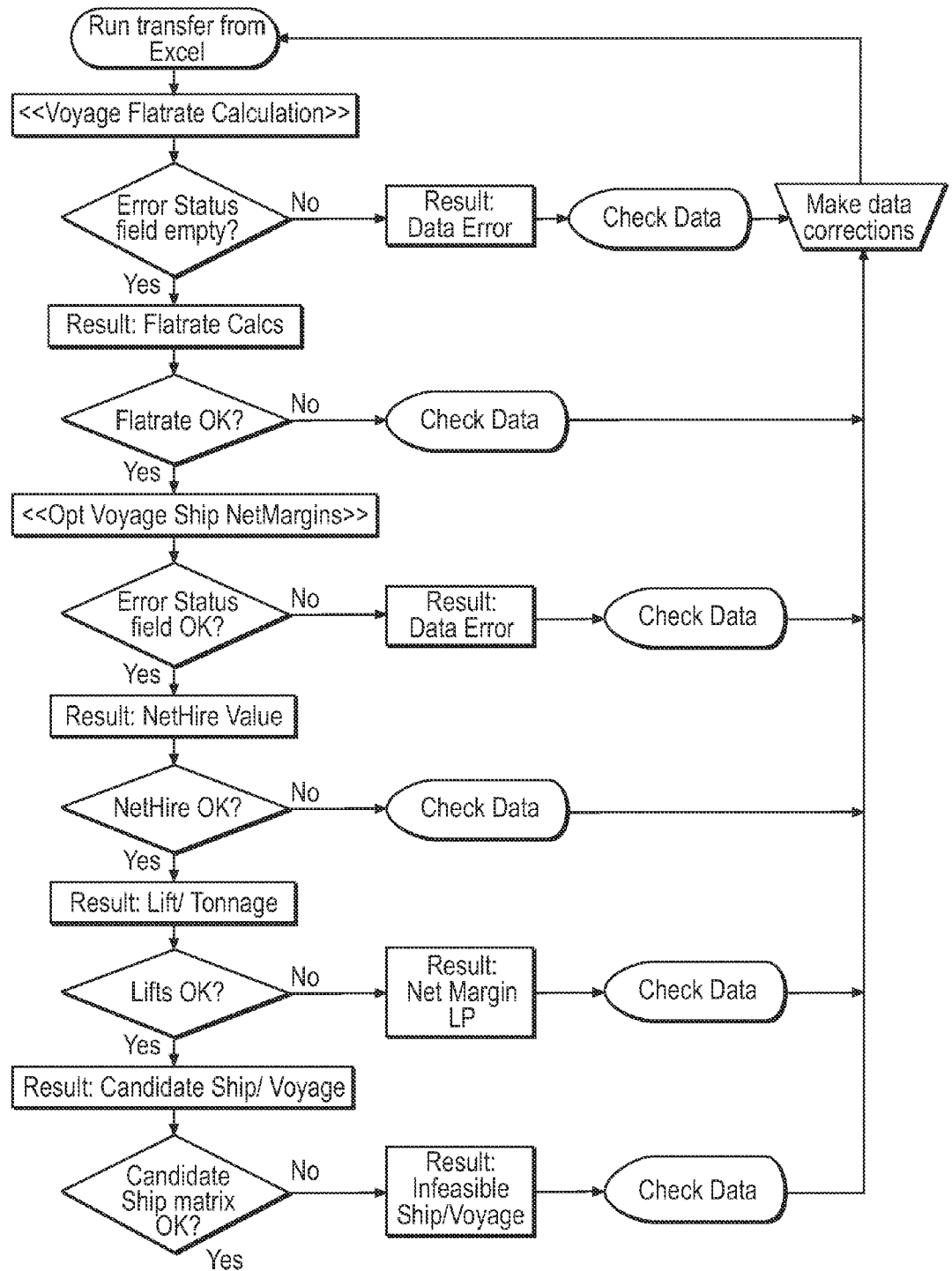
FIGS. 2A and 2B. jointly, provide a flow chart that illustrates the work flow for using one embodiment of the invention.
Figure 2B:
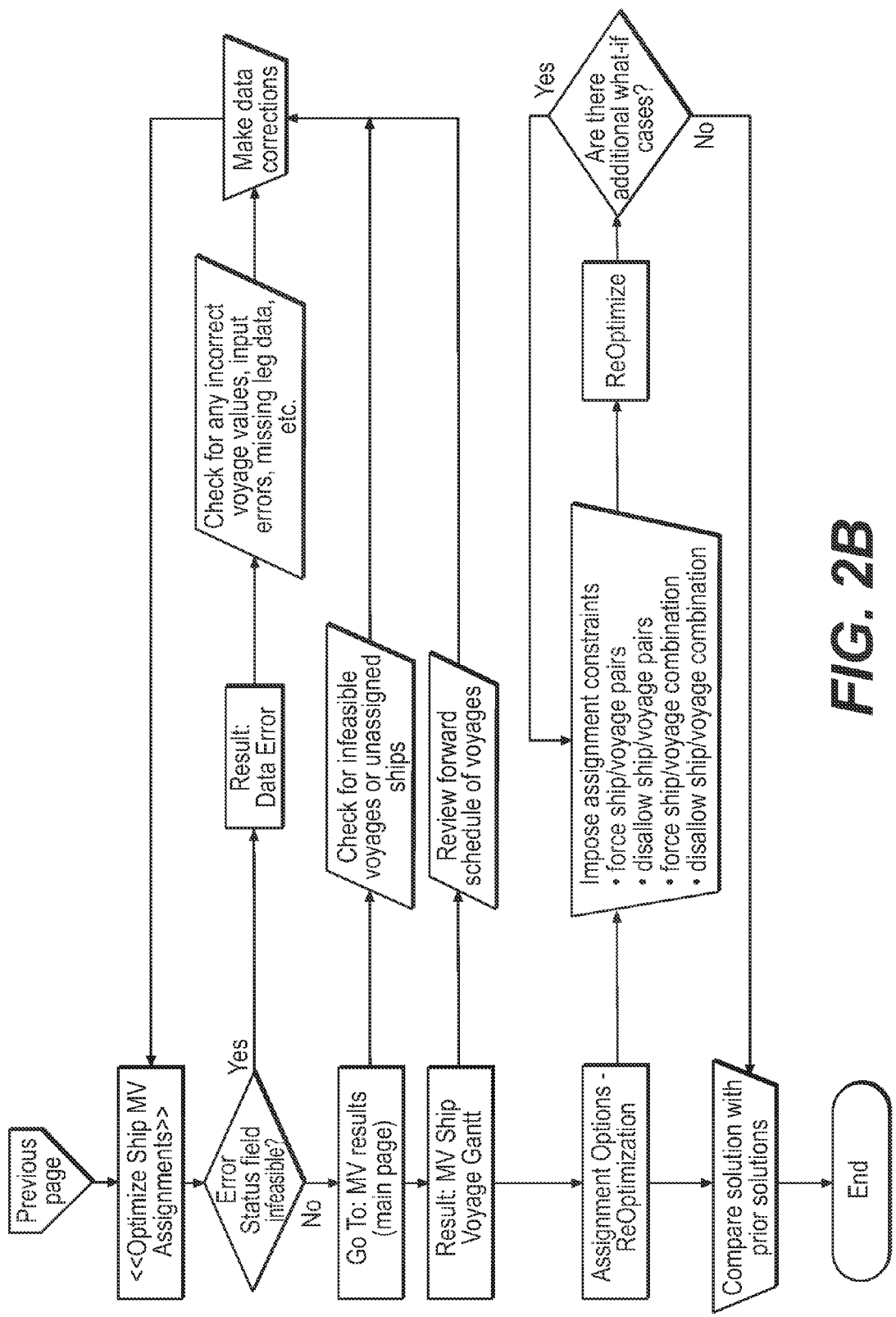

More particularly, FIG. 2A is one part of a two-part diagram that illustrates user interaction with, and the steps performed by, the vessel optimization application. FIG. 2B is the second part of the two-part diagram.

In FIG. 2A and FIG. 2B, the rectangular boxes denote steps or processes and diamonds denote check points to determine if problem inputs are valid or not. Labels that use "<<" indicate a tool calculation step. For example, <<Voyage Flatrate Calculation>> is the step in which the tool estimates flat rates for all the voyages. Flat rates can be calculated or obtained from publicly available indices. Labels that use "Result:" indicate a step in which the user is reviewing results. For example, the box labeled "Result: Lift/Tonnage" is a set of results which display the maximum cargo in kilotons that has been determined for each feasible vessel-voyage assignment.

In FIG. 2A, the first step is "run transfer from Excel." In this step, the required problem data is transferred from an Excel file or some other data input and storage application file to the optimization application.

The second step is "<<Voyage Flatrate Calculation>>." In this step, the flat rate for each voyage is either estimated or entered. Preferably, the flat rates are estimated (as discussed below). However, the flat rates can also be obtained from a commercial service such as Worldscale. The result of this step will either be a data error or an indicator of successful completion. If the result is a data error, the user checks the data for, inter alia, incorrect voyage values, input errors, missing leg data, etc., returns to the data input and storage file to make the corrections and restarts the process.

Preferably, the flat rates are estimated. In such a case, the flat rate calculation is the estimated cost for a particular voyage (Est_Cost) in dollars divided by the estimated cargo for a particular voyage (Est_Cargo) in tons. The estimated cost for a particular voyage is the sum of the port charges, bunker fuel cost and vessel hire cost therein. Port charges are the sum of the port charges for each port visited in the voyage. Bunker fuel cost is the cost of the fuel consumed while steaming, while at port and while transiting a canal (if relevant) plus a fixed consumption amount per voyage (i.e., a fixed amount plus the product of a variable amount based on the number of days for steaming, at port and transiting a canal multiplied by a fuel consumption rate). Vessel hire cost is a fixed rate multiplied by an estimate of the number of days required for a voyage based on the days spent at port, transiting a canal (if relevant) and steaming.

The third step is to review the flat rate calculations. The user has an opportunity, which the user does not need to accept, to review and change the flat rates. If the flat rates appear to be acceptable, the user continues the process. If the flat rates appear incorrect, the user checks the data for, inter alia, incorrect voyage values, input errors, missing leg data, etc., returns to the data input and storage file to make the corrections and restarts the process. The user can also replace the estimated flat rates.

The fourth step is "<<Opt Voyage Ship NetMargins>>." In this step, the feasible and infeasible single vessel/voyage and multiple vessel/voyage assignments are identified, the maximum cargo revenue for each feasible assignment is determined and the net hire value for each feasible assignment is determined. The result of this step will either be a data error or an indicator of successful completion. If the result is a data error, the user checks the data for, inter alia, incorrect voyage values, input errors, missing leg data, etc., returns to the data input and storage file to make the corrections and restarts the process.

The fifth step is to review the net hire values for each feasible vessel/voyage assignment, the maximum cargo revenue for each feasible vessel/voyage assignment, and the feasible (or "candidate") vessel voyage assignments, in that order. If everything appears in order, the user continues the process. If the net hire calculations appear incorrect, the user reviews, inter alia, the relevant daily rates and the voyage schedules, returns to the data input and storage files to make any necessary corrections, and restarts the process. If the maximum cargo revenue calculations appear incorrect, the user checks, inter alia, the limiting constraints on the vessel and voyage ports, returns to the data input and storage files to make any necessary corrections, and restarts the process. If the candidate vessel/voyage matrix appears in incorrect, the user checks, inter alia, the dates and volumes required on the voyage and the input vessel availability information, returns to the data input and storage files to make any necessary corrections, and restarts the process.

In FIG. 2B, "MV" denotes multiple voyage, and the sixth step "<<Optimize Ship MV Assignment>>" is the calculation step in which the tool is used to calculate the vessel assignments which maximize the total net margin (this involves the solution of the MILP optimization problem described previously). The result of the sixth step will either be a data error or an indicator of successful completion. Again, if there is a data error, the user needs to review the underlying data to check for incorrect voyage values, input errors, missing leg data, etc. and make data corrections.

In FIG. 2B, the seventh step is the step where results are viewed. The rectangle labeled "Result: MV Ship Voyage Gantt" refers to a Gantt chart that is provided as one means to visualize the current vessel assignment solution including the various voyage events (i.e., a forward projection in time of the start and duration of all voyage events). In addition, the results can be viewed in tabular format. At this point, the user should check the infeasible or unassigned vessels to insure the results are acceptable. If so, the user can forward or save the schedule of voyages.

There is also a eighth, optional step, indicated by the "Assignment Options—ReOptimization" and "ReOptimize" rectangles. In this step, the user has the option to review feasible assignment options, apply new assignment constraints (e.g., force a particular vessel to a particular voyage or sequence of voyages) and re-optimize the rest of the vessel assignments. This provides a what-if capability to support investigation and analysis of various assignment scenarios.

The application is typically executed multiple times to explore sensitivities in input data, different assumptions, and different assignment constraints (e.g., force the model to assign a given vessel to a given voyage and optimize the rest). The application runs fast enough to support these sorts of what-if scenarios, and fast enough to evaluate opportunities in real-time (e.g., while a vessel charterer is negotiating potential terms with a vessel owner). In one embodiment, the application performs the calculations for a typical problem comprising twenty to fifty voyages and an equal or greater number of vessels in five minutes or less, and typically less than one minute, running on an unimpeded 3 GHz single-processor personal computer.

Typically, vessel scheduling is done on a monthly basis since it is difficult to project needs much farther than a month in advance. The voyages, including cargo to be transported, and the available fleet may and probably will vary from cycle to cycle. Also, the economic factors including freight costs, fuel costs, etc., will change daily on both a regional and worldwide basis.

Beyond Marine Transportation

Although the invention has been described in the context of marine transportation, which is the preferred embodiment, it is equally applicable for use in the optimization of any mode of bulk product transportation. Virtually all of the teachings described above with respect to marine transportation are easily adapted to create similar applications for the optimization of transportation using any other type of fleet—regardless of whether the fleet is a collection of trains, trucks, planes, or other form of bulk product transportation. In addition, the teachings can be employed with any combination of trains, trucks, planes, vessels, or other form of bulk product transportation.

For example, the concept of optimizing a land transportation scheduling problem (e.g., by truck) is similar to optimizing a marine transportation problem. In both problems, the vehicles in the fleet may vary in size, speed and load capacity. Furthermore, in both problems, the vehicles in the fleet may be different charter types (e.g., term or spot or fully owned). Also, in both problems, there is the need pick-up at each loading site and deliver to each discharging site specific amounts of bulk product within site specific time windows. Illustrative physical restrictions that might limit the physical ability for any given truck in the fleet to perform a voyage include any applicable federal, state and county regulatory limitations on truck weight (as measured at mandatory weight stations), truck size and number of trailers. Illustrative temporal restrictions that might limit the ability for any given truck in the fleet to perform a voyage would include the location and time of first availability in view of voyage start time and relevant maximum highway speeds. Port restrictions in the marine transportation problem can be replaced in a land transportation problem with state operator licenses.

Similar examples exist in the airline and railway industries. Accordingly, a more general embodiment of the invention is a computer modeling application for the optimization of transportation scheduling that comprises code that, when executed, calculates the optimal solution to maximize total net margin for the assignment of vehicles in an available fleet of transportation vehicles to perform a set of voyages to be initiated during a planning period for transporting cargo comprising one or more bulk products. Preferably, the total net margin is derived from the individual net margins for each vehicle/voyage assignment and, more preferably, the total net margin is the sum of the individual net margins for each vehicle/voyage assignment. Again, each individual net margin for a transportation vehicle/voyage assignment is derived from the market value for the voyage using a notional vehicle and a predicted incurred cost for the voyage using the assigned vehicle.

The vehicle fleet can be heterogeneous. For example, each vehicle in the fleet can differ in size, shape, cargo carrying capacity, etc. In addition, the vehicle fleet may differ in economic costs (e.g., contract terms). For example, the fleet may comprise any combination of term vehicles, owned vehicles, spot vehicles, etc. Preferably, the fleet comprises both term vehicles and spot vehicles. In one preferred embodiment, each vehicle in the fleet, regardless of the economic basis of its contract, is classified as either a term vehicle or spot vehicle.

Preferably, the code includes at least one linear programming portion and at least one mixed integer (linear) programming portion. Ideally, to further computation speed, the code includes the following: (1) one or more simulator portion(s); (2) one or more revenue optimizer portions(s), (3) one or more net margin calculation portions; and (4) one or more assignment optimizer portions. The simulator portion(s) determine the single voyage/vehicle assignments and the multiple voyage/vehicle assignments that are feasible given vehicle constraints and voyage constraints. The revenue optimizer portion(s) define and solve at least one linear programming problem that determines the maximum cargo revenue for each feasible single voyage/vehicle assignment—where the maximum cargo revenue is based on the market rate and the maximum amount of cargo that can be lifted in the assignment given vehicle constraints and voyage constraints. The net margin calculation portion(s) calculate the individual net margin that would result from each feasible single voyage/vehicle assignment and each feasible multiple voyage/term vehicle assignment using the results from the revenue optimizer. The assignment optimizer portion(s) define and solve at least one mixed integer (linear) programming problem to determine which combination of vessel assignments maximizes total net margin using the feasible single voyage/vehicle assignments and multiple voyage/vehicle assignments, and corresponding net margins. Optionally, but preferably, the assignment optimizer portions also determine the "N" next best solutions where N is the desired number of alternate solutions.

Comparative Advantages of the Model

The transportation tool of this invention is a considerable advancement over prior work processes which, generally, utilize spreadsheets and expert economic analysis to compare two or more transportation decisions in order to find favorable, but rarely optimal, solution. The prior art procedure is effective for a limited number of decisions where there only a few variables but becomes more and more ineffective as the complexity of the scheduling decision increases and the number of variables increases. For example, the typical VLCC vessel assignment problem is quite complex. This invention uses advanced modeling and optimization technology to find the optimal vehicle/voyage assignment schedule. The optimizer searches through far more solution options than an individual can ever consider. The multiple voyage assignment capability extends the optimization capability such that the assignment optimization explicitly represents sequences of voyages. The tool finds the optimal solution quickly (e.g., in less than a minute in one preferred embodiment), fast enough to for the user to re-optimize frequently as inputs (i.e., business parameters) change and fast enough to support real-time transportation scheduling decisions. The tool considers all the relevant and important economic effects simultaneously. The re-optimize feature facilitates "what if" case analysis, and provides a side-by-side comparison of alternate solutions and their corresponding economic impact. The results sometimes align with conventional wisdom and sometimes are counter-intuitive but, nonetheless, valid.

ILLUSTRATIVE EXAMPLE

Introduction to LSDS

This example describes one embodiment of the invention and its use in scheduling voyages to transport different grades of crude oil from supply ports to demand ports, within a given period to time, in a manner that best maximizes the total net margin of the voyages. For reference purposes, the particular application described in this embodiment is nicknamed "LSDS" for "Large Ship Decision Support."

Basic Requirements of LSDS

LSDS has some basic preferred hardware and software configurations. First, LSDS prefers a relatively modern processor (e.g., a 1.86 GHz processor with 1 GB of RAM). Second, LSDS prefers a relatively modern operating system such as Microsoft Windows XP Professional (v. 2002, SP1). Third, since LSDS is an AIMMS modeling application, it requires a licensed version of a relatively modern AIMMS modeling system (e.g., AIMMS version 3.6.2). AIMMS, a product of Paragon Decision Technology B.V., is an advanced development system for building optimization based decision support applications. AIMMS provides a mathematical modeling language that is designed for the development of modeling applications, a graphical interactive user interface that developers can tailor for the applications, and an ability to link the applications to optimization solvers (e.g., CPLEX, XPress, XA, KNITRO, etc.). Fourth, LSDS prefers a relatively modern version of Microsoft Excel (e.g., Microsoft Office Excel 2003). LSDS uses an Excel workbook for data entry and, in addition, the results from the LSDS model can be stored in Excel format. Fifth, and finally, although programs written in AIMMS can perform some calculations, LSDS requires a solver (e.g., CPLEX, XPress, XA, KNITRO, etc.) to solve the linear programming and mixed-integer programming modeling problems in the application.

Data Entry for LSDS

LSDS uses an Excel workbook for data entry. In general, the data comprises information regarding vessel specifications, voyage specifics, crude information and current market rates. Preferably, the workbook comprises fifteen worksheets. The fifteen worksheets have the following names and purposes: (i) a "Requirements Work-up" worksheet that allows each user to enter the voyages that LSDS will consider in a manner that insures that the user will not accidentally overwrite any imbedded calculations; (ii) a "Requirements" worksheet that contains the voyage definitions provided by the user in the Requirements Work-up worksheet and some additional information generated by imbedded calculations; (iii) a "Term" worksheet that contains term vessel data such as the availability, location, fuel consumption and physical specifications of each term vessel; (iv) a "Spot" worksheet that contains spot vessel data such as demurrage rates, the expected time and place of availability and physical specifications of each spot vessel as well as Worldscale rates and part cargo minimums for different trade routes, overage costs, vessel fuel consumption, etc.; (v) a "WorldScale" worksheet that, among other things, provides market values for fuel costs, marine diesel oil costs, Worldscale rates for different trade routes, outlook market Worldscale rates for different trade routes, etc.; (vi) an "InputAssignment" worksheet that permits the user to assign a particular vessel to a particular voyage or to disallow a particular vessel from a particular voyage; (vii) a "NetHire" worksheet that allows the user to specify a trade route basis that will be used to calculate the net hire rate for each term vessel, and coefficients used to calculate net hire rates; (viii) a "TermExclude" worksheet that allows the user to exclude designated term vessels from visiting designated ports; (ix) a "Term Ship Planned Service" worksheet that allows the user to specify the number of days a term vessel must spend in dry dock, and thereby be out of service, for planned maintenance; (x) a "SpotExclude" worksheet that allows the user to exclude designated spot vessels from visiting designated ports; (xi) a "SuezCanalToll" worksheet that contains information regarding canal fees for spot vessels generally and each term vessel specifically; (xii) a "Ports" worksheet that details the temporal and physical restraints on vessels at each port in the voyages; (xiii) a "Port-Region" worksheet that associates each port in the voyages to a specific geographical region; (xiv) a "Grades" worksheet that lists the different crude grades that need to be transported by specific gravity and density; and (xv) a "LegData" worksheet that describes each leg of each voyage by port of origin, destination port, relevant routing through the Suez Canal or around the Cape of Good Hope (S. Africa) and the total distance of the voyage leg.

Entering data into fifteen worksheets for the first time can be work intensive. However, thereafter, the job is much easier since much of the data is relatively static (e.g., distances between ports, the physical characteristics of each available vessel, port constraints, etc.). The user starts with a copy of an existing data file and updates dynamic information therein to the extent that changes have occurred (e.g., voyage definitions, the identity of the vessels that are available, etc.). Preferably, this is done routinely as part of a regular work process. Table 1 details, in a very general manner, how often one needs to update the data in each of the aforementioned Excel worksheets.

| Frequently Modified Worksheets | Occasionally Modified Worksheets | Rarely Modified Worksheets |
|---|---|---|
| Requirements Work-up | Input Assignment | SuezCanalToll |
| Requirements | NetHire | Ports |
| Term | TermExclude | Port-Region |
| Spot | Term Ship Planned Service | Grades |
| WorldScale | SpotExclude | LegData |

Each of these worksheets, as well as the static and dynamic information therein, is illustrated in the accompanying FIGS. 3A, 3B, 3C, 3D, 3E, 3F, 3G, 3H, 3I, 3J, 3K, 3L, 3M, 3N, and 3O, respectively, and separately discussed below.

i. The Requirements Work-Up Worksheet

The Requirements Work-up worksheet is first of the fifteen worksheets in the LSDS workbook. The Requirements Work-up worksheet is used to enter the voyage requirements data which ultimately will be copied into the Requirements worksheet discussed in the next section of this example. A separate worksheet is used for this purpose to prevent the user from accidentally overwriting imbedded calculations in the Requirements worksheet. The Requirements Work-up worksheet is updated relatively frequently.

Figure 3A:
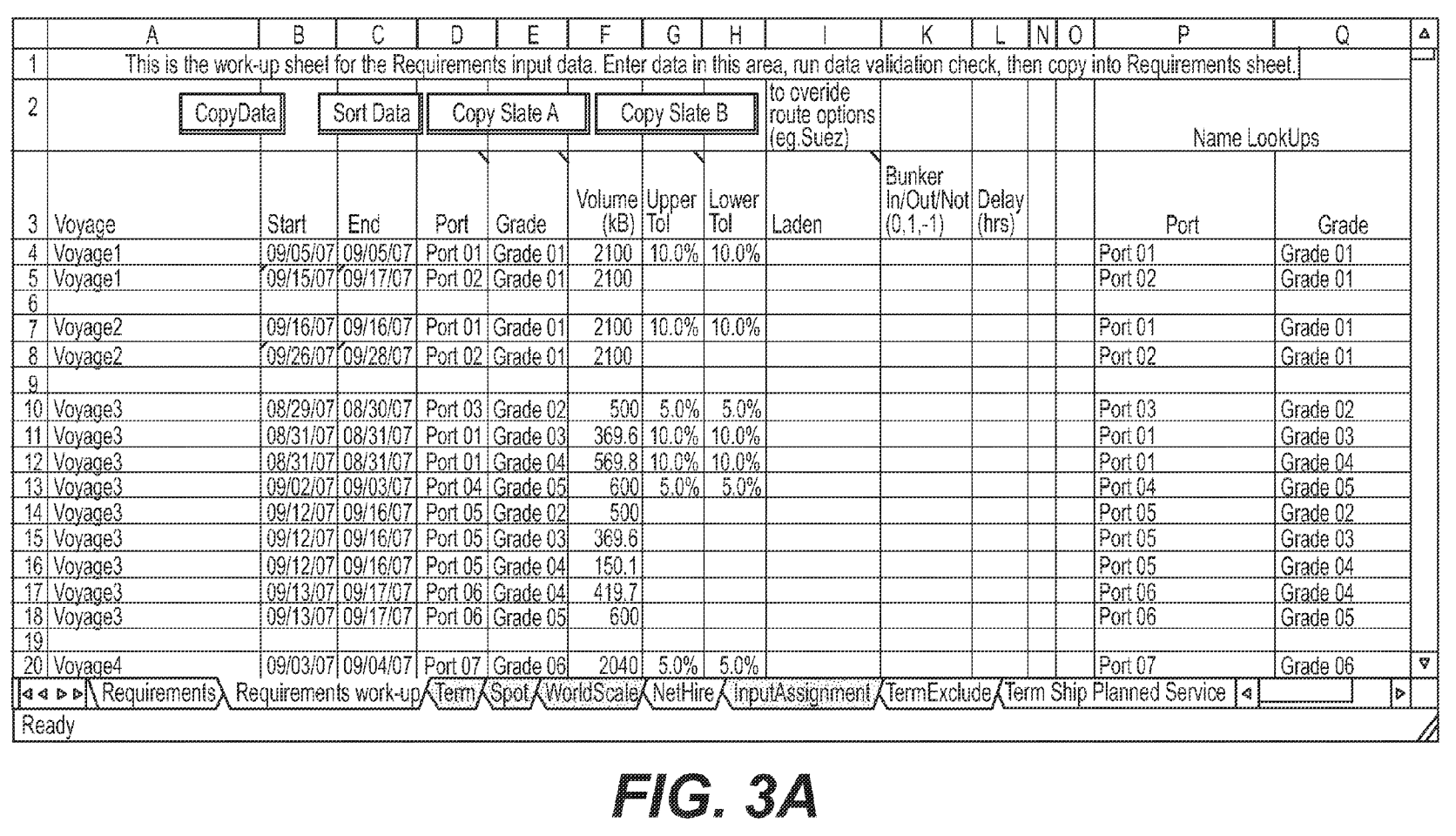

FIG. 3A illustrates a typical Requirements Work-up worksheet. Data fields in the worksheet that the user updates, either by typing the data in directly or by selecting an appropriate data option from a drop down menu, are set forth below.

a. "Voyage"—A name for each individual voyage is provided. A voyage, in the context of this example, is a desired series of one or more pick-ups from one or more defined ports, plus one or more deliveries to one or more defined ports, of one or more grades of crude, by a single vessel yet to be assigned. In FIG. 3A, the "Voyage" names are set forth under the corresponding header in column A. The voyage name is repeated for port stop in the voyage.

b. "Port" and "Grade"—The grade of each crude to be transported, as well as the port where the grade is to be picked up (i.e., the supply port) or delivered (i.e., the demand port), by a vessel yet to be assigned, is entered for port stop in the voyage. Different supply ports and demand ports are associated with providing and utilizing different crude types, respectively. Therefore, grade and supply ports, and grade and delivery ports, are typically selected in tandem from a drop down list that associates grades and ports. By definition, certain ports (e.g., in the Arabian Gulf and West Africa) are classified as load (or supply) ports and other ports (e.g., in the United States and Northern Europe) are classified as discharge (or demand) ports. In FIG. 3A, the "Ports" and "Grades" are set forth under the corresponding headers in columns D and E. In FIG. 3A, a "Name Lookups" list, bridging columns P and Q, if necessary, identifies the full name of each selected port and grade. For each voyage, each crude grade must volume balance. In other words, for each voyage, the total volume of each crude grade loaded from the supply ports must equal to total volume of each crude grade discharged at the demand ports.

c. "Start"—The start of the time period when desired crude can be obtained from each designated supply port and the start of the time period when desired crude can be delivered to each designated demand port stop, is specified for each voyage. For supply ports, the start is the first day the desired crude is available. For demand ports, the start is the first day the desired crude is required. In FIG. 3A, the "Start" is provided, in mm/dd/yy format, under the corresponding header in column B.

d. "End"—The latest date by which the desired crude must begin to be loaded from, or discharged to, each designated supply port or demand port, respectively, is specified for each voyage. For supply ports, the end is the last day the desired crude is available. For demand ports, the end date is the last day the desired crude is required. In FIG. 3A, the "End" is provided, in mm/dd/yy format, under the corresponding header in column C.

e. "Volume (kB)"—The nominal volume of each crude grade that needs to be obtained from each supply port and delivered to each demand port, respectively, is provided for each voyage. The volume is based on the needs of a refinery or refineries serviced by the designated demand ports and the supply of crude available from the designated supply ports. In FIG. 3A, the "Volume" is provided under the corresponding header in column F.

f. "Upper Tol" and "Lower Tol"—Depending on the capacities of the available vessels in the fleet it may not be possible or optimal to obtain or deliver the nominal volume of each crude grade as specified. Therefore, upper and lower limits are placed on the deviance from each specified volume that is tolerable. These upper and lower deviances are expressed as percentages. In FIG. 3A, the "Upper Tol" and "Lower Tol" are provided under the corresponding headers in columns G and H.

g. "to override route options (e.g. Suez)/Laden"—LSDS includes general routing preferences (e.g., between regions) that specify if a vessel should or should not use the Suez Canal during the laden (i.e., loaded) portion of the voyage. However, the user can optionally override this for a particular voyage. If the vessel ultimately assigned to the voyage must use the Suez Canal, then the user enters "SUEZ." If the vessel ultimately assigned to the voyage must travel around the tip of South Africa, then the user enters "CAPE." Otherwise, the user leaves the cell blank and the defaults apply. In FIG. 3A, any user "override" for a "Laden" voyage is provided under the corresponding header in column I.

h. "Bunker In/Out/Not"—The relative point where a vessel (once selected) will bunker (i.e., fuel) is entered for each port stop of the voyage. A zero (0) is entered if the vessel will be fueled while inbound (i.e., before being loaded). A one (1) is entered if the vessel will be fueled after crude is loaded. A negative one (−1) is entered if the vessel will not be fueled at the port. In FIG. 3A, this "Bunker" data is provided under the corresponding header in column K.

i. "Delay (hrs)"—Any known time delay that will affect laytime at any port stop in the voyage is entered. In FIG. 3A, the "Delay" for each port stop is provided, to the nearest hour, under the corresponding header in column L.

The Requirements Work-up worksheet also contains an Excel auto-filter for manipulating how the entered data is viewed in the worksheet (e.g., show all data or show a particular voyage only). In FIG. 3A, this is the "Sort Data" button.

Once data entry is complete, the user copies the data into the Requirements worksheet discussed in the next section of this example. In the embodiment shown in FIG. 3A, this is done by clicking the "CopyData" button. Alternatively, the user can send only some of the data to the Requirements worksheet (e.g., only those voyages transporting crude to a specified region). In the embodiment shown in FIG. 3A, this is done by clicking the button "Copy Slate A" or the button "Copy Slate B."

ii. The Requirements Worksheet

The Requirements worksheet is the second of the fifteen worksheets in the LSDS workbook. The Requirements worksheet defines each voyage using (a) data copied from the Requirements Work-up worksheet, (b) data derived from imbedded calculations and (c) data entered by the user. The Requirements worksheet, like the Requirements Work-up worksheet, is updated relatively frequently.

FIG. 3B shows an illustrative Requirements worksheet. Data imported from the Requirements Work-up worksheet is provided in columns A, C, D, E, F, H, I, J, K, M and N under field headers entitled: "Voyage;" "StartDate" (i.e., Start); "EndDate" (i.e., End); "Port;" "Grade;" Volume (kB);" "Upper Tol;" "Lower Tol;" "Laden Route" (to override defaults);" "Bunker In/Out/Not (0, 1, −1);" and "Delay (hrs)." These fields have the same meaning as described in the Requirements Work-up worksheet. Edits to the data in these fields is made by correcting the corresponding data in the Requirements Work-up worksheet and then, using the "Copy-Data" button, copying the data into the Requirements worksheet.

In addition, the Requirements worksheet includes additional fields where the data is either automatically populated by imbedded calculations or, in one case, entered by the user either directly or using a drop down menu. This additional information is set forth below.

a. "Sequence"—Sequence numbers are automatically generated showing the order in which each supply and demand port in a voyage will be visited by the vessel assigned to the voyage. In FIG. 3B, the "Sequence" number for each stop in each voyage is provided under the corresponding header in column B.

b. "Action (L/D)" A load and discharge indicator is automatically generated for each port in each voyage. The indicator shows up as an "L" for each supply port and a "D" for each demand port. In FIG. 3B, the "Action" for each port in each voyage is provided under the corresponding header in column G.

c. "Min/Max Date"—Dates corresponding to the minimum (earliest) and maximum (latest) temporal parameters for the optimization period to be considered by LSDS are automatically generated. The minimum date typically corresponds to the earliest data point in the workbook for the start of a voyage or the availability of a vessel. The maximum date typically corresponds to the latest data point in the workbook for the end of a voyage or the availability of the vessel plus an additional amount of time to allow for vessels to ballast back to a designated reference location (eg. the Arabian Gulf). In FIG. 3B, these dates are shown in cells C2 and D2, respectively, in mm-dd-yy format, to the right of header cell B1/2 entitled "Min/Max Date."

d. "End of Optimization Horizon"—A date specifying the end of optimization horizon is entered—which is the date within the planning period upon which term vessels start to earn a net hire daily rate once their assigned voyages are complete. Most scheduling for new voyages is done on a periodic basis (e.g., once a month). The end of optimization horizon is normally, but not necessarily, placed near the end of a planning period at some point after the last voyage in the planning period has started. LSDS assumes that any term vessel that finishes its last assigned voyage within the optimization period and before the end of optimization horizon earns nothing up to the end of optimization horizon but, thereafter, earns a specified net hire daily rate. This device incorporates into the program the notion that having terms vessels available for the next planning period at a time near the end of a planning period has an intrinsic value and prevents LSDS from otherwise assigning term vessels to the longest voyages possible through the optimization period simply to keep term vessels occupied. In FIG. 3B, this information is provided, in mm-dd-yy format, in cell G1 to the right of header cell F1/2 entitled "End of Optimization Horizon."

The Requirements worksheet also contains an Excel autofilter for manipulating how data is viewed in the worksheet (e.g., show all data or show data for one particular voyage only). In FIG. 3B, this function is activated by the "▼" button.

iii. The Term worksheet

The Term worksheet is the third of the fifteen worksheets in the LSDS workbook. The Term worksheet is used to enter information about term vessels in the fleet including each term vessel's name, availability, location, fuel consumption and physical specifications. Although much of the information in the Term worksheet is relatively static—the dynamic information in the Term worksheet is updated relatively frequently. Generally, only information pertaining to term vessel availability and location is updated.

Figure 3C:
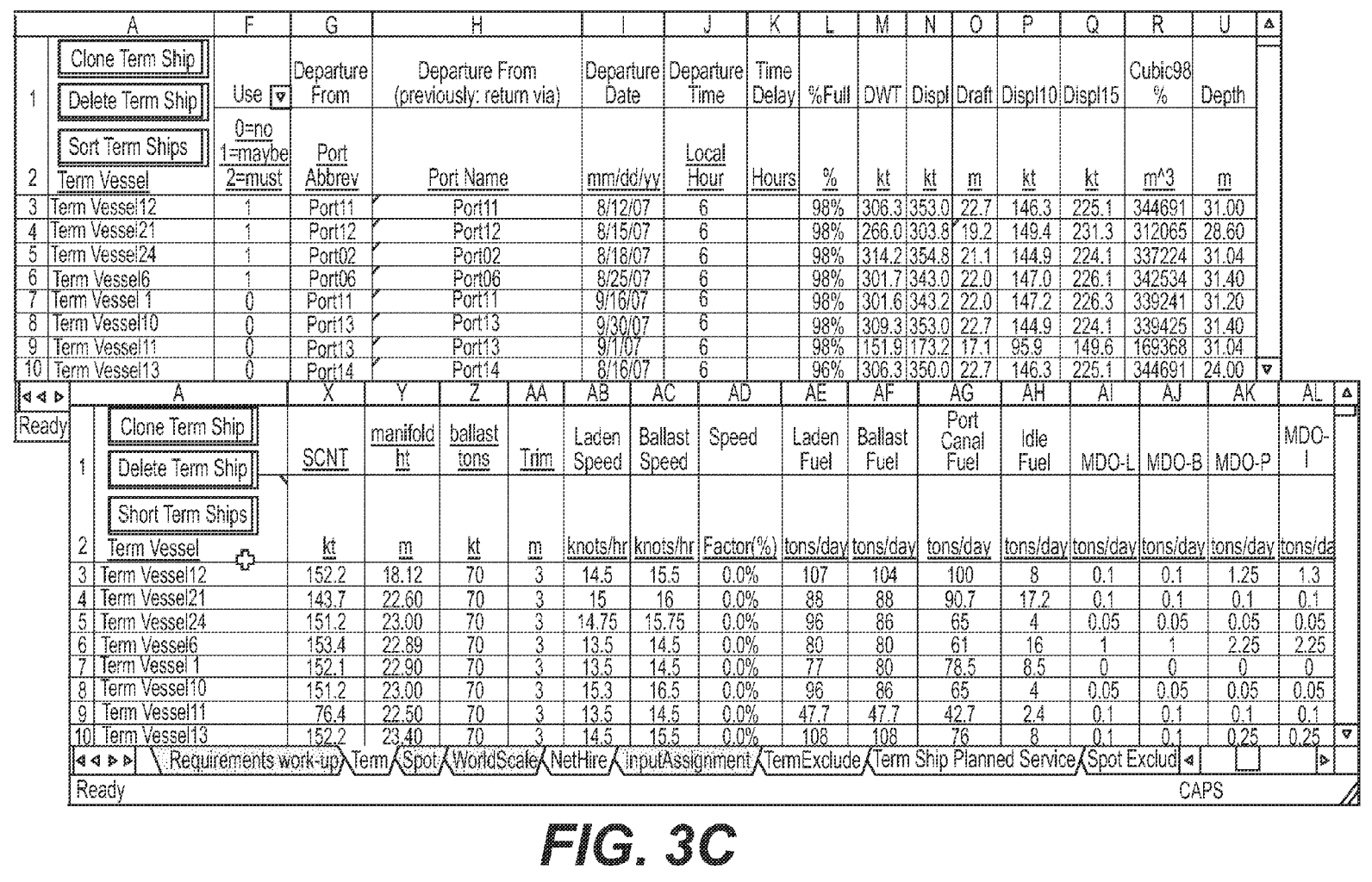

FIG. 3C shows an illustrative Term worksheet in a typical workbook. Fields in the worksheet that the user should update, either by typing or by selecting options from a drop down menu, are set forth below.

a. "Term Vessel"—The name of each term vessel is provided. In FIG. 3C, the "Term Vessel" names are listed under the corresponding header in column A.
  b. "Use"—An instruction, for each term vessel, specifying whether the term vessel is or is not to be considered available for the optimization calculations is provided. Specifically, the user enters a "0" if the vessel is not available, a "1" if the vessel is available and a "2" if the vessel is not only available but, for whatever reason, must be assigned a voyage in the optimization calculation. In FIG. 3C, the "Use" is shown for each term vessel under the corresponding header in column F.
  c. "Departure From"—The port where each term vessel will be located when it becomes available for a voyage assignment is provided. In FIG. 3C, the "Departure From" ports are identified by port abbreviation under the corresponding header in column G and by port name under the corresponding header in column H.
  d. "Departure Date"—The month, day and year when each term vessel will become available for a voyage assignment based on its current position is estimated. Typically, this is done in mm/dd/yy format. In FIG. 3C, the "Departure Date" for each term vessel is shown under the corresponding header in column I.
  e. "Departure Time"—The time of day, using the port's local time reference, when each term vessel should be available for its next voyage assignment is estimated. Typically, this is reported, in military time, to the nearest hour as an integer ranging from 1 to 24. In FIG. 3C, the "Departure Time" is shown under the corresponding header in column J.
  f. "Time Delay"—Any expected delay that might affect when a particular term vessel is available for an assignment is provided. Typically, this is provided to the nearest hour. If there are no expected delays, the cells are left blank. In FIG. 3C, the "Time Delay," to the extent applicable, is shown under the corresponding header in column K.

The Term worksheet also contains relatively static information describing the physical characteristics of each term vessel. In FIG. 3C, the physical characteristic information provided for each term vessel includes the following:

g. "% Full," the percentage to which the term vessel's capacity is utilized;
  h. "DWT" (deadweight), the weight capacity of cargo and bunkers that the term vessel can carry in kilotons;
  i. "Displ. (displacement)," the maximum displacement of the term vessel in kilotons.
  j. "Draft," the distance between the waterline and the keel for the term vessel in meters;
  k. "Displ10," the displacement of the term vessel, in kilotons, when the vessel sits ten meters below the surface;
  l. "Displ15," the displacement of the term vessel, in kilotons, when the vessel sits fifteen meters below the surface;
  m. "cubic98%," 98% of the cubic capacity of the term vessel;
  n. "Depth" (optional), the distance from the keel to the uppermost continuous deck of the term vessel in meters;
  o. "SCNT" (Suez Canal net tonnage), a measure used to calculate Suez Canal tolls for the term vessel;
  p. "manifold ht" (optional), a measure from sea level to the highest point of the term vessel in meters;
  q. "ballast tons" (optional), a measure of the weight of sea water needed to stabilize the term vessel to a proper trim during a ballast voyage in kilotons;
  r. "Trim" (optional), the difference between the depth of the bow and the depth of the stern for the term vessel in meters;
  s. "Laden Speed," the speed capability of the term vessel on laden voyages in knots per hour;
  t. "Ballast Speed," the speed capability of the term vessel on ballast voyages in knots per hour;
  u. "Speed Factor (%)," a percentage representing the difference between the historical performance of the term vessel and its speed capability;
  v. "Laden Fuel," a measure of the fuel consumption by the term vessel on laden voyages in tons per day;
  w. "Ballast Fuel," a measure of the fuel consumption by the term vessel on ballast voyages in tons per day;
  x. "Port Canal Fuel," a measure of the fuel consumption by the term vessel while moving in a port or canal in tons per day;
  y. "Idle Fuel," a measure of the fuel consumption by the term vessel while idle in tons per day;
  z. "MDO-L," a measure of the marine diesel oil consumption by the term vessel on laden voyages in tons per day;
  aa. "MDO-B," a measure of the marine diesel oil consumption by the term vessel on ballast voyages in tons per day;
  bb. "MDO-P," a measure of the marine diesel oil consumption by the term vessel while moving through a canal or port in tons per day; and
  cc. "MDO-I," a measure of the marine diesel oil consumption by the term vessel while idle in tons per day.

In FIG. 3C, this data is set forth in columns L-R, U, X-Z and AA-AL, respectively.

The Term worksheet also contains functions for copying and deleting term vessel information. In FIG. 3C, these functions are performed by the "Clone Term Ship" and "Delete Term Ship" buttons.

Finally, the Term worksheet also includes an Excel autofilter for manipulating how the data is viewed in the worksheet (e.g., show all data or only show data for a particular term vessel). In FIG. 3C, this auto-filter is activated by the "Sort Term Ships" button.

iv. The Spot Worksheet

The Spot worksheet is the fourth of the fifteen worksheets in the LSDS workbook. The Spot worksheet contains information regarding spot vessels in the fleet including spot vessel names, demurrage rates, expected times of arrival to a region, fuel consumption and physical specifications. Although much of the information in the Spot worksheet is relatively static—the dynamic information in the Spot worksheet is updated relatively frequently. Generally, only information pertaining to spot vessel availability, ETA, demurrage and laytime is updated.

Figure 3D:
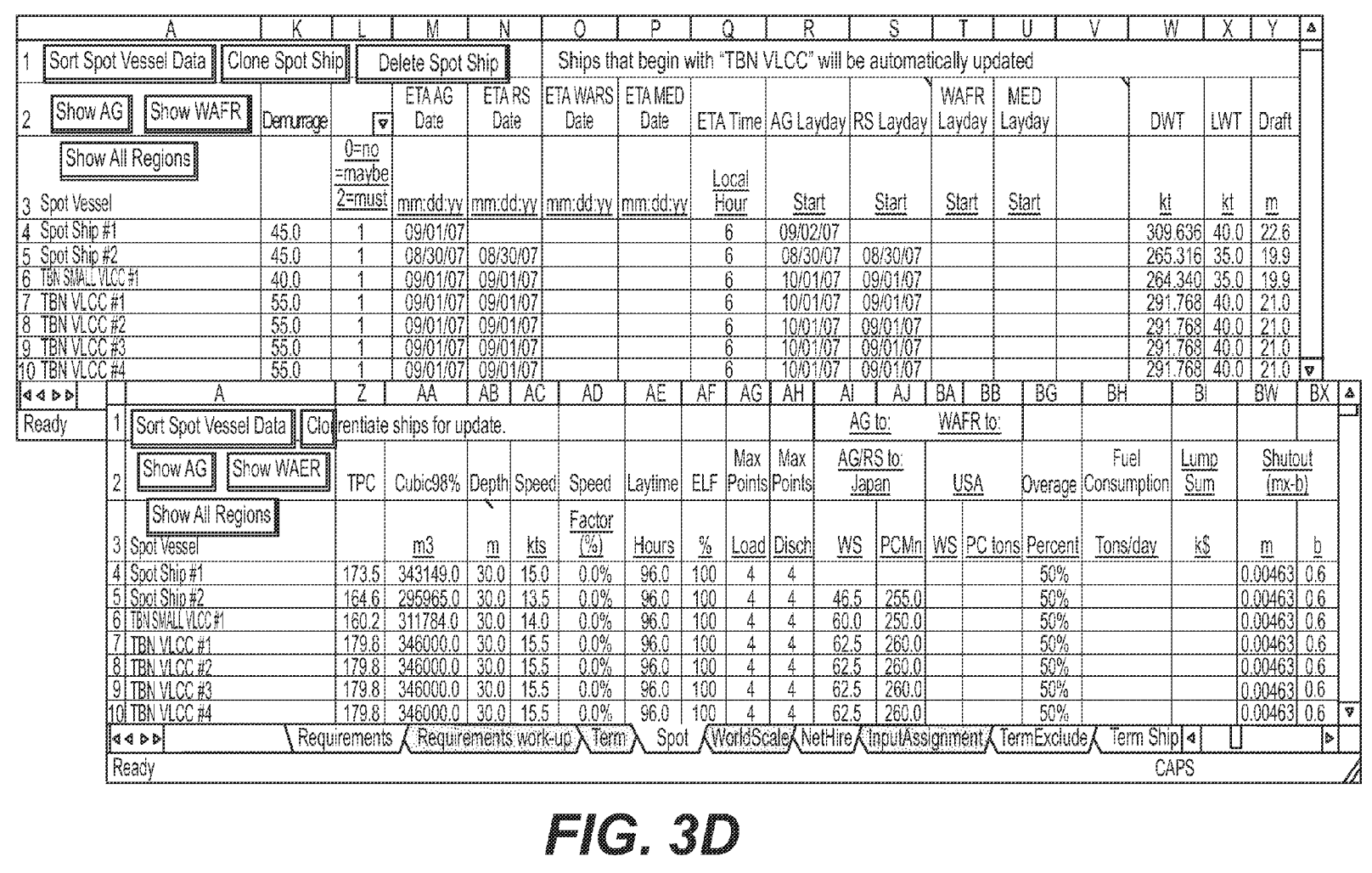

FIG. 3D shows an illustrative Spot worksheet in a typical workbook. Fields in the worksheet that the user should update, either by typing or by selecting options from a drop down menu, are set forth below.

a. "Spot Vessel"—The name of each spot vessel is provided. In FIG. 3D, "Spot Vessel" names appear under the corresponding header in column A.

b. "Demurrage"—The contractually agreed upon idle cost in U.S. $1000 increments per day is entered. In FIG. 3D, the "Demurrage" is provided under the corresponding header in column K.

c. "Use"—An instruction, for each spot vessel, specifying whether the spot vessel is or is not to be considered available in the optimization calculations is provided. Specifically, the user enters a "0" if the vessel is not available, a "1" if the vessel is available and a "2" if the vessel is not only available but, for whatever reason, must be assigned a voyage in the optimization calculation. In FIG. 3D, this information is shown in column L under the header cell L3 entitled "0=no 1=maybe 2=must."

d. "ETA Date" (by region)—The date and region each spot vessel will be available is specified. Typically, this is done in mm-dd-yy format. In FIG. 3D, the "ETA" data is provided in column M if the region is the Arabian Gulf (AG), in column N if the region is the Red Sea (RS), in column O if the region is West Africa (WAFR) and in column P if the region is the Mediterranean (MED).

e. ETA Time—The time of day, using the designated region's local time reference, when each spot vessel should arrive in the designated region is entered. Typically, this is done in military time, rounded to the nearest hour, as a number between 1 and 24. In FIG. 3D, the "ETA Time" is shown for each spot vessel in column Q under the corresponding header.

f. "Layday/Start" (by region)—The date that denotes the start of the lay period for the designated region is provided. In FIG. 3D, this the "Layday/Start" is shown, in mm-dd-yy format, in column R if the region is the Arabian Gulf (AG), in column S if the region is the Red Sea (RS), in column T if the region is West Africa (WAFR) and in column U if the region is the Mediterranean (MED).

The Spot worksheet also contains relatively static information describing the physical characteristics of each spot vessel. In FIG. 3D, the physical characteristic information provided for each spot vessel includes the following:

g. "DWT" (deadweight), the weight capacity the spot vessel can carry in kilotons;

h. "LWT" (lightweight), the weight of the spot vessel itself absent stores, crews, cargo, etc., in kilotons;

i. "Draft," the distance between the waterline and the keel of the term vessel in meters;

j. "TPC" (tons per centimeter) the tons necessary to drop the spot vessel one centimeter farther below the water line;

k. "Cubic98%," 98% of the cubic capacity of the spot vessel;

l. "Depth" (optional), the distance from the keel to the uppermost deck of the spot vessel in meters;

m. "Speed," the average speed capability of the spot vessel, including both ballast and laden voyages, in knots per hour;

n. "Speed Factor (%)," a percentage representing the difference between the historical performance of the spot vessel and its speed capability;

o. "Laytime," the total time, in hours, permitted under the terms of the spot vessel charter to load and discharge cargo;

p. "ELF" (early loading factor), a percentage of time credited against laytime if the vessel is loaded early;

q. "Max Ports/Load," the maximum number of loading ports the spot vessel is willing to visit in a single voyage;

r. "Max Ports/Disch," the maximum number of discharge ports the spot vessel is willing to visit in a single voyage;

s. "Overage," a percentage of the basic transportation rate the spot vessel charges for each additional ton of cargo transported over the spot cargo minimum;

t. "Fuel Consumption" (optional), the fuel consumption of the spot vessel in tons per day;

u. "Lump Sum," the agreed upon lump sum payment for using the spot vessel if payment is not based on a percentage of the Worldscale100 rate; and v. "Shutout (mx+b)," the tons of spot vessel capacity that must be dedicated to bunker fuel for the voyage, where m is a multiplier for the vessel representing the tons of fuel per mile required to move the spot vessel, x is the voyage distance in miles and b is either a general or a vessel specific constant (e.g., in this example 0.6 for all spot vessels).

In FIG. 3D, this data is set forth in columns W-Z, AA-AH, and BG, BH, BI, BW and BX, respectively.

The Spot worksheet also contains the financial information set forth below for each spot vessel with respect to a variety of trade routes.

w. "WS" (Worldscale)—The vessel specific Worldscale rate that the spot vessel charges for each trade route. Worldscale is a periodically updated index for a specific trade route at a given time. This average value is designated as Worldscale100 (WS100). Depending on market conditions, vessel size, etc., a spot vessel may charge more or less than WS100 for performing a voyage along a trade route. This variation is expressed as a percentage of WS100 and typically ranges from 40% (WS40) to 200% (WS200).

x. "PCMin" (part cargo minimum), the minimum amount of cargo, in tons, for which the spot vessel charges regardless of cargo size.

For example, in FIG. 3D, in columns AI through AJ, here is a section entitled "AG to:" that contains a column there under identifying a trade route originating from the Arabian Gulf/Red Sea (AG/RS) and ending in Japan. For the trade route, the vessel specific Worldscale rate and part cargo minimum for each spot vessel is provided. In FIG. 3D identical fields of financial information are provided in columns BA through BB for a trade route originating from West Africa (WAFR) and ending in the U.S.

The Spot worksheet contains various functions for copying and deleting spot vessel information. In FIG. 3D, these functions are performed by the "Clone Spot Ship" and "Delete Spot Ship" buttons, respectively.

The Spot worksheet also includes an Excel auto-filter for manipulating how the data is viewed in the worksheet (e.g., show all data or only show data for a particular vessel). In FIG. 3D, this auto-filter is activated by the "Sort Spot Vessel Data" button.

Finally, the Spot worksheet contains sorting functions for viewing spot vessel information relevant to a particular region. In FIG. 3D, these sorting functions are activated by the "Show AG," "Show WAFR" and "Show All Regions" buttons.

v. The WorldScale Worksheet

The WorldScale worksheet is the fifth of the fifteen worksheets in the LSDS workbook. The WorldScale worksheet contains market average Worldscale percentage rates and other associated rates. As stated, Worldscale is a periodically updated index for a specific trade route. This nominal value is designated as Worldscale100 (WS100). Depending on market conditions, the market average spot vessel cost for performing for a voyage along a trade route may be more or less than WS100 and is expressed as a percentage of WS100. This information is set forth in the Worldscale worksheet. The Worldscale worksheet is updated relatively frequently.

FIG. 3E shows an illustrative Worldscale worksheet in a typical workbook. Fields in the worksheet that the user should update, either by typing or by selecting options from a drop down menu, are set forth below.

- a. "From/To/Via"—The trade routes for which the market average Worldscale rates and other costs will be specified (e.g., from the Arabian Gulf (AG) to the United States (U.S.) using the Suez Canal). In FIG. 3E, the "From," "To," and "Via" information for the trade routes are set forth under the corresponding headers in columns A, B and C, respectively.
- b. "Bunker Cost"—The cost for heavy fuel oil on the trade route in U.S. dollars per ton. In FIG. 3E, the "Bunker Cost" is set forth under the corresponding header in column D.
- c. "MDO Cost"—The cost for marine diesel oil (MDO) on the trade route in U.S. dollars per ton. In FIG. 3E, the "MDO Cost" is set forth under the corresponding header in column E.
- d. "Current Demurrage Rate"—The market rate for excess port time on the trade route in U.S. $1000 increments per day. In FIG. 3E, the "Current Demurrage Rate" is set forth under the corresponding header in column G.
- e. "Market WS"—The market Worldscale rate for each trade route based on current market conditions expressed as a percentage (WS100). In FIG. 3E, the "Market WS" is set forth under the corresponding header in column H.
- f. "Outlook WS"—The market Worldscale rate for each trade route, to be used in a future period in the calculation of net hire value for term vessels, expressed as a percentage (WS100). In FIG. 3E, the "Outlook WS" is set forth under the corresponding header in column I.
- g. "NetHire Base WS"—A Worldscale rate for each trade route, expressed as a percentage (WS100), that will be used to calculate term vessel net hire rates in the NetHire worksheet (discussed below) which change relative to changes in the Worldscale rate. In FIG. 3E, the "NetHire Base WS" is set forth under the corresponding header in column J.
- h. "NetHire Base Fuel Cost"—The bunker fuel costs for each trade route, in dollars per ton, that will be used to calculate the term vessel net hire rates in the NetHire worksheet (discussed below) which change relative to changes in bunker fuel costs. In FIG. 3E, the "NetHire Base Fuel Cost" is set forth under the corresponding header in column K.
- i. "B/H Credit" and "B/H Debit"—The backhaul credits and debits that a vessel can earn or fail to earn on each trade route. A backhaul credit (B/H Credit) results when the vessel transports cargo on a return leg of a voyage for the purpose of minimizing ballast mileage and thereby reducing ballast transportation costs. A backhaul debit (B/H Debit) results when a vessel ballast from a region where it otherwise was in position for a backhaul cargo, thereby, loses an opportunity to earn a backhaul credit. In FIG. 3E, each "B/H Credit" and "B/H Debit" relevant to a return leg "From" and "To" specified locations is provided under corresponding headers in columns O, P, Q and R.
- j. "Laden Route (Default)" and "Ballast Route (Default)"—The default routing of vessels along each trade route (e.g., whether the vessel should utilize the Suez Canal or go around the Cape of Good Hope). In FIG. 3E, the "Laden Route (Default)" and "Ballast Route (Default)" is specified for voyages "From" and "To" specified points under corresponding headers in columns T, U, V and Y. Where this information is not relevant, the cells in the field are left blank or "NA" is entered.

The information above can be populated directly or some or all of the information can be extracted from data sources maintained in the course of business. In the case of LSDS, the information on this worksheet is updated by pressing the "Populate Worldscale Data" button, which links and draws from existing data tables.

vi. The InputAssignment Worksheet

The InputAssignment worksheet is the sixth of the fifteen worksheets in the LSDS workbook. The InputAssignment worksheet contains optional input that allows the user, to the extent desired, to either force or disallow a particular vessel to a particular voyage. Such a designation might be necessary, for example, due to contract terms or the need to bring a vessel to a particular port for maintenance, etc.

FIG. 3F illustrates a typical Input Assignment worksheet. Data fields in the worksheet that the user, if desired, updates, either by typing the data in directly or by selecting an appropriate data option from a drop down menu, include the following:

- a. "Voyage," the names of the voyages (this field can be automatically populated with a list of all voyages or manually populated with only those voyages for which a constraint will be specified);
- b. "Ship," the name of the term vessel or spot vessel, if any, that the user wants to be assigned to, or disallowed from, the voyage; and
- c. "User Specification," the preference, if any, for the assignment, where a one (1) forces the designated vessel to the designated voyage, a minus one (−1) disallows the designated vessel from the designated voyage and a zero (0) or empty cell means there is no preference.

In FIG. 3F, this information is set forth under the corresponding headers in columns A, B and C, respectively.

vii. The NetHire Worksheet

The NetHire worksheet is the seventh of the fifteen worksheets in the LSDS workbook. The NetHire worksheet allows the user to specify the trade route basis to be used to determine the net hire rate for each term vessel. The net hire rate is a daily net margin that LSDS assumes a term vessel earns after both of the following events have occurred: (a) the term vessel's assigned voyages, if any, for the planning period are complete; and (b) the end the optimization horizon has been reached. The term vessel earns the net hire rate for each day during the model time horizon after the aforementioned conditions are met.

The net hire rate is determined by an expected daily net margin (earnings) of a term vessel on a notional voyage. Therefore, the net hire rate will vary depending on the notional voyage selected and other important factors in calculating net margin, such as changes in market Worldscale rates for the notional voyage and bunker fuel costs. Accordingly, net hire rates are calculated for one or two notional voyages and then changes in the net hire rates are specified relative to degree changes in market Worldscale percentage rates and bunker fuel costs.

Preferably, two notional trade routes for use in calculating the net hire rate are provided for each term vessel, namely: one trade route representative of voyages south of the Suez Canal and one trade route representative of voyages north of the Suez Canal. LSDS then considers term vessel locations and applies the appropriate net hire rate. For term vessels that are assigned to a voyage, LSDS uses the final discharging port to determine whether South or North net hire rate should apply. If South, LSDS uses the net hire rate for the specified South trade route. If North, LSDS uses either the South net hire rate, or the larger of the South and North net hire rates (based on user preference). If a term vessel is not assigned, LSDS uses the specified ETD port (initial vessel position) to determine between South and North.

FIG. 3G illustrates a typical NetHire worksheet. This worksheet is updated whenever a new term vessel is added or deleted, or a term vessel notional voyage basis needs to be modified, or coefficients in the net hire rate calculation need to be updated. Data fields in the worksheet that the user populates, when necessary, either by typing the data in directly or by selecting an appropriate data option from a drop down menu, are set forth below.

a. "Region Codes"—Codes used in the worksheet to identify regions (e.g., "JAP" for Japan, "SK" for Sidi Kerir, "AG" for Arabian Gulf, "MED" for the Mediterranean, "SNG" for Singapore, AS for Ain Sukhna, "NE" for Northern Europe, "U.S." for the United States, "BS" for the Black Sea "RS" for Red Sea and "WAFR" for West Africa).

In FIG. 3G, these region codes proximate the corresponding header in rows 1, 2 and 3 of columns A, B and C.

b. "Term Ship"—The names of each available term vessel in the fleet. In FIG. 3G, these names appear under the corresponding header in row A.

c. "South Notional: Voyage"—The "South" notional voyage "From" and "To" specified regions "Via" an applicable canal selected by the user to calculate the net hire rate for the designated term vessel. In FIG. 3G, this south notional voyage information is identified under the appropriate headers in columns B through D.

d. "North Notional: Voyage"—The "North" notional voyage "From" and "To" specified regions "Via" an applicable canal, selected by the user to calculate the net hire rate for the designated term vessel. In FIG. 3G, this north notional voyage is identified under the appropriate headers in columns F through H.

e. "Net Hire [Rate] k$/D"—A table of net hire rates for each notional voyage option, "From" and "To" specified regions "Via" an applicable canal is provided. LSDS references this table to determine the net hire rate for the term vessel based on the north and south notional voyages the user has selected for the net hire rate calculation. In FIG. 3G, the net hire rate information, in U.S. $1000 increments per day, is set forth in columns M through Q under the appropriate headers.

f. "Net Hire Change, K$/D per 10 WS"—A table that represents the change in net hire rates per a ten (±10) point change in the Worldscale rate for each notional voyage option, "From" and "To" specified regions "Via" an applicable canal, is provided. LSDS references this table to calculate the net hire rate for the term vessel based on the north and south notional voyages the user has selected for the net hire rate calculation when Worldscale rates differ from the specified NetHireBase WS rate. The calculation will pro-rate or extrapolate for changes in the Worldscale rate that are smaller or larger than 10 points. In FIG. 3G, the net hire rate information, in $U.S. 1000 increments per day, is set forth in columns X through AB under the appropriate headers.

g. "Net Hire Change, K$/D per 10$/t Fuel"—A table that represents the change in net hire rates per a 10 dollar per ton change in the bunker fuel cost for each notional voyage option, "From" and "To" specified regions "Via" an applicable canal, is provided. LSDS references this table to determine the net hire rate for the term vessel based on the north and south notional voyages the user has selected for the net hire rate calculation whenever fuel costs differ from the NetHireBase Fuel Cost value. The calculation will pro-rate or extrapolate for changes in fuel cost that are smaller or larger than 10 dollars per ton. In FIG. 3G, the net hire rate information, in $U.S. 1000 increments per day, is set forth in columns AI through AM under the appropriate headers.

viii. The TermExclude Worksheet

The TermExclude worksheet is the eighth of the fifteen worksheets in the LSDS workbook. The TermExclude worksheet allows the user to exclude term vessels from visiting certain ports. This might be necessary, for example, under the term vessel contract. The worksheet should be updated whenever there is a change in the rules that govern which ports a particular term vessel is allowed to visit or when a new term vessel is added.

Figure 3H:
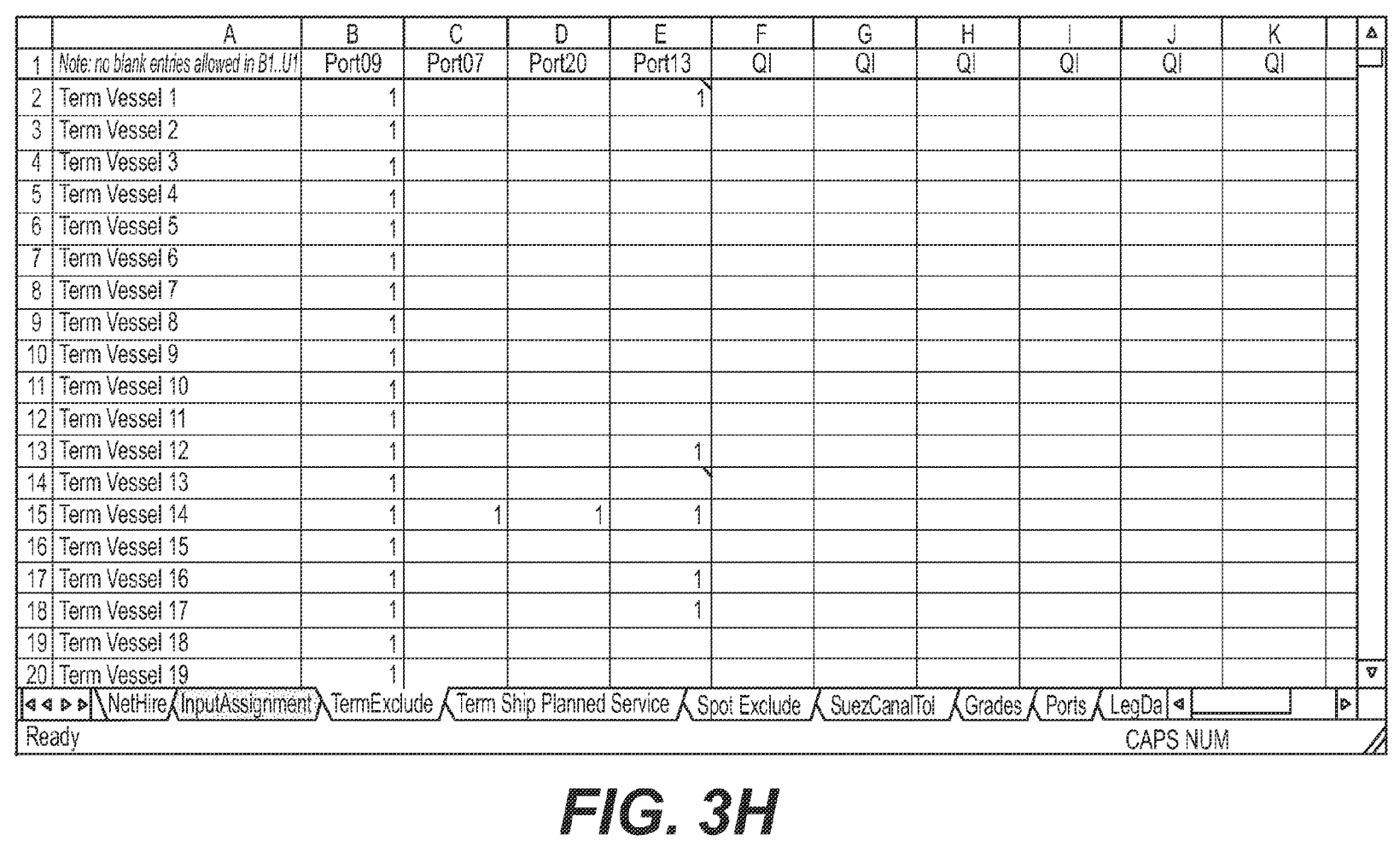

FIG. 3H illustrates a typical TermExclude worksheet. The worksheet is basically a matrix of cells indicating particular term vessel/port combinations. Column A lists particular term vessels. Row 1 specifies particular ports. The term vessel and port fields can be automatically populated with every available term vessel and port or manually populated with a list of only those term vessels and ports that are relevant to an exclusion designation. Thus, in FIG. 3H, only the ports for which certain vessels are restricted are indicated. No blank entries are permitted in Row 1, so a placeholder reference port is repeated multiple times to fill out the worksheet. To exclude a particular term vessel from visiting a particular port, the user enters a one (1) in the appropriate matrix cell. A blank cell indicates that there is no restriction.

ix. The Term Ship Planned Service Worksheet

The Term Ship Planned Service worksheet is the ninth of the fifteen worksheets in the LSDS workbook. The Term Ship Planned Service worksheet provides the number of days a term vessel must spend in dry dock (out of service) for planned maintenance. The worksheet should be updated as necessary to reflect planned maintenance.

FIG. 3I illustrates a typical Term Ship Planned Service worksheet. Data fields in the worksheet that the user inputs, either by typing the data in directly or by selecting an appropriate data option from a drop down menu, include the following:

a. "Term Ship," the name of each term vessel, which can either be an automatically generated list of every available term vessel or a manually generated list of only those term vessels for which maintenance information is relevant;

b. "After Voyage," the sequence number of the last assigned voyage that the term vessel should complete before service begins;

c. "Service Days," the number of days the term vessel is expected to be out of service.

In FIG. 3I, this information is set forth under the corresponding headers in columns A, B and C, respectively.

x. The SpotExclude Worksheet

The SpotExclude worksheet is the tenth of the fifteen worksheets in the LSDS workbook. The SpotExclude worksheet allows the user to exclude spot vessels from visiting certain ports. This might occur, for example, if the vessel owner refuses to service certain ports. The worksheet should be updated whenever there is a change in the rules that govern which ports a particular spot vessel is allowed to visit or when a new spot vessel is added.

FIG. 3J illustrates a typical SpotExclude worksheet. The worksheet is basically a matrix of cells indicating particular spot vessel/port combinations. Column A lists particular spot vessels. Row 1 specifies particular ports. The spot vessel and port fields can be automatically populated with every available spot vessel and port or manually populated with a list of only those spot vessels and ports relevant to an exclusion command. Thus, in FIG. 3J, only the ports for which certain vessel are restricted are indicated. No blank entries are permitted in Row 1, so a placeholder reference port is repeated multiple times to fill out the worksheet. To exclude a particular spot vessel from visiting a particular port, the user enters a "1" in appropriate matrix cell. A blank cell indicates that there is no restriction.

xi. The SuezCanalToll Worksheet

The SuezCanalToll worksheet is the eleventh of the fifteen worksheets in the LSDS workbook. The SuezCanalToll worksheet provides information used to determine if a voyage should or should not be routed through the Suez Canal. This worksheet is modified with a change in the set of term vessels, or when canal tolls change.

Figure 3K:
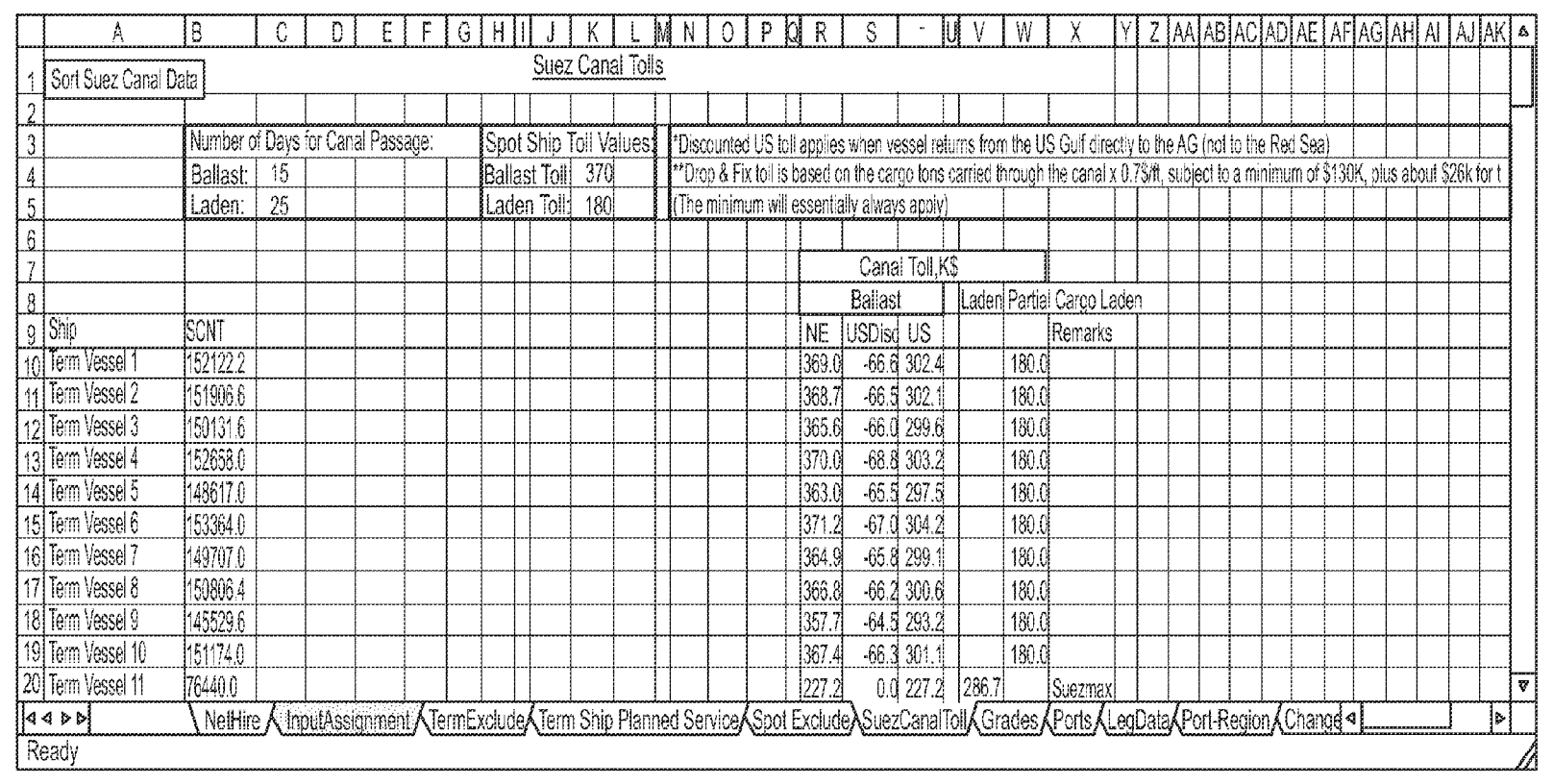

FIG. 3K illustrates a typical SuezCanalToll worksheet. Data fields in the worksheet that the user inputs, either by typing the data in directly or by selecting an appropriate data option from a drop down menu, include the following:

a. "Number of days for Canal Passage," estimates, in days, to be commonly applied to all vessels for the duration of the "Ballast" and "Laden" voyage passages through the Suez Canal;

b. "Spot Ship Toll Values," estimates of the tolls, in U.S. $1000 increments, to be applied to all spot vessels for the "Ballast" voyage and the "Laden" voyage through the Suez Canal;

c. "Ship," the name of each term vessel in the fleet;

d. "SCNT" (Suez Canal Net Tonnage), the amount of cargo, in tons, used to determine Suez canal tolls;

e. "Canal Toll[s]," the tolls, in U.S. $1000 increments, for each term vessel, for a "Ballast" voyage through the Suez Canal from Northern Europe and for a "Ballast" voyage through the Suez Canal from the United States, reflecting any applicable discounts such as a U.S. ballast voyage discount ("US Disc"); and f. "Laden" and "Partial Cargo," the tolls, in U.S. $1000 increments, for each term vessel, for either a fully or a partially "Laden" voyage through the Suez Canal.

In FIG. 3K, this information is set forth under the corresponding headers in columns A through X. The relevant canal tolls can be entered directly or calculated using factors (not shown) to estimate Suez Canal tolls.

The SuezCanalToll worksheet also includes an Excel auto-filter for manipulating how the data is viewed in the worksheet (e.g., view all data or only data pertaining to a particular vessel). In FIG. 3K, the auto-filter is activated by the "Sort Suez Canal Data" button.

xii. The Ports Worksheet

The Ports worksheet is the twelfth of the fifteen worksheets in the LSDS workbook. The Ports worksheet contains data relevant to the potential ports that may be included in the various voyages. This data can, and typically does, include the following: the rate the port can pump oil into and out of vessels; specifications for berth within the port to load or discharge cargo; port charges; maximum and minimum cargo; maximum departing and arriving draft depth; and a voyage value Worldscale multiplier. This worksheet is modified when a new port is added or when port characteristics need to be modified.

FIG. 3L illustrates a typical Ports worksheet. Data fields therein include the following:

a. "Port," the name of each port including a "Default" entry which shows the default values for a part if actual values are not known;

b. "L/D," a designation showing whether the port is a supply port or a demand port;

c. "Berth Start Time," the earliest time of day, in military time rounded to the nearest hour, each port will allow a vessel may dock;

d. "Misc. (Berth, etc)," the total hours for each port to reflect the time a vessel uses to berth and/or de-berth, etc.;

e. "Pumping Rate," the rate, in kilobarrels per hour, at which each port will permit a vessel to load or discharge bulk product;

f. "Berth Cut-Off Time," the latest time of day, in military time rounded to the nearest hour, each port will allow a vessel may dock;

g. "De-Berth Cut-Off Time," the latest time of day, in military time rounded to the nearest hour, each port will allow a vessel to depart from the dock;

h. "Grade Switch," the time, in hours, it takes each port to switch from loading or discharging one grade of crude oil to loading or discharging another grade of crude oil;

i. "Term Port Charge, k$, VLCC," the charge each port levies, in U.S. $1000 increments, for a very large crude carrier (VLCC) class vessel;

j. "Term Port Charge, K$, Suez," the charge each port levies, in U.S. $1000 increments, for a Suezmax class vessel k. "Temperature" (optional), the typical temperature of each port in Fahrenheit;

l. "Arrival DWT," the maximum deadweight tons, in kilotons, each port will permit a vessel to have upon arrival, m. "Min DWT" the minimum deadweight tons, in kilotons, each port will permit a vessel to have upon arrival, n. "Max Arrival Cargo" (weight), the maximum weight of cargo, in kilotons, each port will permit a vessel to have upon arrival, o. "Max Arrival Cargo" (volume), the maximum volume of cargo, in kilobarrels, each port will permit a vessel to have upon arrival;

p. Min Cargo" (volume), the minimum volume of cargo, in kilotons, each port will permit a vessel to have upon departure;

q. Max Cargo" (weight), the maximum weight of cargo, in kilotons, each port will permit a vessel to have upon departure;

r. "Max Departure Draft," the maximum draft, in meters, each port will permit a vessel to have upon departure;

s. "Max Arrival Draft," the maximum draft, in meters, each port will permit a vessel to have upon arrival;

t. "Min Draft," the minimum draft, in meters, each port will permit a vessel using the port;

u. "Max Depart Displ," the maximum displacement of a vessel, in kilotons, each port will permit a vessel to have upon departure;

v. "Max Arrival Displ," the maximum displacement of a vessel in, kilotons, each port will permit a vessel to have upon arrival;

w. "Min Displ," the minimum displacement of a vessel, in kilotons, each port will permit a vessel to have within the port;

x. "Max mfht," the maximum permitted manifold height, in meters, each port will permit a vessel to have within the port;

y. "UTC Offset," the number of hours any indicated time values are offset from the universal time clock (UTC);

z. "Voyage WS Multiplier," a means to adjust the WorldScale rate by multiplying by this factor, to reflect a premium (or discount) that is associated with a port that is the first discharge port in a voyage; and aa. "Voyage WS Constant," a means to adjust the WorldScale rate by adding this factor, to reflect a premium (or discount) that is associated with a port that is the first discharge port in a voyage.

In FIG. 3L, this information is set forth under the corresponding headers in columns A-X and AA-AD, respectively.

xiii. The Port-Region Worksheet

The Port-Region worksheet is the thirteenth of the fifteen worksheets in the LSDS workbook. The Port-Region worksheet associates each port to the region where the port is located. This worksheet is modified when new port is added.

FIG. 3M illustrates a typical Port-Region worksheet. Data fields therein include the following:

a. "Port Abbrev.," the abbreviation for each port;

b. "Port Name," the name of each port corresponding to the abbreviation; and c. "AG"/"US"/"JAP"/"SNG"/"NE"/"MED"/"RS"/ "WAFR"—the region where each port is located is identified by placing a "1" in a column for the Arabian Gulf (AG), the United States (US), Japan (JP), Singapore (SNG), Northwestern Europe (NE), the Mediterranean (MED), the Red Sea (RS) or West Africa (WAFR).

In FIG. 3M, this information is set forth under the corresponding headers in columns A through J, respectively.

The Port-Region worksheet also includes an Excel auto-filter for manipulating how the data is viewed in the worksheet (e.g., view all data or only data relevant to a particular port). In FIG. 3M, this auto-filter is activated by the "Sort Port Region Data" button.

xiv. The Grades Worksheet

The Grades worksheet is the fourteenth of the fifteen worksheets in the LSDS workbook. The Grades worksheet lists all the crude grades that potentially are transported by abbreviation, name, specific gravity and density. This worksheet is modified when new crude grade is added, or when a crude density needs to be updated.

Figure 3N:
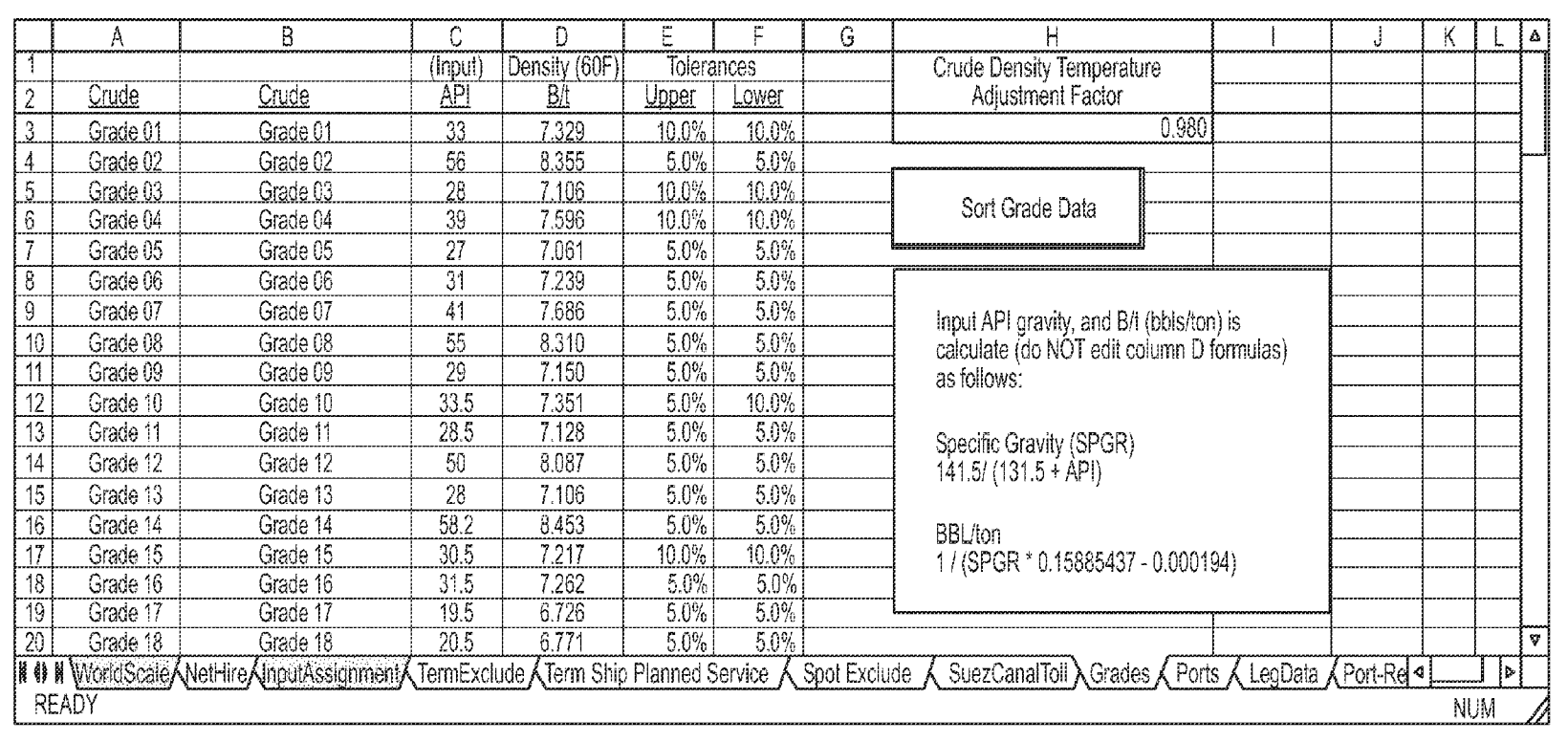

FIG. 3N illustrates a typical Grades worksheet. Data fields therein include the following:

a. "Crude (Abbr)," the abbreviation for each crude;

b. "Crude," the name of each crude corresponding to the abbreviation;

c. "(Input) API," the American Petroleum Institute gravity for each crude;

d. "Density (60F)"—the inverse density, in barrels per ton, for each crude grade is then automatically calculated from the API by first calculating the specific gravity (SPGR) from the API (where SPGR=141.5/(131.5+API) and then calculation the barrels per ton (BBL/ton) from the specific gravity (where BBL/ton=1/(SPGR*0.15885437−0.000194);

e. "Tolerances"/"Upper" and "Tolerances"/"Lower," the upper and lower tolerances in the requirements work-up sheet (described previously) are specified here for each crude grade, and this data is applied to corresponding grades to the load segments of each voyage; and f. "Crude Density Temperature Adjustment Factor", a value (e.g., 0.980), used for all crude grades, that represents that ratio of the crude density at 105° F. to the density at 60° F. (e.g., a standard reference temperature).

In FIG. 3N, this information is set forth under the corresponding headers in columns A through F and H, respectively.

The Grades worksheet also includes an Excel auto-filter for manipulating how the data is viewed in the worksheet (e.g., view information for all grades or only a selected grade). In FIG. 3N, this auto-filter is activated by the "Sort Grade Data" button.

xv. The LegData Worksheet

The LegData worksheet is the fifteenth of the fifteen worksheets in the LSDS workbook. The LegData worksheet lists the routes that the voyage legs follow. The leg data generally includes the following information: origin port; destination port; routing through the Suez Canal or Cape, if applicable; and voyage distance. This worksheet is modified when new distances are required due to the presence of new legs in the set of voyages, as defined.

FIG. 3O illustrates a typical LegData worksheet. Data fields therein include the following:

a. "Origin Port," the port in which each potential voyage leg starts;

b. "Destination Port," the port in which each potential voyage leg ends;

c. "Via," whether a voyage from the origin port to the destination port would typically go through a canal (e.g., the Suez Canal); and d. "Distance," the distance of the leg in knots.

In FIG. 3O, this information is set forth under the corresponding headers in columns A through D, respectively.

Transferring Data from Excel to the LSDS

The LSDS model is written in the AIMMS modeling language and employs an AIMMS graphical user interface. Therefore, when the user has populated or updated the Excel workbook, the data in each of the worksheets therein must be transferred to an AIMMS application. This is accomplished using an Excel add-in feature of AIMMS that has been appropriately configured by the LSDS developer. The LSDS developer, using the AIMMS Excel add-in configuration wizard, configures the add-in by specifying the necessary links between the data in the Excel workbook and identifiers in the underlying AIMMS model in a point-and-click manner. The add-in also generates a button that appears in the Excel tool bar and is named anything the developer desires (e.g., "Execute Read/Data" in the case of LSDS). When the user clicks the "Execute Read Data" action key on the Excel tool bar or, alternatively, calls a corresponding visual basic function, the data in the Excel workbook is exported to the LSDS model. If an error occurs during this read data step, an error dialog will appear in Excel. Otherwise, the data has been read into the LSDS model successfully.

The LSDS Main Page

Figure 3P:
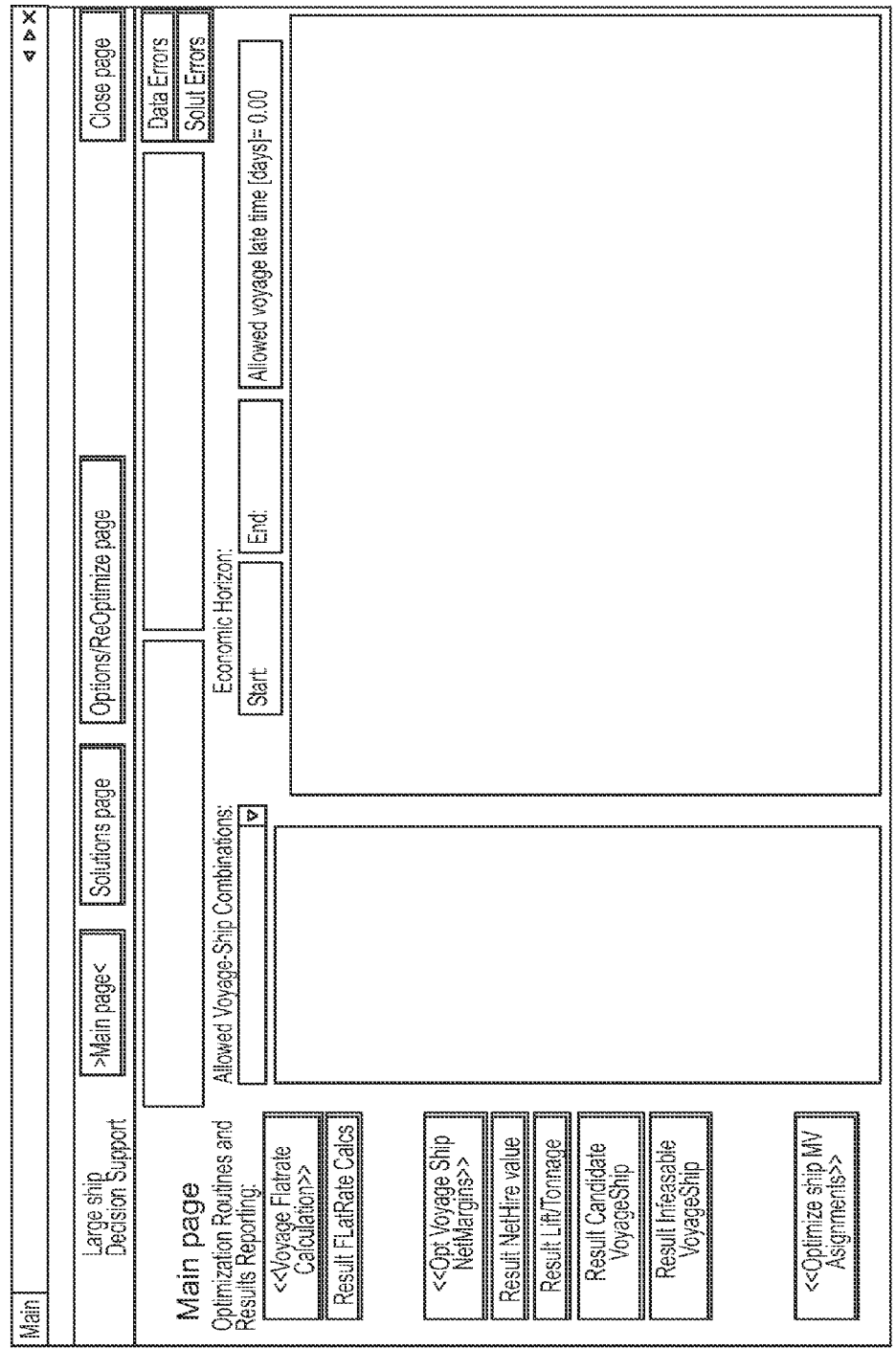

When the user exports the data to the LSDS model from the Excel workbook, the "Main" page of an AIMMS graphical user interface designed for LSDS automatically appears. The user must have a licensed version of AIMMS for LSDS to start up properly. The Main page is illustrated in FIG. 3P.

The Main page shows several navigation buttons common in all the LSDS interface pages. Every page starts with the same header row, with the title "LSDS Large Ship Decision Support" in the left hand corner. To the right follow the following three buttons linking the following three interface pages: "Main page," "Solutions page" and "Options/ReOptimize page." The Solutions page (a.k.a. the MV Solutions page) and Options/ReOptimize page are discussed later in this section. When viewing any one of the three pages, that page's button is marked in lighter color and is bordered by ">" and "<" arrows noting its selection. Clicking the navigation buttons moves to the selected page. In the right corner on the header row is a "Close page" button, which closes the current page and thereby returns to the page viewed immediately before. For some pages, there are additional page link buttons in the header row.

The Main page also contains two error boxes, located under the primary page navigation buttons. If an error occurs during optimization, it is displayed in one of the two error boxes. Other warnings may also appear, but they do not inhibit LSDS's calculations. The user should attend to any error messages, and should make a judgment about the need to attend to any warning messages. "Data Errors" and a "Solution Errors" buttons provide links that lead the user to a "Data Errors" page (not shown) or "Solution Errors" page (not shown), respectively, which can be used to troubleshoot errors such as missing leg data and infeasible voyages.

The Main page also displays certain key model parameters under the error boxes, including the "Start" and "End" of the "Economic Horizon" (i.e., the planning period) in yyyy-mm-dd format and the "Allowed voyage late time" in days. In addition, there is a drop down list that allows the user to view "Allowed-Voyage Vessel Combinations" for a selected voyage.

Finally, action and result keys are aligned one atop the other along the left hand side of the Main page. These action and result keys, which will be discussed in detail below, are used to initiate the various actions and display the various results of the LSDS model.

Running LSDS

The basic application workflow process for running LSDS comprises the following three to four steps: (1) calculate flat rates for all voyages; (2) check for candidate vessels and optimize net margin for each feasible vessel/voyage pairing; (3) determine the vessel/voyage assignments to cover all the voyages to optimize overall net margin, accounting for the ability of term vessels to perform multiple voyages during the optimization period; and, optionally, (4) re-optimize the solution using additional problem constraints to determine "what if" scenarios. Between each of these three main steps, the user can identify and corrects any data errors (which may require returning to the Excel worksheets) and validates intermediate calculations. Each of these steps is detailed more particularly below.

i. Step 1—Flat Rate Calculations

The first step in the LSDS workflow process is to calculate flat rates for all the voyages in the optimization period. To command LSDS to perform this action, the user clicks the action key <<Voyage FlatRate Calculations>>. LSDS then estimates the corresponding flat rates based on each voyage specification. If an error occurs during the calculation, it will appear in the Data Error message field. In the event of an error, the user clicks the <<Data Errors>> button. A "Data Errors" screen (not shown) will then appear and suggest where the error may have occurred.

Figure 3Q:
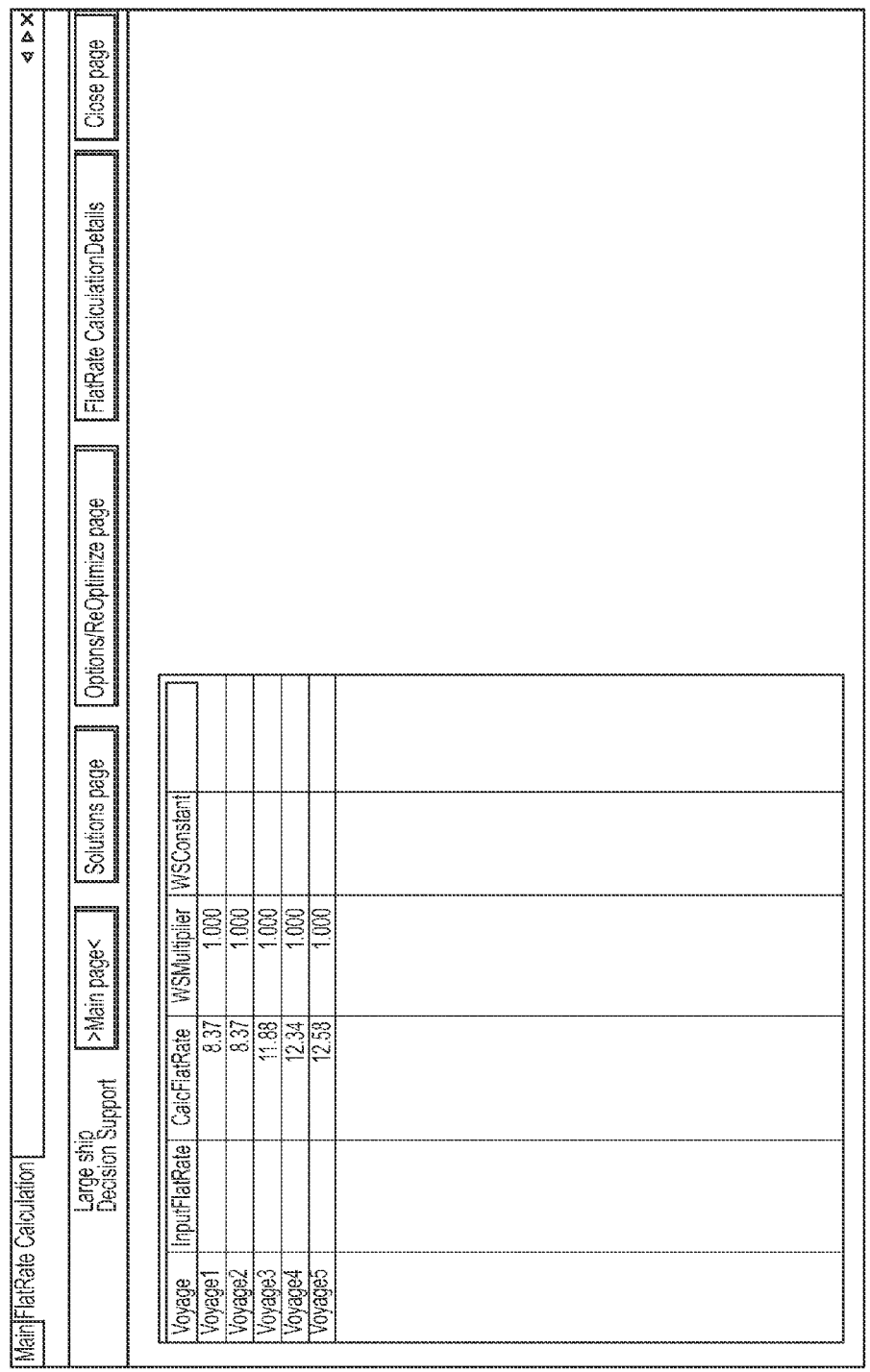

The user can review and validate the voyage flat rate calculations of the first step of the LSDS workflow process by clicking the key "Result: FlatRate Calcs." Clicking the Result: FlatRate Calcs key causes a "FlatRate Calculation" screen to appear. This screen, which is illustrated in FIG. 3Q, displays, in a tabular format, each voyage and its corresponding calculated flat rate. If the user believes the flat rate calculation for a particular voyage is incorrect, or if the user wants to enter a flat rate value, then the user can type a flat rate for any given voyage directly into the corresponding cell in the "InputFlatRate" column of the table. Each voyage has a WSMultiplier and WSConstant which are determined based on the corresponding values specified in the Ports worksheet, for the first discharge port of each voyage. These values are applied to adjust the specified WorldScale rates for each voyage (WSRate*WSMultiplier+WSConstant).

In addition, the user can view each component value used to calculate each voyage flat rate by clicking the result key "Review FlatRate Calculation Details" which is embedded in the FlatRate Calculation screen. Clicking the Review FlatRate Calculation Details key causes a "Flat Rate Details" screen to appear. The FlatRate Details screen is illustrated in FIG. 3R. This screen lists the values for each component used in the flat rate calculation and is primarily used as a debugging and diagnosis tool whenever the calculated voyage flat rates appear incorrect. In this embodiment, the voyage is separated into two parts (denoted P1 and P2) and each flat rate, in $/ton, is calculated as the sum of the flat rates for the two parts. More particularly, FIG. 3R shows the following information:

a. "Flatrate"—estimated flatrate (i.e., FR P1_FR P2), in $/ton;
b. "FR P1" and "FR P2"—flat rate for each part, in $/ton;
c. "Cargo P1 and Cargo P2"—estimated vessel cargo (or Est_Cargo) for the first part, in tons;
d. "R/Trip P1" and "R/Trip P1"—round trip distance for the each part, in knots;
e. "Voy Days P1" and "Voy Days P1"—voyage days steaming for each part, in days;
f. "P/C Days P1" and "P/C Days P1"—port days plus canal days for each part, in days;
g. "Fuel Cons"—total bunker fuel consumption, in ktons;
h. "Pt Cost P1" and "Pt Cost P2"—port charges for the each part, in k$;
i. "Fixed P1" and "Fixed P2"—vessel hire cost for the each part, in k$;
j. "Bunkers P1" and "Bunkers P2"—bunker cost for the each part, in k$; and
k. "Total Cost P1" and "Total Cost P2"—the sum of Pt Cost+Fixed+Bunker, for each part, in k$.

The user can return to the FlatRate Calculation screen by clicking on a "Close page" navigation button embedded in the FlatRate Details screen.

After reviewing the flat rates for each voyage, the user clicks on of the "Close page" or "Main page" navigation buttons embedded in the FlatRate Calculation screen to return to the Main page and continue the workflow process. At any later time, if desired, the user can re-access the FlatRate Calculation screen by clicking the Result: FlatRate Calcs button on the Main page.

ii. Step 2—Candidate Ship Determination

The second step in the LSDS workflow process determines, for each voyage, the candidate vessels and then optimizes the net margin for each feasible vessel/voyage pairing using a linear programming model solved by an optimizer (e.g., a CPLEX solver). To command LSDS to perform this action, the user clicks the <<Opt Voyage Ship NetMargins>> action key. LSDS then determines which vessels are feasible candidates for a voyage and calculates, using the solver, the largest voyage revenue that each feasible vessel can accomplish the voyage. The LP optimization problem for calculating the net margin for each feasible vessel/voyage pairing includes constraints that limit the maximum tonnage that can be lifted (i.e., carried) for each feasible vessel/voyage pairing given vessel, port and other voyage restrictions. If an error occurs, the user clicks the "Data Errors" button. The "Data Errors" screen (not shown) will then appear and suggest where the error may have originated.

The user can review and validate the results of the second step of the LSDS workflow process in four different ways, by clicking one of four different result keys on the Main page. Each of these review mechanisms is discussed below.

The first way the user can review and validate the results in of second step of the LSDS workflow process is by clicking the "Result: Net Hire Values" button. This action causes a "Net Hire Value" screen to appear. This screen, which is illustrated in FIG. 3S, displays term vessel net hire rates (in U.S. k$/day) calculated from the NetHire worksheet. For each voyage, the term vessel net hire rate, multiplied by the number days in a time period that starts on the later of the end date for the vessel's last voyage assignment and the start date for the net hire rate and ends on at the end of the model time horizon, equals the term vessel's net hire value. The user reviews the term vessel net hire rates on the Net Hire Value screen to insure that they are reasonable. If inaccuracies are found, the user should check, inter alia, the values input into the WorldScale and NetHire worksheets.

After reviewing the term vessel net hire rates, the user clicks one of the "Close page" or "Main page" navigation buttons embedded in the Net Hire Value screen to return to the Main page and continue the workflow process. At any later time, if desired, the user can re-access the Net Hire Value screen by clicking the Result: Net Hire Values button on the Main page.

Figure 3T:
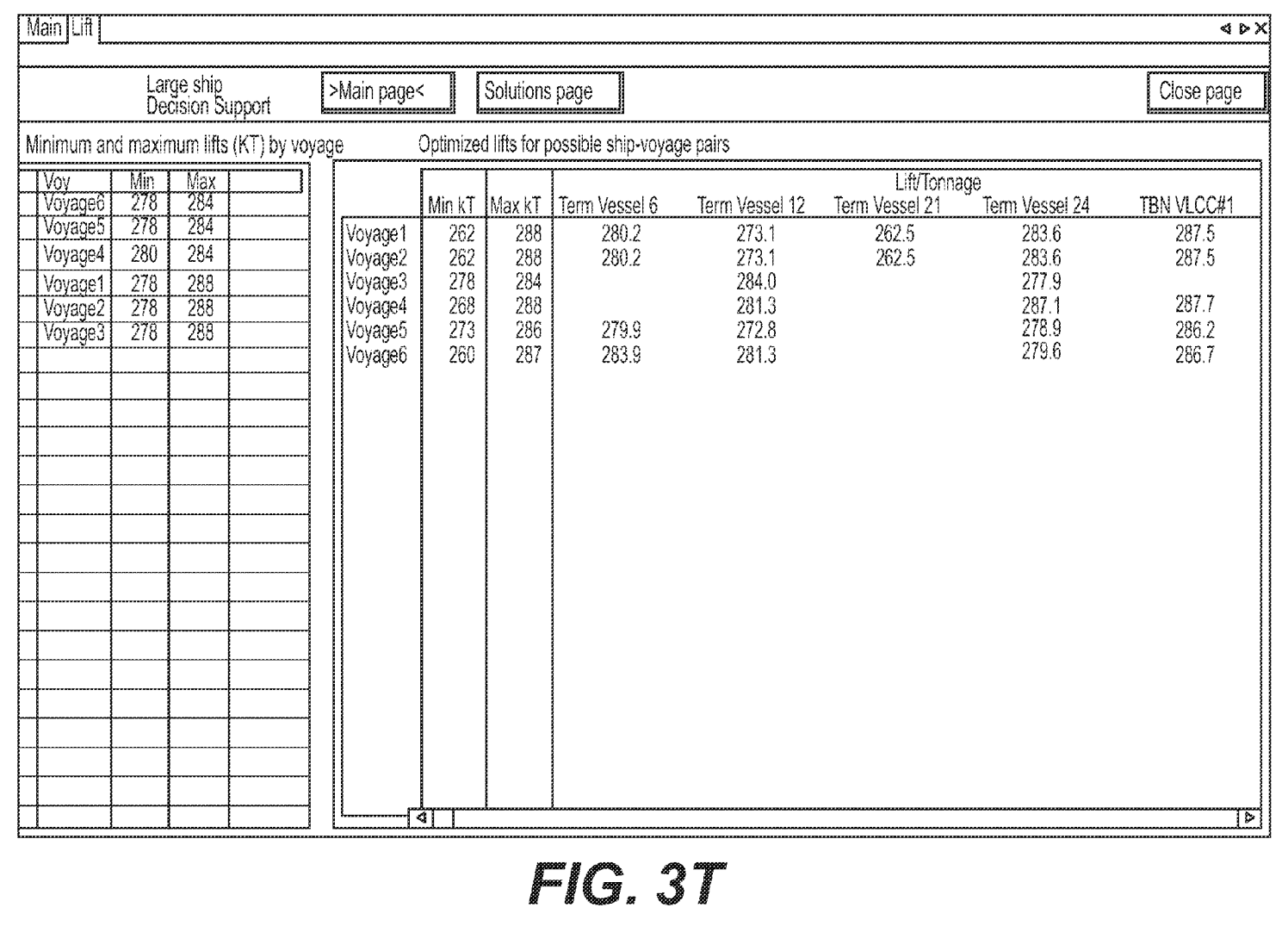

The second way the user can review and validate the results of the second step of the LSDS workflow process is by clicking the result "Result: Lift/Tonnage" button. This action causes a "Lift" screen to appear. The Lift screen, which is illustrated in FIG. 3T, shows the feasible voyage/vessel assignments and the number of corresponding maximum tons of cargo that can be transported by the assignment given vessel, port and other voyage constraints.

After reviewing the voyage/vessel lift tonnage values, the user clicks one of the "Close page" or "Main page" navigation buttons embedded in the Lift screen to return to the Main page and continue the workflow process. At any later time, if desired, the user can re-access the Lift screen by clicking the Result: Lift/Tonnage button on the Main page.

Figure 3U:
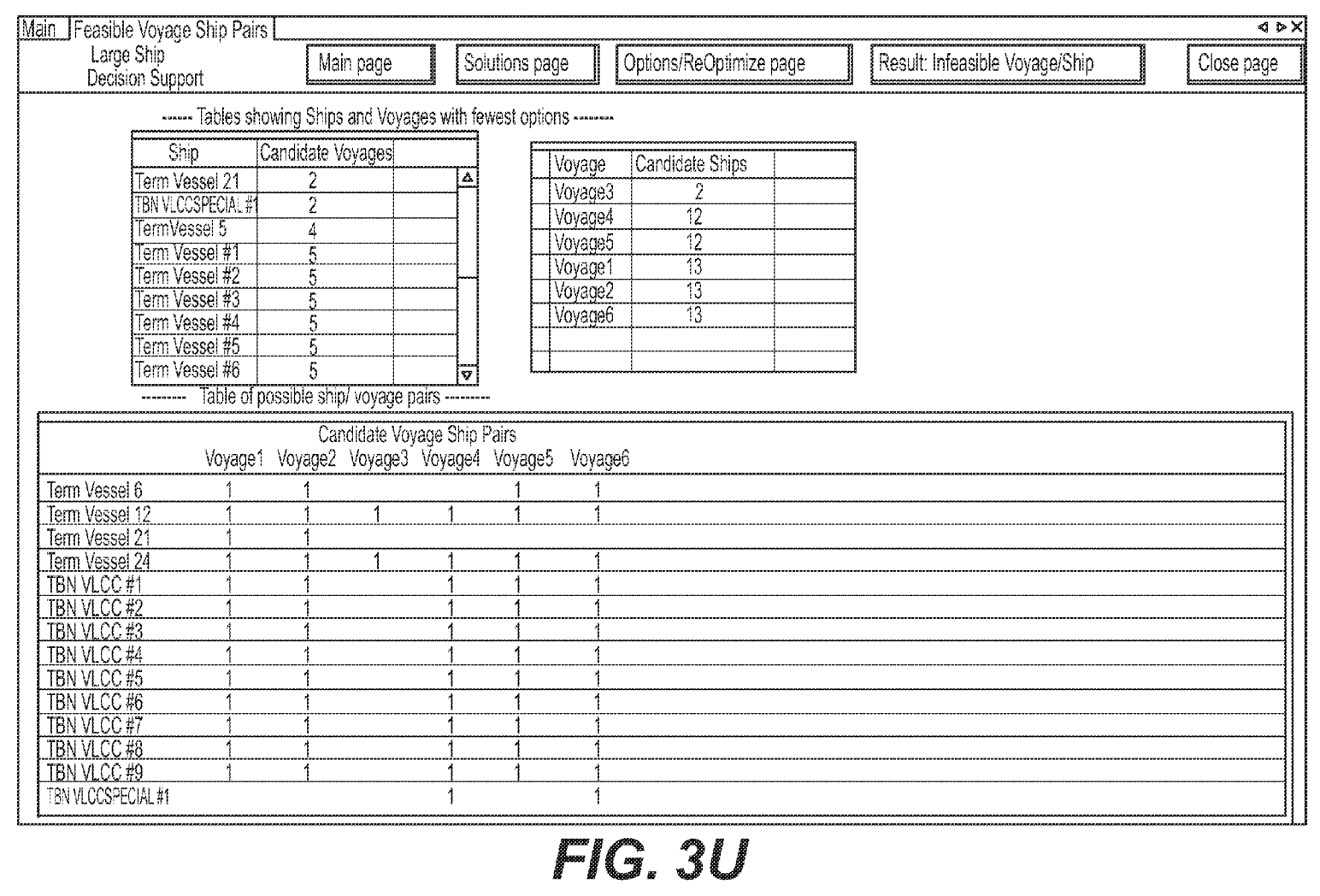

The third way the user can review and validate the results of the second step of the LSDS workflow process is by clicking the "Result: Candidate Voyage/Ship" button. This action causes a "Feasible Voyage Ship Pairs" screen to appear. The Feasible Voyage Ship Pairs screen, which is illustrated in FIG. 3U, is a chart of which vessel/voyage assignments LSDS has determined are feasible. A one (1) appears in the appropriate cell in the vessel/voyage matrix at the bottom of the screen if the vessel/voyage assignment is feasible. At the top of the screen there is table showing the total number of candidate voyages that are feasible for each vessel as will as a table showing the total number of candidate vessels that are feasible for each voyage.

After reviewing the feasible vessel/voyage assignments, the user clicks either of the "Go Back" or "Main page" navigation buttons embedded in the Lift screen to return to the Main page and continue the workflow process. At any later time, if desired, the user can re-access the Feasible Voyage Ship Pairs screen by clicking the "Result: Candidate Voyage/ Ship" button on the Main page.

Figure 3V:
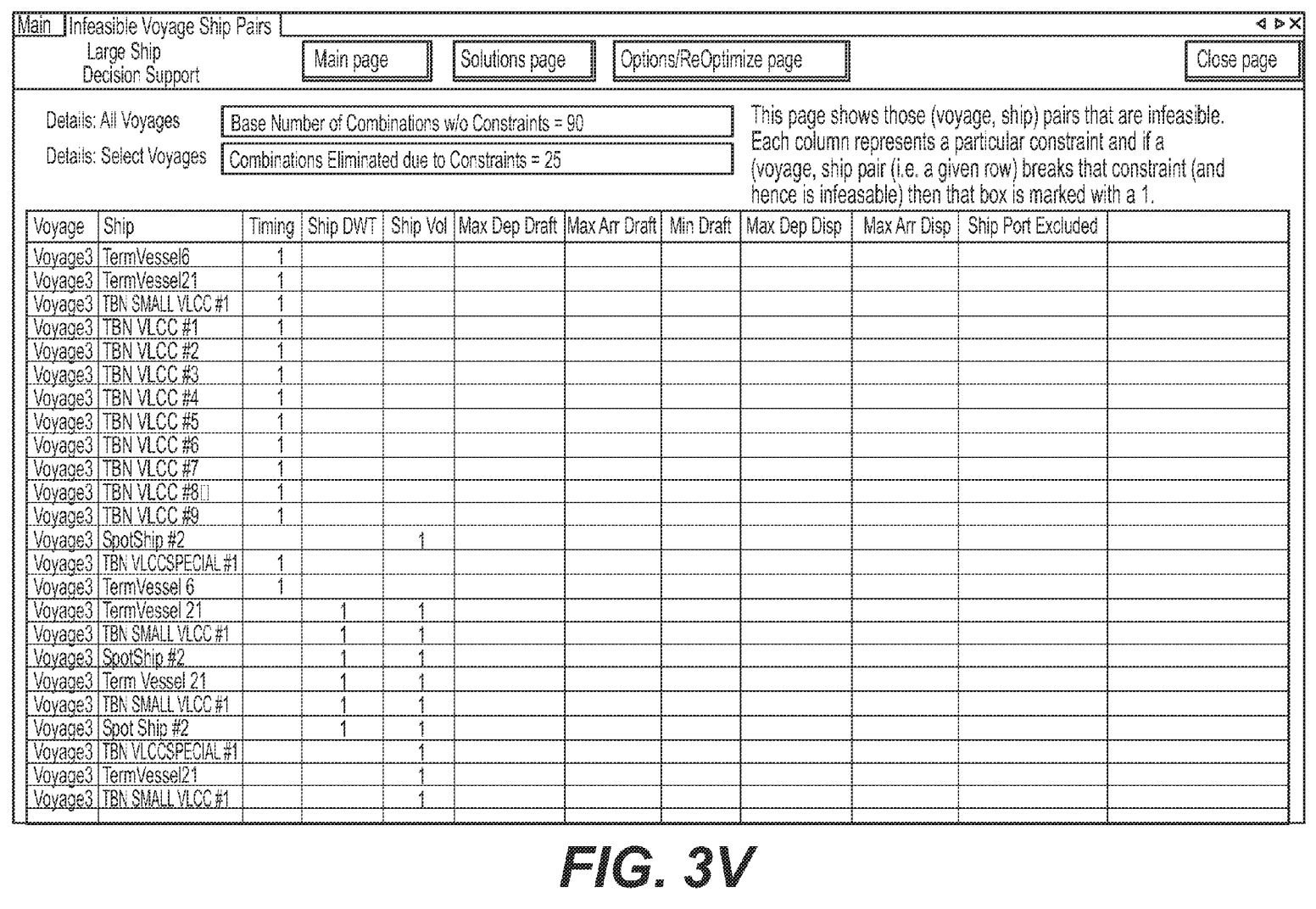

The fourth way the user can review and validate the results of the second step of the LSDS workflow process is by clicking the "Result: Infeasible Voyage/Ship" button. This action causes a "Infeasible Voyage Ship Pairs" screen to appear. The Infeasible Voyage Ship Pairs screen, which is illustrated in FIG. 3V, is a chart of which voyage/vessel pairings LSDS has determined are infeasible. A one (1) is shown in the appropriate cell in the voyage/vessel matrix if the voyage/vessel assignment is not feasible. In addition, the chart provides potential reasons why a pairing is not feasible by providing a one (1) in each cell for the pairing applicable to a reason for rejecting the pairing. Potential reasons for rejecting a pairing include temporal factors, factors relating to relevant port restrictions in the voyage including vessel capacity, draft, or displacement and other miscellaneous factors such as contractual factors. Additional details regarding why LSDS has rejected any vessel/voyage pairing (e.g., the amount by which a voyage restriction has been missed), can be found by clicking the "Details—All Voyages" and "Details—Selected Voyages" buttons. This action takes the user to a "Constraints— Details" page (not shown) which provides the voyage restrictions and the delta by which the restrictions are missed. If inaccuracies are found, the user should check, inter alia, the vessel availability dates on the Spot Worksheet or Term Worksheet and the port restrictions on the Ports worksheet.

After reviewing the infeasible voyage/vessel assignments, the user clicks either of the "Close page" or "Main page" navigation buttons embedded in the Infeasible Voyage Ship Pairs screen to return to the Main page and continue the workflow process. At any later time, if desired, the user can re-access the Infeasible Voyage Ship Pairs screen by clicking the Result: Infeasible Voyage/Ship button on the main page.

iii. Step 3—Optimization

The third step in the LSDS workflow process is to calculate the optimal vessel assignments, to cover all the voyages in the planning period, that maximizes overall net margin, using the assumption that term vessels can be assigned to multiple voyages during the optimization period. In other words, during this step, the multiple voyage assignment problem is solved. To command LSDS to perform this action, the user clicks the action key <<Optimize Ship MV Assignment>>. The setup step involves calculations to determine which combinations of voyages can be assigned to various vessels. A mixed-integer programming model is then solved by an optimizer (e.g., CPLEX) to determine the optional assignment of vessels to maximize total net margin.

When the third step is complete, the "MV Solutions" screen will automatically open and display the results— namely, the optimized vessel/voyage assignments for maximizing total net margin. The MV Solutions page can also be access from the Main page and any other page by clicking the "Solutions" navigation button. The MV Solutions screen is illustrated in FIG. 3W. The MV Solutions screen has a number of features, each of which is separately discussed below.

A first feature of the MV Solutions screen are fields showing the total net margin for the optimal solution found by LSDS to the assignment problem in millions of U.S. dollars (M$ U.S.), the total amount of cargo lifted in kilotons and the total idle days for the assigned vessels. In FIG. 3W, these values are provided in the lower left hand side of the screen.

A second feature of the MV Solutions screen is a field that displays all the term and spot vessels that LSDS has assigned to a voyage, the voyages that each assigned vessel is assigned to cover, the sequence of each voyage ("Voy#") if a vessel has been assigned to perform multiple voyages and the net margin for each vessel/voyage assignment. Some net margins may be blank since, for a term vessel assigned to two or more voyages, the combined net margin is shown rather than the component net margins for each voyage. In FIG. 3W, this information is provided under appropriate headers in the field entitled "Assignment and Net Margin [K$]."

A third feature of the MV Solutions screen is a field that lists each term vessel that LSDS has not assigned to a voyage and the net margin for each unassigned term vessel. The net margin for each unassigned term vessel is calculated using the net hire value for the term vessel—that is a calculated net hire rate (in U.S. k$/day) multiplied by a calculated number of days starting on the date (the net hire date) that the unassigned vessel is both available and accumulating net hire value. The net hire date—which is a calculated date which is the later of the date when the vessel is available and the end of optimization horizon—is also shown. In FIG. 3W, this information is provided under appropriate headers in the field entitled "Term Ships Not Assigned."

A fourth feature of the MV Solutions screen is the "Result: North-South Program" button. Clicking this button displays the N-S Program screen (not shown) which is a view of the optimized vessel assignment, showing the North voyages together and the South voyages together.

A fifth feature of the MV Solutions screen is the "Result: Lift/Tonnage" button. Clicking on this results key displays the Lift screen. As previously stated, the Lift screen provides a table of all feasible term and spot vessel/voyage combinations which can, alternatively, be viewed as a bar chart, by voyage, for all feasible vessels or as a bar chart, by vessel, for all feasible voyages.

A sixth feature of the MV Solutions screen is the "Result: MV Ship Voyage Gantt" result button. Clicking this key opens a "Simulation MV" page (not shown) that displays the model solution as a time based visualization via a Gantt chart. The Gantt chart displays each event in a vessel assignment by different color bars, e.g., idle days, loading time, laden voyage time, ballast voyage time, bunker time, discharging time.

A seventh feature of the MV Solution screen is the "Result: NetMargin Components" result button. Clicking this key opens a "MV Solution with NetMargin" page (not shown) that displays the multiple voyage assignment solution in tabular format so that the user can view, by voyage, the net margin for each voyage/vessel combination made by LSDS as well as each component value therein (e.g., fuel cost, port fees, canal tolls, net hire value, backhaul credits, spot vessel costs, overage, demurrage, voyage value, etc. . . . ).

An eighth feature of the MV Solution screen is the "Result: Term Ship Discharge Position" button. Clicking this key opens a "MV Term Ship Discharge Position" page (not shown) that provides a forward projection of the assigned and unassigned term vessels and contains an ETA for these vessels to specified reference locations. For assigned vessels, this represents ETA upon completion of the last assigned voyage for each vessel.

A ninth feature of the MV Solution screen is the "Result: Timing Infeasibilities" button. Clicking this key opens a "Timing Infeasibilities" screen (not shown) that lists, by vessel and by voyage, which voyage/combinations initially deemed to be feasible were found to be infeasible due to temporal constraints (e.g., the vessel could not make all the supply windows) and by what degree the temporal restrictions were missed.

A tenth feature of the MV Solutions screen is the "Result: Active constraints on cargo" button. Clicking this key opens an "Active cargo constraints" screen (not shown) that lists, for each assigned vessel and voyage, the constraint that limit the amount of cargo.

An eleventh feature of the MV Solution screen is the "Solve: Find N Best Alternate Solutions" button. Clicking this key opens a "Multi-Solution" screen (not shown) that contains an input field to specified desired number of solutions (N), a solve button to calculate the N best solutions, and field to display the N best solution results.

A twelfth feature of the MV Solutions screen is the "Result: Multi-Voyage Sequences" button. Clicking this key opens a "Multi-Voyage Options" screen (not shown) that lists the various multi-voyage options (shown as combinations of two or more voyages) that are feasible for each term vessel.

iv. Step 4—Re-optimization

Figure 3X:
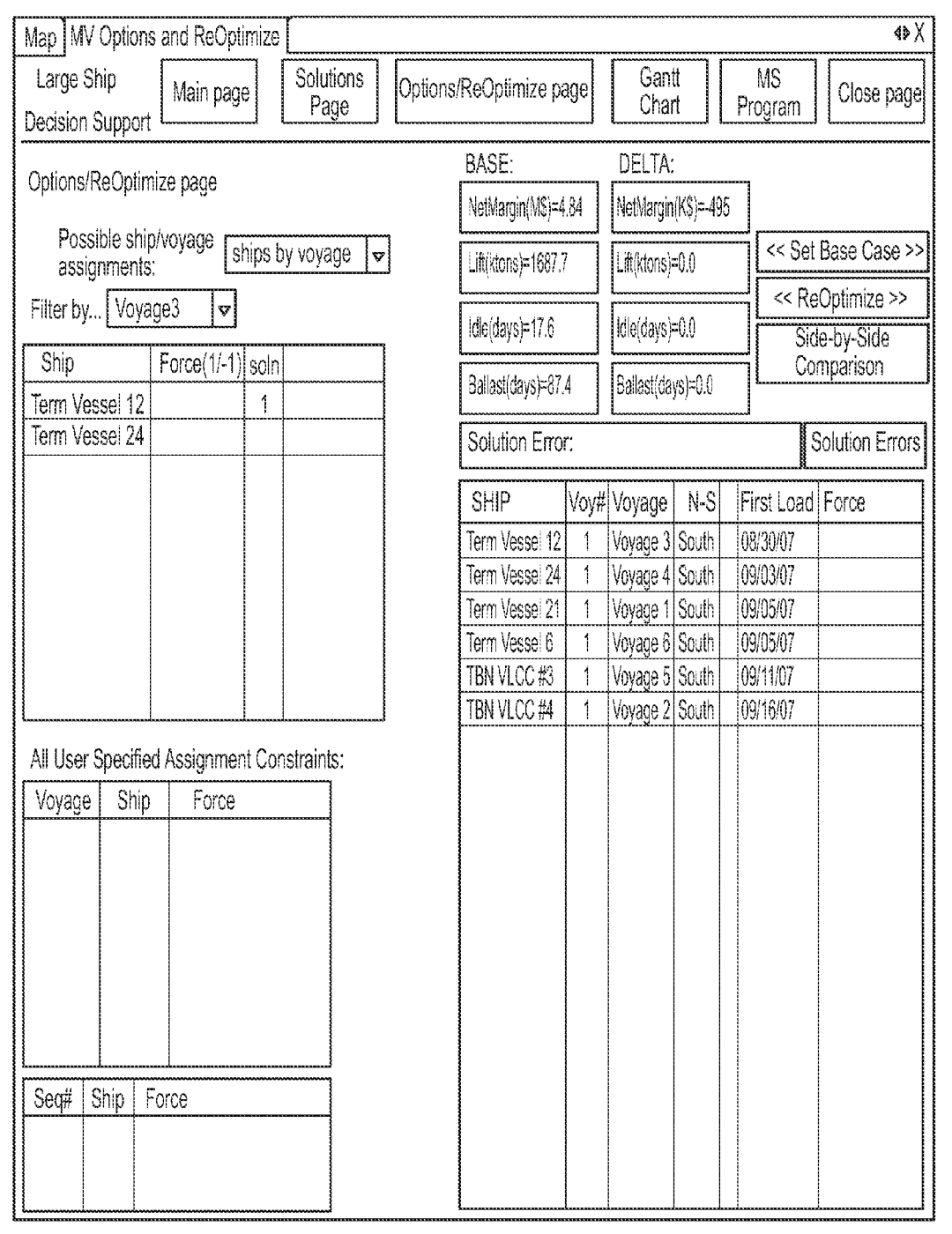

The fourth, optional, step in the LSDS workflow process is to re-optimize vessel assignments using to additional user input constraints. This step can be initiated by clicking the "Options/ReOptimize" navigation button on any page. Clicking this button opens a "MV Options/ReOptimize" page. The LSDS model results are the optimized vessel/voyage assignments. However, the user may want to reassign vessels for operational reasons and can do so using this page and weigh the impact of such reassignments. The MV Options/ReOptimize page, illustrated in FIG. 3X, allows the user to run such what-if analysis cases. As shown in FIG. 3X, the Options/ReOptimize screen contains multiple tables.

The upper table on the left side on the Options/ReOptimize page provides a means to examine feasible vessel/voyage assignments, either as a list of vessels by voyage or as a list of voyages by vessel and filter the results by specific voyages or vessels, respectively. The user can then interact with the table to force or disallow an assignment. More particularly, the "Soln" column in the table indicates a "1" if the assignment is in the current model solution. In addition, there is a "Force (1/−1)" column where the user can set up a "what if" scenario and force a particular term vessel/voyage assignment option in by entering a "1" in the corresponding cell or forbid a particular term vessel/voyage assignment by entering a "−1" in the corresponding cell. The lower table on the Options/ReOptimize page, entitled "All User Specified Assignment Constraints:" shows each assignment that has been forced or disallowed.

After reviewing these tables, the user, if desired, can re-optimize the solution to the model using the new forced constraints, by pressing the <<ReOptimize>> action key. When the user clicks the <<ReOptimize>> action key, the application, to the extent possible, resolves the multiple voyage problem taking into account the new restrictions.

When the re-optimization is complete, the user can view the impact of the new what if constraints on total net margin. The table in the lower right area displays a view of the current (i.e., last) optimized or re-optimized assignment solution. The area above this table displays some key performance indicators of the base (labeled as "BASE:") solution and the change therein with the delta (labeled as "DELTA:") solution, if applicable. The current solution is defined as the solution obtained after certain assignment constraints (to force or disallow an assignment) have been imposed, and the model has been re-optimized. The difference between the current and base solutions are calculated and displayed as "DELTA." Specific performance indicators for the base and delta are the total net margin, the total lift, the total idle days and the total ballast days.

A re-optimized solution can be set as the new base solution by clicking the "Set Base Case" button. A more detailed comparison between the base solution and the re-optimized solution can be viewed by clicking the "Side-by-Side Comparison" button.

A detailed description of the solution, in a tabular format conventionally used by ship schedulers, can be obtained by pressing the "N-S Program" button. A more visual description of the solution, as a Gantt chart, can be obtained by pressing the "Gantt Chart" button.

The Underlying LSDS Modeling Formulations

Key mathematical formulations used in the LSDS model are the vessel revenue (SR) formulation and the multiple voyage assignment (MVA) formulation. These formulations are described below.

i. The Ship Revenue Formulation

The vessel revenue (SR) formulation is a linear programming problem. The objective function for the SR formulation maximizes revenue earnings for each feasible vessel-voyage pairing by maximizing the cargo weight, subject to the specified voyage cargo volume specifications, lower and upper tolerances and capacity constraints. The objective function for the SR formulation can be stated as follows:

> Maximize: Sum{(voyage, ship) in CandidateVoyageVessel(voyage, ship), p_VoyageFlatWS(voyage)*v_TotalWeight(ship, voyage)−p_OverageCostperTon(voyage, ship)*v_OverageTons(ship, voyage)} subject to the following constraints
(1) v_WgtLoaded(ship, voyage, seqNum, port, grade) =v_VolLoaded(ship, voyage, seqNum, port, grade)/p_CrudeDensity(grade) for all (ship, voyage, seqNum, port, grade),
(2) v_CumWgtLoadedPort(ship, voyage, seqnum, port) =v_CumWgtLoadedPort(ship, voyage, seqnum-1, port-1)+Sum {grades, v_WgtLoaded(ship, voyage, seqnum, port, grade)} for all (ship, voyage, seqNum, port),
(3) v_TotalVolume(ship, voyage)=Sum{(seqNum, port, grade), v_VolLoaded(ship, voyage, seqNum, port, grade)} for all feasible ship voyage pairs,
(4) v_TotalWeight(ship, voyage)=Sum{(seqNum, port, grade), v_WgtLoaded(ship, voyage, seqNum, port, grade) for all feasible ship voyage pairs,
(5) v_OverageTons(ship, voyage)>=v_TotalWeight(ship, voyage)−p_VoyagePCMin(ship, voyage) for all feasible ship voyage pairs,
(6) v_CumWgtLoadedPort(ship, voyage, seqNum, port)<= (p_UP_MaxArrivalDraft_DWT(ship, voyage, seqNum, port)−p_VoyageShipShutOut(voyage, ship)) for all seqNum, port, and feasible ship-voyage pairs,
(7) v_CumWgtLoadedPort(ship, voyage, seqNum, port)+ p_LWT(ship)<=p_UP_MaxArrivalDisp(ship, voyage, seqNum, port)−p_VoyageShipShutOut(voyage, ship) for all seqNum, port, and feasible ship-voyage pairs, and
(8) v_CumWgtLoadedPort(ship, voyage, seqNum, port)+ LWT(ship)+VoyageShipShutOut(voyage, ship)<=p_LP_MaxDepartDisp(ship, port) for all seqNum, port, and feasible ship-voyage pairs where
(1) "WgtLoaded(ship, voyage, seqNum, port, grade)" is the weight of product grade loaded at a given port-seqNum pair for a feasible ship-voyage pairing;
(2) "v_VolLoaded(ship, voyage, seqNum, port, grade)" is the volume of product grade loaded at a given port-seqNum pair for a feasible ship-voyage pairing;
(3) "v_CumWgtLoadedPort(ship, voyage, seqNum, port)" is the cumulative weight of product grades loaded for a given port-seqNum pair for a feasible ship-voyage pairing;
(4) "v_TotalVolume(ship, voyage)" is the total volume of cargo loaded for each feasible ship-voyage pairing;
(5) "v_TotalWeight(ship, voyage)" is the total weight of cargo loaded for each feasible ship-voyage pairing; and
(6) "v_OverageTons(ship, voyage)" is the amount of overage cargo for each feasible ship-voyage pairing.
(7) "p_VoyageFlatWS(voyage)" is the product of Worldscale rates (input data) and the voyage flat rates as estimated/calculated by the calculation engine;
(8) "p_CrudeDensity(grade)" represents the grade densities as volume per weight (e.g., in barrels per ton);
(9) "p_VoyagePCMin(ship, voyage)" represents the part cargo minimum (weight) that applies to a ship-voyage pairing;
(10) "p_UP_MaxArrivalDraft_DWT(ship, voyage, seqNum, port)" is a calculated draft constraint (posed in terms of cargo weight) that represents the maximum arrival draft limit for a ship at a particular port;
(11) "p_VoyageShipShutOut(voyage, ship)" is the specified shut out for a ship-voyage pair that represents an assume weight of DWT capacity that is occupied by non-cargo elements (fuel, stores, etc.);
(12) "p_LWT(ship)" is the light-weight tonnage for each ship (weight of the ship); (7) "p_UP_MaxArrivalDisp(ship, voyage, seqNum, port)" is a calculated constraint (posed in terms of cargo weight) that represents the maximum arrival displacement limit for a ship at a particular port; and
(13) "p_LP_MaxDepartDisp(ship, port)" is a calculated constraint (posed in terms of cargo weight) that represents the maximum departure displacement limit for a ship at a particular port.

ii. The Multiple Voyage Assignment (MVA) Formulation

The MVA formulation is a mixed integer (linear) programming problem. The objective function for the MVA formulation is to maximize the total net margin of vessel/voyage assignments where term vessels (but not spot vessels) may be assigned to multiple sequential voyages. The objective function for the MVA formulation can be stated as follows:

> Maximize: Sum {CandidateCompShip(comb, ship), p_MVNetMargin(comb, ship)*v_MVMatch (comb, ship)}+Sum {ship in TermShip, p_MVFullNetHireValue(ship)*v_MVShipNotSelected (ship)}−Sum {voyage, v_MVVoyageNotCovered (voyage)*p_Penalty)} subject to the following constraint

> Sum {[comb, ship, voyNbr] in CandidateCombShip, v_MVMatch(comb, ship)}+v_MVVoyageNotCovered(voyage)=1 for all voyages, where
(1) Sum {comb, v_MVMatch(comb, ship)}+v_MVShipNotSelected(ship)=1 for all ships,
(2) V_MVMatch(comb, ship) are binary variables, and
(3) V_MVVoyageNotCovered(voyage), v_MVShipNotSelected(ship) are bounded between 0 and 1, and where
(1) "CandidateCombShip(comb, ship, voyNbr, voyage)" is the multiple voyage equivalent of CandidateVoyageShip (voyage, ship) that was used in the single-voyage assignment model but, in the 4-dimensional set "CandidateCombShip, comb" is the set of all feasible ship-voyage combinations, and voyNbr is the voyage sequence number in this combination (e.g., 1 to denote the first voyage for a ship, 2 to denote the 2nd voyage for a ship, etc.),
(2) "P_MVNetMargin(comb, ship)" is a parameter which contains the calculated net margin for each feasible assignment of a ship to a voyage combination,
(3) "P_Penalty" is a parameter which is set to a large value such that voyages are not covered (a ship is not assigned) only in situations where there is no feasible solution which covers all voyages,
(4) "Binary Variable v_MVMatch(comb, ship)=1 (or 0)" denotes that this ship is assigned (or not assigned) to this combination of voyages, (5) "Variable v_MVVoyageNotCovered(voyage)" is an infeasibility breaker that is included in formulation to assure that MVA has a feasible solution, and to identify any voyage for which a ship is not available to cover, (6) "Variable v_MVShipNotSelected(ship)" is included in model to permit solutions where ships are not assigned to any voyage, (7) "P MVFullNetHireValue(ship)" is a calculated parameter for each term ship which denotes the full net hire value earned by a term ship that if it is not assigned to any voyage, and (8) "TermShip" is the set of term ships (does not include spot ships).

Transferring Optimization Results From LSDS

All the grids and tables in LSDS support conventional copy and paste functionality enabling the user to copy and save data in an Excel document, Microsoft Word document or another type of application.

Frequency for Updating Data and Optimizing Vessel Assignments

After the monthly data validation cycle and optimization has been completed, LSDS's data should be routinely updated to reflect current changes in the business market. Updates may be needed due to large shifts in the Worldscale rates, interruptions in crude supply, or vessel availability. Preferably, input data is updated as appropriate to reflect any relevant change in the business environment.

CLOSING

While this description utilizes a variety of screenshots, examples and illustrative equations to fully illustrate the concepts behind the invention, the invention is by no means so limited. Various modifications, adjustments and applications of the disclosed invention will be apparent to those of ordinary skill in the art and are covered to the extent they fall within the scope of the appended claims.

What is claimed is:

1. A method for transporting bulk products for a planning period, comprising:
   (a) receiving a data set comprising:
      (1) identification of multiple origin and destination locations;
      (2) a set of voyages between the locations;
      (3) information relating to the market value of the voyages;
      (4) identification of multiple vehicles for carrying bulk products between the locations;
      (5) information relating to the cost of transporting the bulk products on the vehicles;
   (b) formulating, by a computer, a mathematical model for vehicle assignments comprising an objective function for total net profit margin and multiple constraints;
   wherein the objective function for total net profit margin comprises the sum of the individual net profit margins for each combination of feasible voyage-vehicle pairs, wherein the net profit margin for each feasible voyage-vehicle pair comprises the market value and the incurred costs for the feasible voyage-vehicle pair during the planning period;
   wherein the multiple constraints include constraints relating to the origin and destination locations, constraints relating to the voyages, and constraints relating to the vehicles during the planning period;
   (c) populating the mathematical model with data from the data set or parameters calculated from the data set;
   (d) obtaining, by a computer, a solution to the mathematical model for vehicle assignments, wherein obtaining a solution comprises (i) identifying feasible voyage-vehicle pairs available for transporting bulk product during the planning period based on temporal and physical vessel/voyage constraints, wherein identifying feasible voyage-vehicle pairs includes performing a forward projection in time to determine when a given vessel can perform a given voyage, (ii) optimizing maximum cargo revenue for each identified feasible voyage-vehicle pair, wherein optimizing maximum cargo revenue includes determining the maximum total amount of cargo each feasible voyage-vehicle pair can transport, and (iii) determining an assignment of vehicles that contains the optimal combination of identified feasible voyage-vehicle pairs during the planning period that yields the highest total net profit margin;
   (e) assigning vehicles to perform the set of voyages based on the solution to the mathematical model for vehicle assignments; and
   (f) physically transporting the bulk products based on the vehicle assignments.

2. The method of claim 1, wherein the data set further comprises identification of whether each vehicle is a term vehicle or a spot vehicle.

3. The method of claim 2, wherein the incurred costs for the term vehicles is calculated differently from that of the spot vehicles.

4. The method of claim 3, wherein the calculation for the market value for each term vehicle-voyage pair includes the voyage flat rate, the market Worldscale rate, the maximum amount of cargo that the term vehicle can carry, and the vehicle net hire value.

5. The method of claim 4, wherein the calculation for the incurred cost for each term vehicle-voyage pair includes a fuel consumption cost, a port fee, and a canal toll.

6. The method of claim 3, wherein the calculation for the market value for each spot vehicle-voyage pair includes the voyage flat rate, the market Worldscale rate, and the maximum amount of cargo that the spot vehicle can carry.

7. The method of claim 3, wherein the calculation for the incurred cost for each spot vehicle-voyage pair comprises a voyage flatrate, a vehicle Worldscale rate, a vehicle part-cargo minimum, a demurrage rate, an overage rate, a quantity of cargo, and a lump-sum cost.

8. The method of claim 2, wherein the market value for each term vehicle-voyage pair includes cargo revenue and net hire value.

9. The method of claim 8, wherein the market value for each spot vehicle-voyage pair includes cargo revenue, but not a net hire value.

10. The method of claim 1, wherein identifying feasible voyage-vehicle pairs available for transporting bulk product during the planning period includes determining a set of feasible voyage-vehicle pairs by determining for each voyage, one or more vehicles that can feasibly undertake the voyage.

11. The method of claim 10, wherein determining a set of feasible voyage-vehicle pairs includes:
   considering a time window for a load or discharge event in the voyage; and
   determining whether a vehicle can be available within the time window.

12. The method of claim 11, wherein determining a set of feasible voyage-vehicle pairs includes determining whether a vehicle can meet the physical requirements of the voyage.

13. The method of claim 10, wherein optimizing maximum cargo revenue for each feasible voyage-vehicle pair comprising:
 (a) formulating a linear programming model for cargo revenue comprising an objective function for maximizing cargo revenue for each feasible voyage-vehicle pair and multiple constraints;
 wherein the objective function for maximizing cargo revenue comprises the market rate of the cargo and the amount of cargo carried by the vehicle;
 wherein the constraints include constraints relating to the vehicles, constraints relating to the origin and destination locations, and constraints relating to the voyages;
 (b) populating the linear programming model for cargo revenue with data from the data set or parameters calculated from the data set;
 (c) obtaining a solution to the linear programming model for cargo revenue;
 wherein the market value for each feasible voyage-vehicle pair in the objective function for net profit margin comprises the maximum cargo revenue for the feasible voyage-vehicle pair.

14. The method of claim 10, wherein the set of feasible voyage-vehicle pairs includes both single voyage-vehicle pairs and multiple voyage-vehicle pairs; and
 wherein the step of determining a set of feasible voyage-vehicle pairs includes determining which combinations of two or more voyages can occur in sequence and be assigned to a vehicle.

15. The method of claim 1, wherein the mathematical model for vehicle assignments is a mixed-integer linear programming model.

16. The method of claim 15, wherein the mathematical model for vehicle assignments includes binary decision variables for assigning voyage-vehicle pairs.

17. The method of claim 1, wherein the incurred cost for each voyage-vehicle pair includes one or more of the following: a Worldscale rate, a voyage flat rate, an overage rate, a canal toll, a demurrage rate, a lump sum payment, a bunker fuel consumption cost, a marine diesel consumption cost, or a port fee.

18. The method of claim 1, where the bulk products are one or more grades of crude oil.

19. The method of claim 1, wherein each voyage is defined by one or more of: origin and destination locations to be visited; the identity and volume of the bulk products that need to be loaded or discharged; limits on the amount of cargo to be loaded or discharged; and the time windows for loading or discharging.

20. A computer system comprising:
 memory; and
 a processor, wherein the memory receiving a data set comprising: (1) identification of multiple origin and destination locations; (2) a set of voyages between the locations; (3) information relating to the market value of the voyages; (4) identification of multiple vehicles for carrying bulk products between the locations; and (5) information relating to the cost of transporting the bulk products on the vehicles;
 wherein the processor formulating a mathematical model for vehicle assignments comprising an objective function for net profit margin and multiple constraints;
 wherein the objective function for net profit margin comprises the sum of the individual net profit margins for each combination of feasible voyage-vehicle pairs, wherein the net profit margin for each feasible voyage-vehicle pair comprises the market value and the incurred costs for the feasible voyage-vehicle pair during a planning period;
 wherein the multiple constraints include constraints relating to the origin and destination locations, constraints relating to the voyages, and constraints relating to the vehicles during the planning period;
 wherein the processor populating the mathematical model with data from the data set or parameters calculated from the data set; and
 wherein the processor obtaining a solution to the mathematical model for vehicle assignments, wherein obtaining the solution includes (i) identifying feasible voyage-vehicle pairs available for transporting bulk product during a planning period based on temporal and physical vessel/voyage constraints, wherein identifying feasible voyage-vehicle pairs includes performing a forward projection in time to determine when a given vessel can perform a given voyage, (ii) optimizing maximum cargo revenue for each identified feasible voyage-vehicle pair, wherein optimizing maximum cargo revenue includes determining the maximum total amount of cargo each feasible voyage-vehicle pair can transport, and (iii) determining an assignment of vehicles that contains the optimal combination of identified feasible voyage-vehicle pairs during the planning period that yields the highest total net profit margin.

21. A non-transitory computer-readable storage medium comprising instructions for:
 (a) receiving a data set comprising:
  (1) identification of multiple origin and destination locations;
  (2) a set of voyages between the locations;
  (3) information relating to the market value of the voyages;
  (4) identification of multiple vehicles for carrying bulk products between the locations;
  (5) information relating to the cost of transporting the bulk products on the vehicles;
 (b) formulating a mathematical model for vehicle assignments comprising an objective function for net profit margin and multiple constraints;
 wherein the objective function for net profit margin comprises the sum of the individual net profit margins for each combination of feasible voyage-vehicle pairs, wherein the net profit margin for each feasible voyage-vehicle pair comprises the market value and the incurred costs for the feasible voyage-vehicle pair;
 wherein the multiple constraints include constraints relating to the origin and destination locations, constraints relating to the voyages, and constraints relating to the vehicles;
 (c) populating the mathematical model with data from the data set or parameters calculated from the data set; and
 (d) obtaining a solution to the mathematical model for vehicle assignments, wherein obtaining the solution includes (i) identifying feasible voyage-vehicle pairs available for transporting bulk product during a planning period based on temporal and physical vessel/voyage constraints, wherein identifying feasible voyage-vehicle pairs includes performing a forward projection in time to determine when a given vessel can perform a given voyage, (ii) optimizing maximum cargo revenue for each identified feasible voyage-vehicle pair, wherein optimizing maximum cargo revenue includes determining the maximum total amount of cargo each feasible voyage-vehicle pair can transport, and (iii) determining an assignment of vehicles that contains the optimal combination of identified feasible voyage-vehicle pairs during the planning period that yields the highest total net profit margin.

* * * * *